(12) United States Patent (10) Patent No.: US 8,868,914 B2
Teppler (45) Date of Patent: Oct. 21, 2014

(54) SYSTEM AND METHODS FOR DISTRIBUTING TRUSTED TIME

(76) Inventor: Steven W. Teppler, Sarasota, FL (US)

(*) Notice: Subject to any disclaimer, the term of this patent is extended or adjusted under 35 U.S.C. 154(b) by 929 days.

(21) Appl. No.: 12/185,645

(22) Filed: Aug. 4, 2008

(65) Prior Publication Data

US 2009/0083372 A1 Mar. 26, 2009

Related U.S. Application Data

(63) Continuation-in-part of application No. 11/129,651, filed on May 16, 2005, now Pat. No. 7,409,557, and a continuation-in-part of application No. 11/056,174, filed on Feb. 14, 2005, now abandoned, which is a continuation-in-part of application No. 09/609,646, filed on Jul. 3, 2000, now Pat. No. 6,895,507.

(60) Provisional application No. 60/142,132, filed on Jul. 2, 1999.

(51) Int. Cl.
 *H04L 9/32* (2006.01)
(52) U.S. Cl.
 CPC .......... *H04L 9/3226* (2013.01); *H04L 2209/80* (2013.01); *H04L 2209/56* (2013.01); *H04L 9/3297* (2013.01); *H04L 9/3263* (2013.01); *H04L 2209/603* (2013.01)
 USPC .......................................... 713/176; 713/155
(58) Field of Classification Search
 CPC ..................................................... H04L 9/3226
 USPC .................................................. 713/176, 155
 See application file for complete search history.

(56) References Cited

U.S. PATENT DOCUMENTS

| 5,001,752 | A |   | 3/1991  | Fischer         |
|-----------|---|---|---------|-----------------|
| 5,022,080 | A |   | 6/1991  | Durst et al.    |
| 5,136,647 | A |   | 8/1992  | Haber et al.    |
| 5,189,700 | A |   | 2/1993  | Blandford       |
| RE34,954  | E |   | 5/1995  | Haber et al.    |
| 5,422,953 | A | * | 6/1995  | Fischer ......................... 713/172 |
| 5,500,897 | A |   | 3/1996  | Hartman, Jr.    |
| 5,781,630 | A |   | 7/1998  | Huber et al.    |
| 5,903,882 | A |   | 5/1999  | Asay et al.     |
| 5,910,988 | A |   | 6/1999  | Ballard         |
| 5,923,763 | A |   | 7/1999  | Walker et al.   |
| 5,970,146 | A |   | 10/1999 | McCall et al.   |
| 6,047,282 | A |   | 4/2000  | Wilson et al.   |

(Continued)

FOREIGN PATENT DOCUMENTS

GB 2323455 9/1998

OTHER PUBLICATIONS

D. Mills, "Simple Network Time Protocol (SNTP) Version 4 for IPva, IPv6, and OSI", Octiber 1996.
Office Action for U.S. Appl. No. 09/421,279, Sep. 15, 2003.

(Continued)

*Primary Examiner* — Jacob Lipman

(57) ABSTRACT

Systems and methods for distributing trusted time, including trusted dates with digital data files, which are accessed, created, modified, received, or transmitted by devices that include a trusted time source in a tamperproof environment. The system includes one or more subsystems for providing trusted time for a moment in time. The trusted time source may be a real time clock, which is not resettable, is independent of any system clock of the devices, and where one or more devices may contribute to the distribution of trusted time among each other.

37 Claims, 18 Drawing Sheets

(56) References Cited

U.S. PATENT DOCUMENTS

| | | |
|---|---|---|
| 6,081,899 A | 6/2000 | Byrd |
| 6,209,090 B1 | 3/2001 | Aisenberg et al. |
| 6,209,091 B1 | 3/2001 | Sudia et al. |
| 6,226,744 B1 | 5/2001 | Murphy et al. |
| 6,237,096 B1 | 5/2001 | Bisbee et al. |
| 6,253,331 B1 | 6/2001 | Kotani |
| 6,356,937 B1 | 3/2002 | Montville et al. |
| 6,393,126 B1 | 5/2002 | van der Kaay et al. |
| 6,393,566 B1 | 5/2002 | Levine |
| 6,408,388 B1 | 6/2002 | Fischer |
| 6,442,691 B1 | 8/2002 | Blandford |
| 6,449,255 B1 | 9/2002 | Waclawsky |
| 6,490,355 B1 | 12/2002 | Epstein |
| 6,530,023 B1 | 3/2003 | Nissl et al. |
| 6,601,172 B1 | 7/2003 | Epstein |
| 2001/0011350 A1 | 8/2001 | Zabetian |

OTHER PUBLICATIONS

Final Office Action for U.S. Appl. No. 09/421,279, Jan. 29, 2004.

* cited by examiner

```
typedef struct {
    BYTE_PTR   buffer_ptr      /*buffer address*/
    DWORD      count;          /*number of bytes desired*/
    DWORD      offset;         /*beginning offset into the data*/
    DWORD      aux;            /*supplementary field*/
    WORD       actual;         /*number of actual bytes acted on*/
    WORD       identifier;     /*unique identifier for each data or code*/
    BYTE       type;           /*command type: either data or code type*/
    BYTE       priority;       /*each identifier is assigned a priority*/
    BYTE       sub_command;    /*subcommand to expand functionality*/
    BYTE       reserved        /*padded for DWORD alignment*/
COMMAND_CONTROL;
```

Fig. 14

| parameters | data-streams | | | |
|---|---|---|---|---|
| Type 0 | Type 1 | Type 2 | Type 3 | Type N≤7 |
| parameter 1 | voice mail 1 | fax 1 | e-mail 1 | data-stream 1 |
| parameter 2 | voice mail 2 | fax 2 | e-mail 2 -------------- data-stream 2 |
| parameter 3 | voice mail 3 | | e-mail 3 | |
| parameter 4 | voice mail 4 | | e-mail 4 | |
| parameter 5 | | | e-mail 5 | |
| parameter 6 | | | | |

Fig. 15

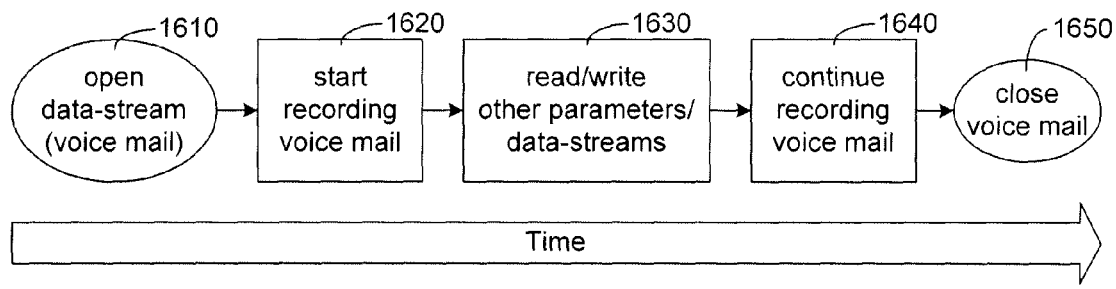

Fig. 16

```
SID 0: Root SID: Root Name = "R"
SID 1: Element 1 SID: Name = "Storage 1"
SID 2: Element 2 SID: Name = "Stream 1"
SID 3: Unused
```

```
_ab = ("R")(this should be "Root Entry")
_cb = 00042(42 bytes,does not include double-null termi
nator)
_mse = 05 (STGTY_ROOT)
_bflags = 00 (DE_RED)
_sidLeftSib= FFFFFFFF (none)
_sidRightSib= FFFFFFFF (none)
_sidChild = 00000001 (SID 1: "Storage 1")
_clsid = 0067 6156 54C1 CE11 8553 00AA 00A1 F95B
_dwUserFlags= 00000000 (n/a for STGTY_ROOT)
_time[0] = CreateTime = 0000 0000 0000 0000 (none set)
_time[1] = ModifyTime = 801E 9213 4BB4 BA01 (??)
_sectStart = 00000003 (starting sector of MiniStream)
_ulSize = 00000240 (length of MiniStream in bytes)
_dptPropType= 0000 (n/a)
```

Fig. 21(a)

```
000400: 0052 0000 0000 0000 0000 0000 0000 0000    .R..............
000410: 0000 0000 0000 0000 0000 0000 0000 0000    ................
000420: 0000 0000 0000 0000 0000 0000 0000 0000    ................
000430: 0000 0000 0000 0000 0000 0000 0000 0000    ................
000440: 04200 0500 FFFF FFFF FFFF FFFF 0100 0000    ................
000450: 0067 6156 54C1 CE11 8553 00AA 00A1 F95B    .gaVT....S.....[
000460: 0000 0000 0000 0000 0000 0000 801E 9213    ................
000470: 4BB4 BA01 0300 0000 4002 0000 0000 0000    K.......@.......
```

```
_ab = ("Storage 1")
_cb = 0014 (20 bytes, including double-null terminator)
_mse = 01 (STGTY_STORAGE)
_bflags = 01 (DE_BLACK)
_sidLeftSib= FFFFFFFF (none)
_sidRightSib= FFFFFFFF (none)
_sidChild = 00000002 (SID 2: "Stream 1")
_clsid = 0000 0000 0000 0000 0000 0000 0000 0000 (none set)
_dwUserFlags= 00000000 (none set)
_time[0] = CreateTime = 00000000 00000000 (none set)
_time[1] = ModifyTime = 00000000 00000000 (none set)
_sectStart = 00000000 (n/a)
_ulSize = 00000000 (n/a)
_dptPropType= 0000 (n/a)
```

Fig. 21(b)

```
000480: 5300 7400 6F00 7200 6100 6700 6500 2000    S.t.o.r.a.g.e. .
000490: 3100 0000 0000 0000 0000 0000 0000 0000    1...............
0004A0: 0000 0000 0000 0000 0000 0000 0000 0000    ................
0004B0: 0000 0000 0000 0000 0000 0000 0000 0000    ................
0004C0: 1400 0101 FFFF FFFF FFFF FFFF 0200 0000    ................
0004D0: 0061 6156 54C1 CE11 8553 00AA 00A1 F95B    .aaVT....S.....[
0004E0: 0000 0000 0088 F912 4BB4 BA01 801E 9213    ........K.......
0004F0: 4BB4 BA01 0000 0000 0000 0000 0000 0000    K...............
```

```
_ab         = ("Stream 1")
_cb         = 0012 (18 bytes, including double-null terminator)
_mse        = 02 (STGTY_STREAM)
_bflags     = 01 (DE_BLACK)
_sidLeftSib = FFFFFFFF (none)
_sidRightSib= FFFFFFFF (none)
_sidChild   = FFFFFFFF (n/a for STGTY_STREAM)
_clsid      = 0000 0000 0000 0000 0000 0000 0000 0000 (n/a)
_dwUserFlags= 00000000 (n/a)
_time[0]    = CreateTime = 00000000 00000000 (n/a)
_time[1]    = ModifyTime = 00000000 00000000 (n/a)
_startSect  = 00000000 (SECT in mini-fat, since _ulSize is
smaller than _ulMiniSectorCutoff)
_ulSize     = 00000220 (< ssheader._ulMiniSectorCutoff, so
_sectStart is in Mini)
_dptPropType= 0000 (n/a)
000500: 5300 7400 7200 6500 6100 6D00 2000 3100  S.t.r.e.a.m. .1.
000510: 0000 0000 0000 0000 0000 0000 0000 0000  ................
000520: 0000 0000 0000 0000 0000 0000 0000 0000  ................
000530: 0000 0000 0000 0000 0000 0000 0000 0000  ................
000540: 1200 0201 FFFF FFFF FFFF FFFF FFFF FFFF  ................
000550: 0000 0000 0000 0000 0000 0000 0000 0000  ................
000560: 0000 0000 0000 0000 0000 0000 0000 0000  ................
000570: 0000 0000 0000 0000 2002 0000 0000 0000  ................
000580: 0000 0000 0000 0000 0000 0000 0000 0000  ................
```

Fig. 21(d)

SYSTEM AND METHODS FOR DISTRIBUTING TRUSTED TIME

CROSS REFERENCE TO RELATED APPLICATIONS

This application claims the benefit of co-pending and commonly assigned U.S. Ser. No. 11/129,651, filed on May 16, 2005, which is a continuation-in-part of U.S. Ser. No. 11/056, 174, filed on Feb. 14, 2005 and now abandoned, which in turn is a continuation-in-part of U.S. Ser. No. 09/609,646, filed on Jul. 3, 2000 and now U.S. Pat. No. 6,895,507, entitled "Method And System For Determining And Maintaining Trust In Digital Data Files With Certifiable Time," issued May 17, 2005, which in turn claims the benefit of U.S. Ser. No. 60/142,132, filed on Jul. 2, 1999.

This application is related to U.S. Pat. No. 6,792,536, entitled "Smart Card System And Methods For Proving Dates In Digital Data Files," issued Sep. 14, 2004; U.S. Pat. No. 6,898,709, entitled "Personal Computer System And Methods For Providing Dates In Digital Data Files," issued May 24, 2005; and U.S. Pat. No. 6,948,069, entitled "Method And System For Determining And Maintaining Trust In Digital Image Files With Certifiable Time," issued Sep. 20, 2005.

Each of the above cited patents and patent applications is incorporated herein by reference in its entirety.

COPYRIGHT NOTICE

Portions of the disclosure of this patent document may contain material that is subject to copyright protection. The copyright owner has no objection to the facsimile reproduction by anyone of the patent document or the patent disclosure, as it appears in the United States Patent and Trademark Office file or records, but otherwise reserves all copyright rights whatsoever.

BACKGROUND OF THE INVENTION

Computers and other digital devices create and use data or information in many ways. The Microsoft® Press Computer Dictionary, 3d Edition (1997) defines the term data as the " . . . [p]lural of the Latin datum, meaning an item of information. In practice, data is often used for the singular as well as the plural form of the noun. Compare information." The term information is, in contradistinction, defined by the Microsoft(Press Computer Dictionary, 3d Edition (1997) as " . . . [t]he meaning of data as it is intended to be interpreted by people. Data consists of facts, which become information when they are seen in context and convey meaning to people. Computers process data without any understanding of what the data represents."

Without manifestly excluding or restricting the broadest definitional scope entitled to such terms, the following are non-limiting examples of data and information, which will be readily apparent to those of ordinary skill in the art and are intended to illustrate no clear disavowal of their ordinary meaning.

Data often refers to distinct pieces of information, usually but not always formatted in a special way. Collections of information or data may be kept in files. The Microsoft® Press Computer Dictionary, 3d Edition (1997) defines the term file as " . . . [a] complete, named collection of information, such as a program, a set of data used by a program, or a user-created document. A file is the basic unit of storage that enables a computer to distinguish one set of information from another. A file is the "glue" that binds a conglomeration of instructions, numbers, words, or images into a coherent unit that a user can retrieve, change, delete, save, or send to an output device."

Again, without manifestly excluding or restricting the broadest definitional scope entitled to such term, the following are non-limiting examples of files, which will be readily apparent to those of ordinary skill in the art and are intended to illustrate no clear disavowal of its ordinary meaning. Almost all information in computers and other digital devices may be stored in a file. There are many different types of files: data files, directory files, executable files, program files, text files, etc. Different types of files usually store different types of information. For example, a program file stores a program, whereas text files store text.

In database management systems, for example, data files are usually the files that store the database information, whereas other files, such as index files and data dictionaries, store administrative information, known as metadata. Executable files, on the other hand, are files in a format that the computer can directly execute. Unlike source files, executable files usually cannot be read by humans. One typically passes a source file through a compiler or assembler in order to transform it into an executable file. Nevertheless, such differing types of files are deemed to be data or information, which may be processed within the scope of various embodiments of the present invention.

The term data is often used to distinguish binary machine-readable information from textual human-readable information. For example, some applications make a distinction between data files (i.e., files that contain binary data) and text files (i.e., files that contain ASCII data). Text files stored in ASCII format are sometimes called ASCII files. Text editors and word processors are usually capable of storing data in ASCII format, although ASCII format is not always the default storage format. Most data files, particularly if they contain numeric data, are usually not stored in ASCII format. Executable programs are almost never stored in ASCII format.

Therefore, it should be understood that data as used herein may comprise information encoded by means for representing characters as numbers, such as the ASCII, extended ASCII or high ASCII formats, the ISO Latin 1 set of characters, which is used by many operating systems, as well as Web browsers, EBCDIC, and the like. Methods, apparatus and computer program products according to various embodiments of the present invention may work with any such data and information, including executable files.

Data and information as used herein may also comprise a bitstream. As is known, a bitstream is a series of binary digits representing a flow of information transferred through a given medium. Such sequences of bits are transmitted across an electronic link, and the software controlling the link is typically unaware of any structure inherent in the bitstream data. In synchronous communications, bitstreams comprise a continuous flow of data in which characters within the bitstream are separated from one another by the receiving station rather than by markers, such as start and stop bits, inserted into the data.

Data and information as used herein may also comprise an ASCII string, a bit string, whether contiguous or non-contiguous with other bit strings, a byte string, a character string, data elements, or data sets as those terms may be used in forms of digital imaging (e.g., digital radiography, radiotherapy, x-ray, positron emission tomography, ultrasound, and magnetic resonance imaging) according to the joint work of the American College of Radiology (ACR) and the National Electrical Manufacturers Association (NEMA), published in the Digital Imaging and Communications in Medicine PS 3-1998 (DICOM Standard).

Data and information as used herein may also comprise streams/streaming, which is generally known as the transferring of data in a manner that allows it to be processed (e.g., displayed) as the data is transferred, rather than requiring all the data to be transferred before it can be used. Streaming is often useful in accelerating access to large audio or video files, or where the stream is ongoing. Thus, data streaming—commonly used in the terms "audio streaming" or "video streaming"—is when data moves from one computer to another and does not have to be completely downloaded for the receiving computer to do something with it.

As is typically used in computing in regard to the organization of data within databases or information systems, the term entity refers to a piece of data—an object or concept about which data is stored. A relationship, on the other hand, is how the data is shared between entities.

Those of ordinary skill in the art would readily appreciate that there are three types of relationships between entities: one-to-one, one-to-many, and many-to-many. An example of a one-to-one relationship occurs where one instance of an entity (A) is associated with one other instance of another entity (B). For example, in a database of employees, each employee name (A) is associated with only one social security number (B).

An example of a one-to-many relationship occurs where one instance of an entity (A) is associated with zero, one or many instances of another entity (B), but for one instance of entity B there is only one instance of entity A. For example, for a company with all employees working in one building, the building name (A) is associated with many different employees (B), but those employees all share the same singular association with entity A.

Finally, a many-to-many relationship occurs where one instance of an entity (A) is associated with one, zero or many instances of another entity (B), and one instance of entity B is associated with one, zero or many instances of entity A. For example, for a company in which all of its employees work on multiple projects, each instance of an employee (A) is associated with many instances of a project (B), and at the same time, each instance of a project (B) has multiple employees (A) associated with it.

It should be appreciated, therefore, that data and information as used herein may also comprise entities, instances, and objects.

As is known by those of ordinary skill in the art, a database may be stored in data chunks within some data storage environments. The data chunks may be separated from each other physically, through the use of file structure, or they may be abstractions in a contiguously stored database. For example, a database may be stored using multiple compressed files, each representing a data chunk, which may reside on the same physical computer-readable medium, such as, for example, a single hard drive, or multiple computer-readable mediums connected by a network, such as, for example, multiple hard drives in a server farm. Or, a database may be stored using multiple backup tapes, with each backup tape representing a data chunk. It may also be possible to combine physical and file structure separation of the data chunks, for example, by storing a database in multiple compressed files spread across multiple backup tapes, where each compressed file may represent a data chunk.

Therefore, it should be appreciated that data and information as used herein may also comprise data chunks.

Computers and other digital devices often work together in "networks." A network is a group of two or more digital devices linked together (e.g., a computer network). There are many types of computer networks, including: local-area networks (LANs), where the computers are geographically close together (e.g., in the same building); and wide-area networks (WANs), where the computers are farther apart and are connected by telephone lines, fiber-optic cable, radio waves and the like.

In addition to the above types of networks, certain characteristics of topology, protocol, and architecture are also used to categorize different types of networks. Topology refers to the geometric arrangement of a computer system. Common topologies include a bus, star, and ring. Protocol defines a common set of rules and signals that computers on a network use to communicate. One of the most popular protocols for LANs is called Ethernet. Another popular LAN protocol for personal computers is the IBM token-ring network. Architecture generally refers to a system design. Networks today are often broadly classified as using either a client/server architecture or a peer-to-peer architecture.

The client/server model is an architecture that divides processing between clients and servers that can run on the same computer or, more commonly, on different computers on the same network. It is a major element of modern operating system and network design.

A server is a program, or the computer on which that program runs, that provides a specific kind of service to clients. A major feature of servers is that they can provide their services to large numbers of clients simultaneously. A server may thus be a computer or device on a network that manages network resources (e.g., a file server, a print server, a network server, or a database server. For example, a file server is a computer and storage device dedicated to storing files. Any user on the network can store files on the server. A print server is a computer that manages one or more printers, and a network server is a computer that manages network traffic. A database server is a computer system that processes database queries.

Servers are often dedicated, meaning that they perform no other tasks besides their server tasks. On multiprocessing operating systems, however, a single computer can execute several programs at once. A server in this case could refer to the program that is managing resources rather than the entire computer.

The client is usually a program that provides the user interface, also referred to as the front end, typically a graphical user interface or "GUI", and performs some or all of the processing on requests it makes to the server, which maintains the data and processes the requests.

The client/server model has some important advantages that have resulted in it becoming the dominant type of network architecture. One advantage is that it is highly efficient in that it allows many users at dispersed locations to share resources, such as a web site, a database, files or a printer. Another advantage is that it is highly scalable, from a single computer to thousands of computers.

An example is a web server, which stores files related to web sites and serves (i.e., sends) them across the Internet to clients (i.e., web browsers) when requested by users. By far the most popular web server is Apache, which is claimed by many to host more than two-thirds of all web sites on the Internet.

The X Window System, the dominant system for managing GUIs on Linux and other Unix-like operating systems, is unusual in that the server resides on the local computer (i.e., on the computer used directly by the human user) instead of on a remote machine (i.e., a separate computer anywhere on the network) while the client can be on either the local machine or a remote machine. However, as is always true with the client/server model, the ordinary human user does not interact directly with the server, but in this case interacts directly with the desktop environments (e.g., KDE and Gnome) that run on top of the X server and other clients.

The client/server model is most often referred to as a two-tiered architecture. Three-tiered architectures, which are widely employed by enterprises and other large organizations, add an additional layer, known as a database server. Even more complex multi-tier architectures can be designed which include additional distinct services.

Others network models include master/slave and peer-to-peer. In the former, one program is in charge of all the other programs. In the latter, each instance of a program is both a client and a server, and each has equivalent functionality and responsibilities, including the ability to initiate transactions. That is, peer-to-peer architectures involve networks in which each workstation has equivalent capabilities and responsibilities. This differs from client/server architectures, in which some computers are dedicated to serving the others. Peer-to-peer networks are generally simpler and less expensive, but they usually do not offer the same performance under heavy loads.

Computers and other digital devices on networks are sometimes also called nodes. Each node has a unique network address, and comprises a processing location.

The term "user" as used herein may typically refer to a person (i.e., a human being) using a computer or other digital device on the network. However, since the verb "use" is ordinarily defined (see, e.g., Webster's Ninth New Collegiate Dictionary 1299 (1985)) as "to put into action or service, avail oneself of, employ," clients and servers in networks according to known client/server architectures, peers in networks according to known peer-to-peer architectures, and nodes in general may—without human intervention—"put into action or service, avail themselves of, and employ" methods according to embodiments of the present invention.

Without manifestly excluding or restricting the broadest definitional scope entitled to such terms, the following are non-limiting examples of a "user," which will be readily apparent to those of ordinary skill in the art and are intended to illustrate no clear disavowal of their ordinary meaning: a person (i.e., a human being) using a computer or other digital device, in a standalone environment or on the network; a client installed within a computer or digital device on the network, a server installed within a computer or digital device on the network, or a node installed within a computer or digital device on the network.

In the following description and claims, the terms "append", "attach", "couple" and "connect," along with their derivatives, may be used. It should be readily appreciated to those of ordinary skill in the art that these terms are not intended as synonyms for each other. Rather, in particular embodiments, "append" may be used to indicate the addition of one element as a supplement to another element, whether physically or logically. "Attach" may mean that two or more elements are in direct physical contact. However, "attach" may also mean that two or more elements are not in direct contact with each other, but may associate especially as a property or an attribute of each other.

Likewise, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It will become readily apparent to those of ordinary skill in the art after reading the following that none of the aforementioned computers or other digital devices, processing data and information formats currently provide means for proving—with certainty—the dates and times associated with access, creation, modification, receipt, or transmission of such data or information. This is due to the variety of application programs which are available for data access, creation, modification, receipt, and transmission, but also due to the much more varied "standards" and protocols put forth in the vain attempt to provide uniformity worldwide.

Counterfeit and Altered Realities

The production, propagation and eventual reliance on digital information has become commonplace. Nearly every aspect of our lives is recorded digitally, stored digitally, transmitted, and accessed digitally. At each step of the process of accessing, creating, modifying, transmitting and receiving this digital information, there is the chance that the information can be altered, copied, forged, or otherwise tampered with. Often times the tampering is not detectable, and in many cases damage is caused.

For instance, digital data presents many options for its handling, which allow for several types of forgeries to be created. A minor re-touching of an image or the re-formatting of a text document still results in changes to the information being presented, may alter the perceived reality, and one may unwittingly verify such a re-touched or altered document because the changes go unnoticed or unchallenged. Further, even computer enhanced data (such as digital images) is still computer generated data, and subject to all the vulnerabilities native to digital data as described herein. In the circumstances surrounding the admissibility and reliance on electronic documents in courts of law, even the most minor alterations (and even enhancements) can have grave consequences, particularly when there is no way to track the changes or alterations to specific and certain dates and times.

In the various environments described below, the need for verification of data is universal. These environments do not themselves, however, necessarily require such verification. Instead, it is the implementation of devices, which do not consider or account for the commonplace reliance on digitally processed information that do require such verification.

Illustrative of the enormity and ubiquity of the problem are the following operating environments, within which the systems and methods according to the present invention can provide the time certainty, which is presently ignored in each environment.

Digital Document Processing

"Processing" may be viewed as the manipulation of data within a computer system. Since virtually all computer systems today process digital data, processing is the vital step between receiving the data in binary format (i.e., input), and producing results (i.e., output)—the task for which computers are designed.

The Microsoft® Press Computer Dictionary, 3d Edition (1997) defines the term document as " . . . any self-contained piece of work created with an application program and, if saved on disk, given a unique filename by which it can be retrieved." Most people think of documents as material done by word processors alone. To the typical computer, however, data is little more than a collection of characters. Therefore, a database, a graphic, or a spreadsheet can all be considered as much a document as is a letter or a report. In the Macintosh environment in particular, a document is any user-created work named and saved as a separate file.

Accordingly, for the purpose of the invention described herein, digital document processing shall be interpreted to mean the manipulation of digital (i.e., binary) data within a computer system to create or modify any self-contained piece of work with an application program and, if saved on a disk or any other memory means, given a unique filename by which it can be retrieved. Examples of such application programs with which the present invention may be used to assist in such digital document processing are Microsoft® Access 97, Microsoft® Excel 97, and Microsoft® Word 97, each available from Microsoft Corporation, Redmond, Wash. U.S.A.

Digital Communications

"Communications" may be broadly defined as the vast discipline encompassing the methods, mechanisms, and media involved in information transfer. In computer-related areas, communications usually involve data transfer from one computer to another through a communications medium, such as a telephone, microwave relay, satellite link, or physical cable.

Two primary methods of digital communications among computers presently exist. One method temporarily connects two computers through a switched network, such as the public telephone system. The other method permanently or semi-permanently links multiple workstations or computers in a network. In reality, neither method is distinguishable from the other, because a computer can be equipped with a modem, which is often used to access both privately owned and public access network computers.

More particular forms of digital communications (i.e., exchange of communications in which all of the information is transmitted in binary-encoded, digital format) include electronic mail (or less formally "e-mail"), facsimile, voicemail, and multimedia communications.

E-mail may be broadly defined as the exchange of text messages/computer files over a communications network, such as a local area network (LAN) or the Internet, usually between computers or terminals. Facsimile (or, again, less formally "fax") comprises the transmission and reception of text or graphics over telephone lines in digitized form. Conventional fax machines scan an original document, transmit an image of the document as a bit map, and reproduce the received image on a printer. Resolution and encoding of such fax messages are standardized in the CCITT Groups 1-4 recommendations. Fax images can likewise be sent and received by computers equipped with fax hardware and software.

The CCITT Groups 1-4 recommendations make up a set of standards recommended by the Comité Consultatif International Télégraphique et Téléphonique (now known as the International Telecommunication Union) for encoding and transmitting images over fax machines. Groups 1 and 2 relate to analog devices, which are generally out of use. Groups 3 and 4 deal with digital devices, and are outlined below.

Group 3 is a widespread standard that supports "standard" images of 203 horizontal dots per inch (dpi) by 98 vertical dpi, and "fine" images of 203 horizontal dpi by 198 vertical dpi. Group 3 devices support two methods of data compression. One is based on the Huffman code, and reduces an image to 10 to 20 percent of the original. The other, known as "READ" (for "relative element address designate"), compresses an image to about six to twelve percent (~6%-12%) of its original. Additionally, the READ method provides for password protection as well as polling, so that a receiving machine can request transmission as appropriate.

Group 4 is a newer standard, which supports images of up to 400 dpi. Its method of data compression is based on a beginning row of white pixels, or "dots", with each succeeding line encoded as a series of changes from the line before. Images are compressed to about three to ten percent (~3%-10%) of the original. Group 4 devices do not include error-correction information in their transmission. Moreover, they require an Integrated Services Digital Network (ISDN) phone line rather than a traditional dial-up line.

Fax modems may also be used to send and receive digital data encoded in known fax formats (e.g., one of the CCITT groups noted above). Such data is either sent or received by a fax machine or another modem, which then decodes the data and converts it to an image. If the data was initially sent by fax modem, the image must previously have been encoded on the computer hosting such fax modem. Text and graphic documents can be converted into fax format by special software that is usually provided with the fax modem. Paper documents must first be scanned in. As is well known, fax modems may be internal or external and may combine fax and conventional modem capabilities.

Voicemail generally comprises a system that records and stores telephone messages in a computer's memory. Unlike a simple answering machine, voicemail systems include separate mailboxes for multiple users, each of whom can copy, store, or redistribute messages. Another type of digital communications involving voice is "voice messaging", a term which generally refers to a system that sends and receives messages in the form of sound recordings. Typical voice messaging systems may employ "voice modems", which are modulation/demodulation devices that support a switch to facilitate changes between telephony and data transmission modes. Such a device might contain a built-in loudspeaker and microphone for voice communication, but more often it uses the computer's sound card.

Still another form of digital communications includes multimedia communications in the style of "video teleconferencing", as defined by the International Telecommunication Union (formerly CCITT) in "Visual Telephone Systems and Equipment for Local Area Networks Which Provide a Non-Guaranteed Quality of Service," (Recommendation H.323, Telecommunication Standardization Sector of ITU, Geneva, Switzerland, May 1996) and other similar such standards.

Digital Imaging

"Digital imaging" encompasses those known processes involved in the capture, storage, display, and printing of graphical images. They may involve devices known as a "digital camera", which broadly refers to a camera that stores photographed images electronically instead of on traditional film. Digital cameras typically use charge-coupled device (CCD) elements to capture the image through the lens when the operator releases the shutter in the camera. Circuits within the camera cause the image captured by the CCD to be stored in a storage medium, such as solid-state memory or a hard disk. After the image has been captured, it is downloaded by cable to the computer using software supplied with the camera. Once stored in the computer, the image can be manipulated and processed much like the image from a scanner or related input devices. Digital cameras come in the form of still cameras and full-motion video recorders.

Other forms of digital imaging include digitizing systems, such as the "PhotoCD®" system from Eastman Kodak Company, Rochester, N.Y. That system allows 35 mm film pictures, negatives, slides, and scanned images to be stored on a compact disc. Images are then stored in a file format known as the Kodak PhotoCD Image Pac File Format, or PCD. Many photography and film development businesses offer this service. Any computer with CD-ROM capabilities can usually view images stored on a PhotoCD and the software required to read PCD. Additionally, such images can be viewed by any one of a variety of players that are specifically designed to display images stored on CDs. Another photographic form of digital imaging is defined by the "Flashpix" specification, the cooperative endeavor of the Digital Imaging Group, Microsoft, the Hewlett-Packard Company, and Live Picture, Inc. The Flashpix format builds on the best features of existing formats (e.g., Kodak Image Pac, Live Picture IVUE, Hewlett-Packard JPEG, TIFF, TIFF/EP, etc.), and combines these features with an object orientated approach.

Still other forms of digital imaging include digital radiography, radiotherapy, x-ray, positron emission tomography, ultrasound, and magnetic resonance imaging according to the joint work of the American College of Radiology (ACR) and the National Electrical Manufacturers Association (NEMA), published in the Digital Imaging and Communications in Medicine PS 3-1998 (DICOM Standard).

Digital Commerce

An enormous amount of commercial activity now takes place by means of connected computers. Such commercial activity has been variously coined as digital commerce, electronic commerce, or just plain E-commerce. Regardless of its particular moniker, these activities generically involve a commercial transaction between a user and a vendor through an online information service, the Internet, or a BBS, or between vendor and customer computers through a specialized form of E-commerce known as electronic data interchange (EDI).

EDI is collectively known for its set of standards to control the transfer of business documents (e.g., purchase orders and invoices) between computers. The ultimate goal of EDI is the elimination of paperwork and increased response time. For EDI to be most effective, users must agree on certain standards for formatting and exchanging information, such as the X.400 protocol and CCITT X series.

Other known forms of E-commerce include digital banking, web-front stores, and online trading of bonds, equities, and other securities. Digital banking can take the form of access to a user's account, payment of bills electronically, or transfer of funds between a user's accounts. Web-front stores (e.g., amazon.com) usually comprise a collection of web pages in the form of an electronic catalog, which offers any number of products for sale. More often than not, transactions at such web-front stores are consummated when a purchaser enters his credit card number, and the issuing bank approves the purchase. These transactions may or may not be over secure lines, such as those designated "TRUSTe" participant web sites. Further details regarding known processes for establishing and maintaining secure E-commerce connections may be found in the SET Secure Electronic Transaction Specification, Book 1: Business Description (version 1.0), May 31, 1997, the contents of which are incorporated herein by reference. See also Book 2 (Programmer's Guide) and Book 3 (Formal Protocol Definition) of the SET Secure Electronic Transaction Specification, as well as the External Interface Guide to SET Secure Electronic Transaction, Sep. 24, 1997, each of which is incorporated herein by reference.

One burgeoning form of E-commerce that has arisen in the past few years is that which involves dealing in securities online. "Day traders" watch impatiently as ticker symbols speed across their computer screens. When the price is right, they electronically whisk their order off to a distant securities dealer-often buying and selling the same stock or bond in a fifteen-minute span of time. One can only imagine the potential problems associated with the purchase or sale of securities when price-per-share movements on the order of a few cents make the difference to these day traders. Fortunately, the National Association of Securities Dealers (NASD) has come up with its Order Audit Trail Systems (OATS) to track all stock transactions. NASD Rule 6953 also requires all member firms that have an obligation to record order, transaction, or related data under the NASD Rules or Bylaws to synchronize the business clocks that are used for recording the date and time of any market event. Computer system and mechanical clocks must be synchronized every business day before market open, at a minimum, in order to ensure that recorded order event timestamps are accurate.

Digital Justice

Even legal scholars and systems around the world have been unable to escape the problems of an online world. Utah became the first jurisdiction in the United States of America to enact legislation creating "cybernotaries". Similar laws in Georgia, Florida, and Massachusetts quickly followed Utah. In Riverside, California in 2003, individuals were found to have altered computerized court records to create dismissals.

In August 1996, the American Bar Association (through its Information Security Committee of the Electronic Commerce and Information Technology Division, Section of Science and Technology) published the Digital Signature Guidelines—Legal Infrastructure for Certification Authorities and Secure Electronic Commerce. The European Union, as well, in a final report on the Legal Issues Of Evidence And Liability In The Provision Of Trusted Services (CA and TTP Services), let its position be known in October 1998.

Each of the environments noted above is fraught with potential fraud. Any reliance they may have on dates and times is merely for the purpose of determining whether the transaction is valid (i.e., authorized within a specified range of time), or what specific time delays occur in the transmission of data between the computer systems communicating with one another. However, none of those environments currently provide means for proving—with certainty—dates and times associated with access, creation, modification, receipt, or transmission of digital data files, which may be used therein.

Attempts to Solve the Problem

Many-varied computing means pervade today's society. PCs, web browsers, e-mail clients, e-mail servers, network file servers, network messaging servers, mainframes, Internet appliances, wireless telephones, pagers, PDAs, fax machines, fax modems, digital still cameras, video cameras, voice recorders, video recorders, copiers, and scanners, and virtually any other device using digital data files are fast becoming ubiquitous.

Digital data is easy to modify. As a result, it has been nearly impossible in the prior art to establish with certainty the date and time a particular digital data file in a given computing means was accessed, created, modified, received, or transmitted. It should be understood that, by use of the term "computing means", the present invention is directed to general purpose computers, PCs, web browsers, e-mail clients/servers, network file/messaging servers, mainframes, Internet appliances, wireless telephones, pagers, PDAs, fax machines, digital still/video cameras, digital voice/video recorders, digital copiers/scanners, interactive television, hybrid combinations of any of the above-noted computing means and an interactive television (e.g., set-top boxes), and any other apparatus, which generally comprises a processor, memory, the capability to receive input, and the capability to generate output.

Such computing means typically include a real time clock ("RTC") for keeping track of the time and date. Likewise, operating systems and/or applications programs used in such computing means usually stamp the time and date (as derived from the RTC) that each of the digital data files is accessed, created, modified, received, or transmitted. Such stamping of digital data files with times and dates (collectively referred to as "time-stamping") has, thus, become an integral part of all of the above known computing environments.

Although the existing framework of time-stamping can be used to catalogue and sort one's own files, for other critical needs it suffers from two fatal flaws. Files are typically "time-stamped" with a value read from the RTC. There is no simple way of determining whether the RTC is set to the correct date and time. Indeed, it is quite trivial for a user to reset the RTC to any desirable date and time. Even if the computing means' RTC had been correctly set, nothing would prevent a user from arbitrarily changing the "time-stamps" themselves. This is readily accomplished through the direct manipulation of the digital data where the time-stamp is stored. As a consequence, changing such time stamps results in the creation of counterfeit data, because the time representation and the file content are not strongly bound to each other.

Thus, the known time-stamping framework is useless for any situation where the accuracy of the date or time of a digital data file is critical. Court filings, medical records, files presented as incriminating or exculpatory evidence in court cases, legal documents such as wills, billing records, patent, trademark, and copyright claims, and insurance documents are only a few of the areas where the date and time that is associated with the file is critical. Conventional systems and methods that time-stamp digital data files fail to meet this need. Furthermore, there is no "open", cross-platform, interoperable global standard in place to create trusted time-stamps.

Cryptographic Systems and Keys

One approach that has been used in the past to provide some level of security in digital data files is the use of cryptographic systems and keys. In general, cryptographic systems are used to encrypt or "lock" a digital data file. A key is used, conversely, to decrypt or "unlock" an encrypted digital data file. Digital data files are merely bits of data in memory or on a network. If this data is viewed as the mere representation of large numbers, then mathematical functions or algorithms can be easily applied to the data.

For example, where a particular digital data file is a text file, its unencrypted or "cleartext" version can be viewed as the variable x. The resulting function of this variable x, when encrypted by its associated cryptographic algorithm and coupled with its key k will be f (k, x). Accordingly, the encrypted text or "cyphertext" can be defined by the equation:

$$y = f(k, x).$$

By choosing the cryptographic algorithm carefully—such that there is no easily discovered inverse mapping (i.e., for any given y, it will be extremely difficult to calculate x without knowing k, while at the same time, with knowledge of k it will be possible)—the data may be encrypted.

Symmetric Cryptography

If the key for encryption and decryption is the same shared secret, then the cryptographic system and associated algorithm will be referred to as "symmetric". Both the sender and the receiver must share the key in such symmetric cryptographic systems. A sender first applies the encryption function using the key to the cleartext to produce the cyphertext, which is then sent to a receiver. The receiver applies the decryption function using the same shared key. Since the cleartext cannot be derived from the cyphertext without knowledge of the key, the cyphertext can be sent over public networks such as the Internet.

The current United States standard for symmetric cryptography, in which the same key is used for both encryption and decryption, is the Data Encryption Standard (DES), which is based upon a combination and permutation of shifts and exclusive ors. This approach can be fast, whether implemented directly on hardware (e.g., 1 GByte/sec throughput or better) or in general purpose processors. The current key size of 56 bits (plus 8 parity bits) is sufficient, yet somewhat small, but the growing use of larger keys with "triple DES" generate much greater security. Since the implementation of DES is fast, it can easily be pipelined with software codecs and not impact system performance.

An alternative and yet stronger form of symmetric block encryption is IDEA. Its security is based upon combining exclusive ors with addition and multiplication in modulo-16 arithmetic. The IDEA approach is also fast on general purpose processors. It is comparable in speed to known DES implementations. One major advantage of IDEA is its keys, which are 128 bits and are, thus, much stronger (i.e., harder to break) than standard 56-bit DES keys.

One particular problem with the use of such symmetric systems is the problem of getting the sender and the receiver to agree on the key without anyone else finding out. Moreover, the problem becomes greatly complicated when additional users (i.e., potential senders and receivers) are added to the system. Such symmetric cryptographic systems, nevertheless, are by far easier to implement and deploy than their asymmetric counterparts since they require far less infrastructure. Sometimes with a symmetric cryptographic system, however, keys are submitted over the network. Avoidance of this security risk would be desirable.

Asymmetric Cryptography

Systems that generate and employ a secure key pair (i.e., a "private key" for creating the "digital signature" and a "public key" to verify that digital signature) are typically known as asymmetric cryptographic systems. There are many known cryptographic algorithms (e.g., RSA, DSA, and Diffie Hellman) that involve a key pair. In such asymmetric cryptographic systems, the private key and the public key are mathematically linked. The private key can only decrypt anything that is encrypted by the public key. Conversely, the public key can only verify anything that is signed by the private key. Asymmetric cryptographic systems are, thus, inherently more secure than symmetric or shared secret systems. The sensitive private key need exist in only one place. No form of the private key is ever transmitted over the network. Typical asymmetric cryptographic systems also scale to many users more easily than shared secret systems. However, the infrastructure that is necessary to field systems of this type, commonly called a "Public Key Infrastructure" (PKI), is non-trivial to implement. See, e.g., RFC 1422, Privacy Enhancement for Internet Electronic Mail: Part II: Certificate-Based Key Management (February 1996), the contents of which are incorporated herein by reference.

Digital Signatures

Referring now to FIGS. 1 and 2, wherein like reference characters or numbers represent like or corresponding parts throughout each of the several views, an exemplary process 100 for creating a digital signature is shown in FIG. 1. To sign a document, or for that matter any other digital data file, a "signer" must first delimit the borders of the digital data file to be signed. As used herein, the term signer refers to any person who creates a digital signature for a message, such as message 110. The information delimited by the signer, in turn, refers to that message 110. A hash function 120 in the signer's software is used to compute a hash result 130, which is unique for all practical purposes to the message 110. Thereafter, a signing function 140 is used to transform the hash result 130 into a digital signature 160, but only after input of the signer's private key 150.

This transformation is sometimes referred to as a process of encryption. However, such a characterization would be inaccurate, because message 110 itself may, or may not be confidential. Confidentiality may be provided as an optional feature in most digital signature technologies, but the separate and distinct security service of confidentiality is not central to the security services of signer authentication, document authentication, or digital data file authentication. In any case, the resulting digital signature 160 is unique to both the message 110 and the private key 150, which is used to create the digital signature 160.

Typically, most digital signatures 160 (i.e., the digitally-signed hash result of message 110) are used in one of two ways. They may be attached to their associated message 110 and, thereafter, simply stored. In the alternative, they may be copied 170 and coupled with digital signature 160, in the form of a single data element 180 and, thereafter, transmitted 190 to a verifier.

This single data element 180 is, in some cases as will be described in greater detail herein below, referred to as a "digital certificate". Furthermore, the digital signature 160 may be simply transmitted or stored as a separate data element, so long as it maintains a reliable association with its message 110. Each digital signature 160 is unique to the specific message 110, which has been used to create it. Otherwise, it would be counterproductive if the digital signature 160 was wholly disassociated from that message 110.

An exemplary verification process 200 for verifying digital signature 160 is shown in FIG. 2. Element 180, comprising digital signature 160 attached to message 110, is first received 190 from the signer. A new hash result 220 of the original message 110 is then computed by the verifier by means of the same hash function 120 used to create the digital signature 160.

It should be noted at this juncture that use of the term "to verify" herein, with respect to any given digital signature, message, and public key, refers to those processes of accurately determining that: (1) the digital signature 160 was created during the "operational period" of a valid certificate 180 by the private key 150 corresponding to the public key 260 listed in the certificate 180; and (2) the message 110 had not been altered since its digital signature 160 was created.

It should also be noted at this juncture that use of the term "operational period" herein refers to a period that begins on a date and time a certificate 180 is issued by a "certification authority", or on a later date and time certain if stated in the certificate 180, and ends on a date and time it expires or is earlier revoked or suspended.

Then, by use of the public key 260 and such new hash result 220, the verifier can check: (1) whether the digital signature 160 was created using the signer's private key 150; and (2) whether the newly computed hash result 220 matches the original hash result 130, which was transformed into the digital signature 160 during the signing process.

Most known verification software will confirm the digital signature 160 as "verified" if two conditions are satisfied. One condition will be satisfied if the signer's private key 150 was used to digitally sign the message 110. This condition will be met if the signer's public key 26Q was used to verify the digital signature 160, because the signer's public key 260 is capable of verifying only a digital signature 160 that is created with the signer's private key 150. The other condition will be satisfied if message 110 was received unaltered. This condition will be met if the hash result 220 that is computed by the verifier turns out to be identical to the hash result 130 that is extracted from digital signature 160 during the verification process. A verifier function 240 is used to make these comparisons, while further processing of the message 110 is dependent upon whether message 110 is determined to be valid at step 280.

The term "digital certificate" as used herein generally refers to any message, which at least (1) identifies the certification authority (CA) issuing it; (2) names or identifies its "subscriber"; (3) contains the subscriber's public key; (4) identifies its operational period; and (5) is digitally signed by the CA issuing it. Metaphorically, digital certificates serve as electronic substitutes for a sealed envelope or a signer's signature. In one case, for example, VeriSign Digital ID™ (a trademark of VeriSign, Inc., Mountain View, Calif.) securely resides in a signer's Internet browser or e-mail software, and enables that signer to digitally sign and encrypt e-mail. Digital certificates can also be viewed as electronic equivalents of a driver's license or a passport. Containing information that uniquely identifies the signer, the digital certificate allows the signer to: (1) digitally sign a message so the recipient knows that a message actually originated from the signer; and (2) encrypt a message so the intended recipient can decrypt and read its contents and attachments. Most digital certificates are easy to use, with point-and-click interfaces in all of the popular browsers and e-mail packages. A person seeking to verify a digital signature needs, at a minimum, (1) the public key corresponding to the private key used to create the digital signature, and (2) reliable evidence that the public key (and thus the corresponding private key of the key pair) is identified with the signer. The basic purpose of the digital certificate is to serve both these needs in a reliable manner.

Dual Signatures

As noted herein above, digital signatures and digital certificates have both been used in the past to provide some level of certainty as to the identity of a particular person accessing, creating, modifying, receiving, or transmitting a digital data file. E-commerce presents other challenges for securing digital data files. In particular, the process of providing secure electronic transactions has raised the concerns for maintaining a person's privacy. An approach that has been used in the past to provide such security is known as "dual signatures", and is illustrated below.

User B wants to send User A an offer to purchase a piece of property that User A owns and an authorization to his bank to transfer the money if User A accepts the offer. Nevertheless, User B does not want the bank to see the terms of his outstanding offer to User A, nor does he want User A to see his bank account information. User B also wants to link his offer to the transfer such that the money will only be transferred if User A accepts his offer. According to the SET Secure Electronic Transaction Specification, User B accomplishes all of this by digitally signing both messages with a single signature operation that creates a dual signature.

Such a dual signature is generated in four steps. First, a message digest is created for both messages sent by User B (i.e., one to User A, and one to the bank). The resulting pair of message digests is then concatenated together. Next, a message digest of the concatenated result is created. This third message digest is finally encrypted with the User B's private signature key. User B must include the message digest of the other message in order for a recipient to verify his dual signature. The recipient of either message can check then its authenticity by generating the message digest on its copy of the message, concatenating it with the message digest of the other message (as provided by the User B), and thereafter computing the message digest of the result. If the newly generated digest matches the decrypted dual signature, the recipient can trust the authenticity of the message.

In the event that User A accepts User B's offer; she sends a message to the bank indicating her acceptance and including the message digest of the offer. The bank can verify the authenticity of User B's transfer authorization, and ensure that the acceptance is for the same offer by using its digest of the authorization and the message digest presented by User A of the offer to validate the dual signature. On the one hand, the bank can therefore check the authenticity of the offer against the dual signature. It cannot, on the other hand, see the terms of the offer.

Further details regarding such known processes may be found in the SET Secure Electronic Transaction Specification, Book 1: Business Description (Version 1.0), May 31, 1997, the contents of which are incorporated herein by reference. See also Book 2 (Programmer's Guide) and Book 3 (Formal Protocol Definition) of the SET Secure Electronic Transaction Specification, as well as the External Interface Guide to SET Secure Electronic Transaction, Sep. 24, 1997, each of which is incorporated herein by reference.

As is best illustrated by reference to FIG. 3, the process of creating such dual signatures will now be described in greater detail. User A runs the property description 305 through a one-way algorithm 310 to produce a unique value known as the message digest 315. This is a kind of digital fingerprint of the property description 305, and will be used later to test the integrity of the message. She then encrypts the message digest 315 with her private signature key 320 to produce her digital signature 325. Next, she generates a random symmetric key 330 and uses it to encrypt the combination of the property description 305, her signature 325 and a copy of her certificate 335 containing her public signature key 340 (collectively referred to as the message 345).

To decrypt the property description 305, user B will require a secure copy of this random symmetric key 330. User B's certificate 350, which user A must have obtained prior to initiating secure communication with him, contains a copy of his public key-exchange key 355. To ensure secure transmission of the symmetric key 330, user A encrypts it first using user B's public key-exchange key 350. The encrypted key, referred to as the digital envelope 360, will then be sent to user B along with the encrypted message 345 itself.

Likewise, the decryption process consists of the following steps. User B receives the message 345 from user A and decrypts the digital envelope 360 with his private key-exchange key 365 to retrieve the symmetric key 330. He uses the symmetric key 330 to decrypt the property description 305, user A's signature 325, and her certificate 335. He decrypts user A's digital signature 325 with her public signature key 340, which he acquires from her certificate 335. This recovers the original message digest 315 of the property description 305. He runs the property description 305 through the same one-way algorithm 310 used by user A and produces a new message digest 370 of the decrypted property description 305. Finally, he compares his message digest 370 to the one 315 obtained by use of user A's public signature key 340 contained within her digital signature 325. If both digests 315, 370 are exactly the same, user B then confirms that the message content has not been altered during transmission and that it was signed using user A's private signature key 320. On the other hand, if digests 315, 370 are not the same, then message 305 either originated somewhere else or was altered after it was signed. User B could then elect to take some appropriate action, such as notifying user A or discarding the message 305.

Digital Time-Stamps

A digital time-stamping service (DTS) issues time-stamps, which associate a date and time with a digital document in a cryptographically strong way. The digital time-stamp can be used at a later date to prove that an electronic document existed at the time stated on its time-stamp. For example, a physicist who has a brilliant idea can write about it with a word processor and have the document time-stamped. The time-stamp and document together can later prove that the scientist deserves the Nobel Prize, even though an arch rival may have been the first to publish.

The manner in which such conventional time-stamping systems work is illustrated in FIG. 4. Hypothetically, a user at a computing means 400 signs a document and wants it time-stamped. The user first computes a message digest 420 of the document using a secure hash function, and second sends the message digest 420 (but not the document itself to the DTS 440. The DTS 440 sends the user in return a digital time-stamp 460 consisting of the message digest, the date and time it was received at the DTS 440, and the signature 480 of the DTS 440. Since the message digest 420 does not reveal any information about the content of the document, the DTS 440 cannot eavesdrop on the documents it time-stamps. Thereafter, the user can ostensibly present the document and time-stamp 460 together to prove when the document was written. A verifier then computes the message digest 420 of the document, makes sure it matches the digest in the time-stamp 460, and verifies the signature 480 of the DTS 440 on the time-stamp 460.

To be reliable, the time-stamps must not be forgeable. The DTS 440 itself must have a long key if the time-stamps are to be reliable for long periods of time (e.g., several decades). Moreover, the private key of the DTS 440 must be stored with utmost security, as in a tamperproof box. The date and time must come from a clock, also inside the tamperproof box, which cannot be reset and which will keep accurate time for years or perhaps for decades. It must also be infeasible to create time-stamps without using the apparatus in the tamperproof box.

All of the above requirements greatly complicate the process of obtaining legally sufficient proof of the date and time a digital data file was accessed, created, modified, or transmitted. In fact, time-stamping a document in the manner described above only certifies the date and time that the message digest 420 was received by the DTS. It provides no proof of the date and time that the document was accessed, created, modified, or transmitted. Moreover, because the DTS is located remotely relative to the user, there is no reliable way to provide a digital time-stamp locally at the user's site.

One cryptographically-strong DTS, first implemented by Bell Communications Research, Inc. (also known as "Bellcore"), only uses software and avoids many of the requirements just described such as tamperproof hardware. It essentially combines hash values of documents into data structures known as binary trees. The "root" values of such binary trees are then periodically published in the newspaper. In these Bellcore systems, the time-stamp consists of a set of hash values, which allow a verifier to recompute the root of the tree. Since the hash functions are one-way, the set of validating hash values cannot be forged. The time associated with the document by the time-stamp is the date of publication.

The following Bellcore patents are illustrative of the above-described approach: U.S. Pat. No. 5,136,646, for "Digital Document Time-Stamping With Catenate Certificate" (Haber et al.); U.S. Pat. No. 5,136,647, for a "Method for Secure Time-Stamping of Digital Documents" (Haber et al.); U.S. Pat. No. 5,373,561, for a "Method for Secure Time-Stamping of Digital Documents" (Haber et al.); and U.S. Pat. No. Re. 34,954, which is the reissue of the '647 patent noted above and is, likewise, directed to a "Method for Secure Time-Stamping of Digital Documents" (Haber et al.). Other patents which are illustrative of similar such approaches are U.S. Pat. No. 5,748,738, for a "System and Method for Electronic Transmission, Storage and Retrieval of Authenticated Documents" (Bisbee et al.), which is assigned to Document Authentications Systems, Inc.; and U.S. Pat. No. 5,781,629, for a "Digital Document Authentication System" (Haber et al.), which is assigned to Surety Technologies, Inc. The contents of each of the above patents are incorporated herein by reference.

While each of the above approaches uses software and avoids many of the requirements for tamperproof hardware, they still require a trusted source at a remote location. None of the patents listed above teach or suggest any system or method that is capable of providing a trustworthy time-stamp at the precise location where the user's digital data files are accessed, created, modified, or transmitted. Moreover, all of the methods described in the patents listed above still leave open the possibility that two individuals may collude to falsely state the value of a hash.

Undetected alterations may still be made with appropriate cryptographic techniques. For example, one may alter a document as desired and then make other suppressed changes, such as a carriage return followed by a space-up command. Both original document and altered document may, therefore, have the same hash value. See, for example, B. Schneier, Applied Cryptography, Chapter 3.8, "Timestamping Services", pages 61-65 (John Wiley & Sons, Inc. 1994), the contents of which are incorporated herein by reference.

One approach seeking to avoid such possibilities is described in U.S. Pat. No. 5,781,630 (Huber et al.), which discloses a system including a cryptomodule that is coupled to a computer. A cryptomodule in accordance with the Huber at al. patent includes a processor; an interface coupling the processor to the computer; and memory containing algorithms and constants for three purposes: (1) encoding a document, (2) generating a digital signature to be appended, attached, connected, or coupled to the document, and (3) producing a time-stamp to be inserted into the document. The cryptomodule also includes a pair of clocks, one of which is a radio clock and the other of which is a "non-adjustable" quartz clock.

This system according to the '630 patent depends on a comparison of the two clocks before inserting a time-stamp into the document. That is, the time that the document was created, edited, received, or transmitted is retrieved from both clocks and compared. Any discrepancy between the times retrieved is then determined. If, and only if, those discrepancies are sufficiently small, will a time-stamp based on the radio clock be inserted into the document and the document then encoded.

Another approach, which seeks to avoid problems of collusion and/or fraud, is described in U.S. Pat. No. 5,619,571 (Sandstrom et al.). Briefly summarized, Sandstrom et al. discloses an improved method of storing or retrieving electronic records, particularly those in the form of image streams (e.g., TIFF). An image identification code, time data provided by a trusted source, and a password are combined to generate a key. The image identification code and time data are stored in a public directory associated with the image data stream. Attributes of the image stream (e.g., its size and a hash of at least a segment of the image data) are also determined. The attributes are then used to generated a verification code. Subsequently, the verification code is first positioned within a private area associated with the data image stream, and then the private area is encrypted with the previously generated key.

This approach, however, suffers from two obvious disadvantages. Not only is it limited to image file formats having public and private areas, but it is also still dependent on a remote source for the time-stamp and the image identification code. It would be much more desirable to provide systems and methods of time-stamping digital data files locally and without the continuing reliance on a remote trusted source.

Still another approach to provide authenticated documents, with an authenticated time code, is described in U.S. Pat. No. 5,189,700 (Blandford). Blandford's device includes an RTC and an encryption means, which are together sealed in a tamperproof package. Powered by a battery that is located outside the tamperproof package, the RTC is used either, (1) to supplant the system clock of a computer, such that the computer cannot be booted up with an incorrect time; or (2) to provide an encrypted authentication code of time. Such time code is derived from a time retrieved from the RTC, which is combined with a device identification number. A secret key contained within the encryption means then encrypts the combination.

While devices according to Blandford, in fact, meet the objective of providing a local source of trusted time, they nevertheless suffer from two major disadvantages. Both disadvantages arise out of the design requirements of such devices. First, Blandford requires the RTC to override the computer's system clock on boot up. It would be much more desirable to avoid changing system settings in the computer, particularly the setting of its system clock. Second, Blandford requires that the RTC be powered by a source (i.e., the battery) outside of the tamperproof package. This, it is suggested, is critical to assuring several objectives: (1) ensuring that the RTC cannot be reset, or it can be reset only under strict procedures; (2) allowing the battery to be replaced in the power-up state without affecting the RTC; and (3) disabling the device, and potentially even the computer, in the event that power from the source failed. Obviously, it would be much more desirable to avoid such inconveniences.

SUMMARY OF THE INVENTION

It is, therefore, a general object of the present invention to provide novel systems, apparatus, and methods of preventing fraud in digital data files, and for enabling trusted devices which share certain date and time information in embodiments of the present invention which distribute trusted time. More specifically, it is a particular object of this invention to provide systems, apparatus, methods, and articles of manufacture for providing and maintaining the integrity of digital data files. Another more particular object of the present invention is to provide such systems, apparatus, methods, and articles of manufacture for time-stamping digital data files, which do not continually rely only on a single and static external source of trusted time. Rather, according to embodiments of the present invention, the trusted time source may provide additional trusted time source partners, which are in close proximity or far removed from the requesting device, such that the requesting device may obtain trusted time from one or more of these devices.

In accordance with one important aspect of the present invention, the systems and methods are directed to computing means. Non-limiting examples of such "computing means" include any: general purpose computer; mainframe; PC; web browser; e-mail client; e-mail server; network file or messaging server; Internet appliance; wireless telephone; pager; personal digital assistant (PDA); fax machine; digital still or video camera; digital voice or video recorder; digital copier or scanner; interactive television; hybrid combination of any of the above computing means and an interactive television; or any other apparatus comprising a processor, memory, the capability to receive input, and the capability to generate output.

The apparatus of the invention also includes computing means programmed with software to operate the computing means in accordance with the invention. Non-limiting examples of such "computing means" in this regard include general purpose computers and personal computers of both client and server variety. Specific, non-limiting examples of such "computing means" in this regard likewise include any: web browser; e-mail client; e-mail server; network file or messaging server; Internet appliance; wireless telephone; pager; personal digital assistant (PDA); fax machine; digital still or video camera; digital voice or video recorder; digital copier or scanner; interactive television; hybrid combination of any of the above computing means and an interactive television; or any other apparatus comprising a processor, memory, the capability to receive input, and the capability to generate output.

According to another important aspect of the present invention, the article of manufacture disclosed herein comprises a computer-readable medium embodying code segments to control a computer to perform the invention. Non-limiting examples of such "computer-readable medium" in this regard include any: magnetic hard disk; floppy disk; optical disk, (e.g., a CD-ROM, a CD-R, a CD-RW, or any disk compliant with known DVD standards); magneto-optical disk; magnetic tape; memory chip; carrier wave used to carry computer-readable electronic data, such as are used in transmitting and receiving e-mail or in accessing a network, including the Internet, intranets, extranets, virtual private networks (VPN), local area networks (LAN), and wide area networks (WAN); or any other storage device used for storing data accessible by a computer. Non-limiting examples of "code segments" include not only source code segments and object code segments, but also computer programs in any language, instructions, objects, software, or any means for controlling a computer.

The above and other objects and aspects according to the present invention are provided by a computing system and methods for providing and distributing dates and times of digital data files, which generally includes a means for accessing at least one trusted time source, means for saving the file at a moment in time, means for retrieving from the trusted time source a date and a time corresponding to the moment in time, means for appending the date and the time retrieved from the trusted time source to the saved file, means for signing the saved file with the date and the time retrieved from the trusted time source appended, attached, connected, or coupled thereto, means for hashing the signed file to produce a digest, means for signing the digest with a key to produce a certificate, means for appending the certificate to the saved file, and means for saving the file with the certificate appended, attached, connected, or coupled thereto. All of the foregoing means may be sealed together within a tamper-proof environment.

BRIEF DESCRIPTION OF THE DRAWINGS

The accompanying drawings, which are incorporated herein and form part of the specification, illustrate embodiments of the present invention and, together with the description, further serve to explain the principles of embodiments of the invention.

FIG. 14 illustrates a command control structure of flash data integrator (FDI) code useful in another more specific embodiment of the present invention.

FIG. 15 shows the types of parameters and streams used according to the embodiment shown in FIG. 14.

FIG. 16 illustrates the principle of only one data-stream being opened at a time according to the embodiment shown in FIGS. 14 and 15.

FIGS. 21($a$) through 21($d$) show various sectors of the compound file binary format for a Flashpix embodiment according to the present invention.

It should be understood that these figures depict embodiments of the invention. Variations of these embodiments will be apparent to persons skilled in the relevant art(s) based on the teachings contained herein. For example, the flow charts contained in these figures depict particular operational flows. However, the functions and steps contained in these flow charts can be performed in other sequences, as will be apparent to persons skilled in the relevant art(s) based on the teachings contained herein.

DETAILED DESCRIPTION OF THE INVENTION

Figure 1:
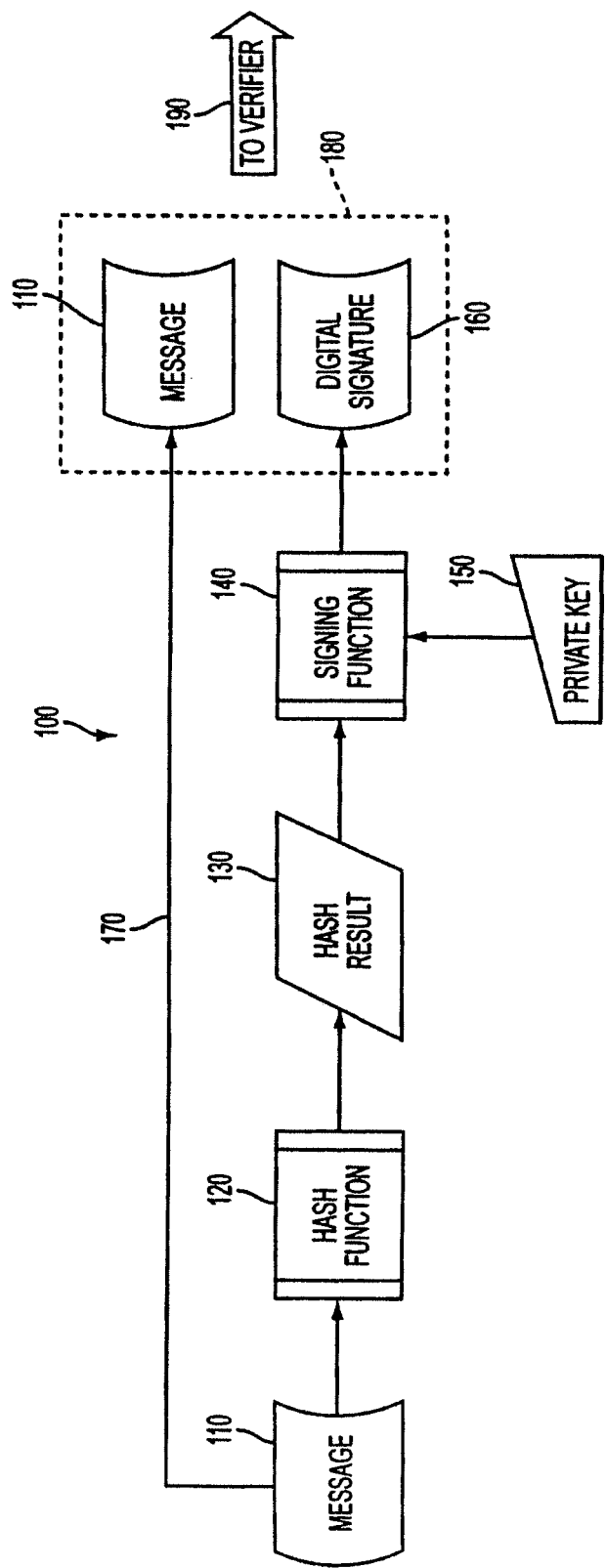
FIG. 1 is a block diagram, which illustrates one conventional process for creating a digital signature.
Figure 2:
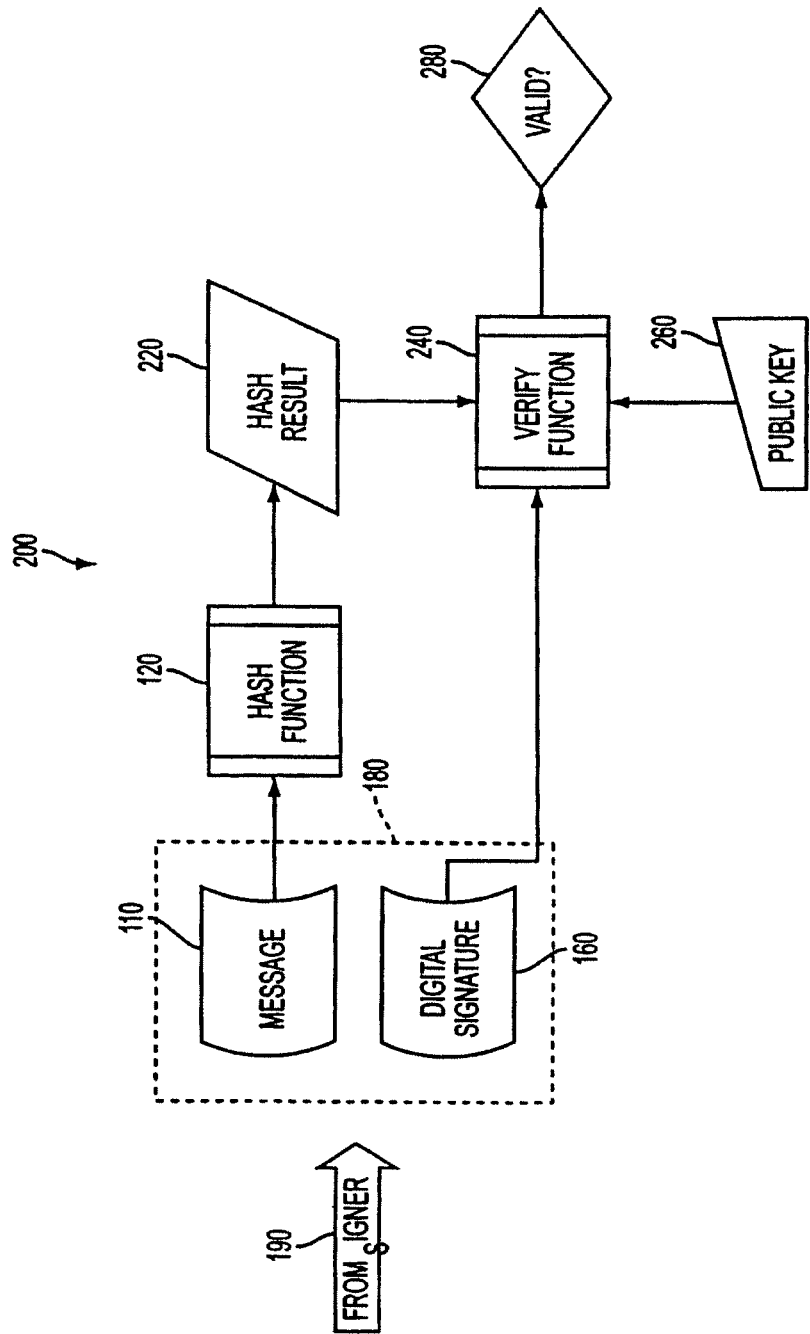
FIG. 2 is a block diagram, which illustrates another conventional process for verifying the digital signature created by the process shown in FIG. 1.
Figure 3:
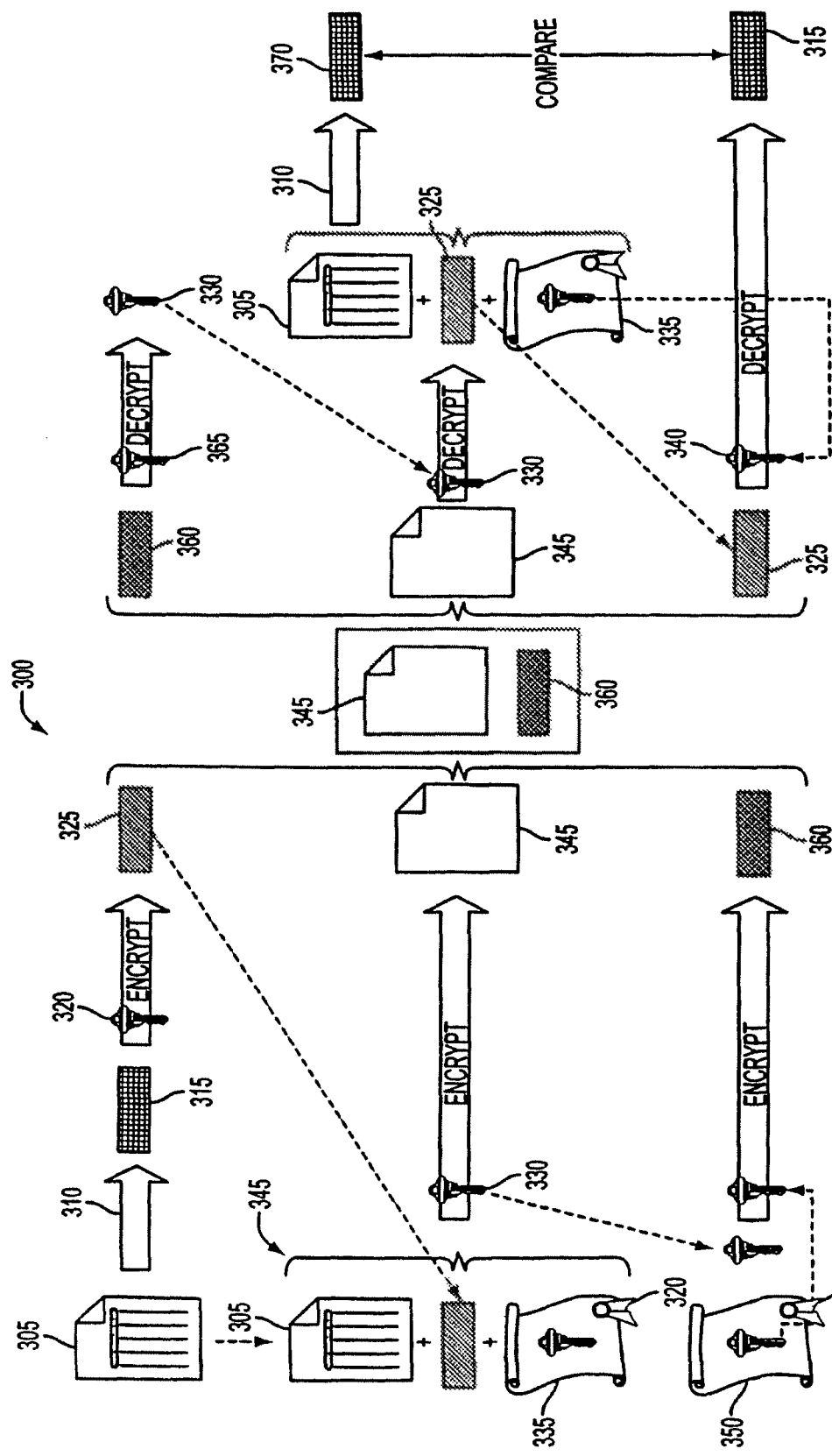
FIG. 3 is a block diagram, which illustrates yet another conventional process of using dual signatures to maintain privacy in secure electronic transactions.
Figure 4:
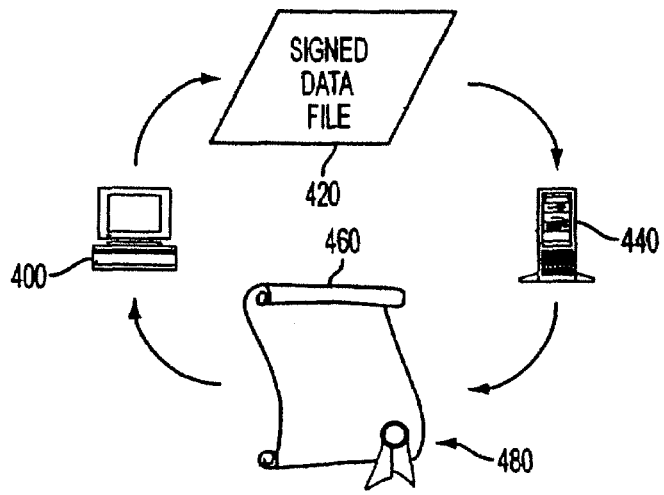
FIG. 4 is a block diagram, which illustrates a conventional digital time-stamping service.
Figure 5:
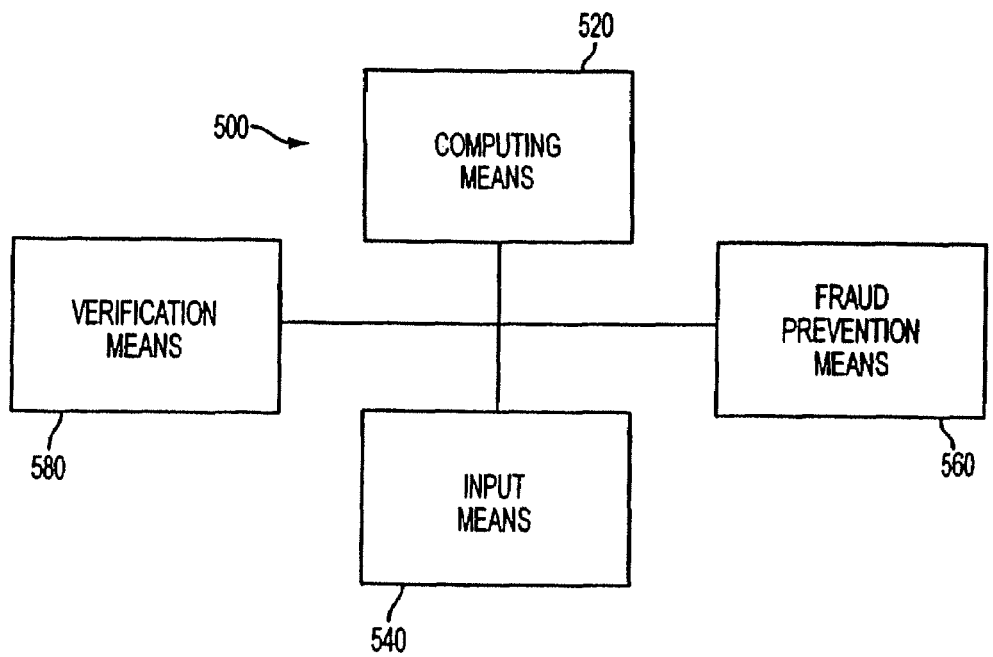
FIG. 5 is a block diagram, which generally illustrates the system according to the present invention.

A system 500 according to the present invention is shown generally in FIG. 5. System 500 suitably comprises a computing means 520, an input means 540, and a fraud prevention means 560, each of which is operatively coupled together. Computing means 520 more specifically comprises a general-purpose computer, such as a personal computer (PC). Input means 540 more specifically comprises any conventional means of inputting digital data to a PC such as a keyboard, a mouse, a touchpad, etc.

Suitable such keyboards include those of the type manufactured by Key Tronic Corporation, Spokane, Wash., U.S.A., and sold under the trademark Lifetime™. These include the Lifetime Classic™, a standard 104-key keyboard adapted for use with PS/2 or AT-style keyboard ports; the Lifetime Classic Wireless™, a battery-operated standard keyboard adapted for use with PS/2 or AT-style keyboard ports through infrared means; the Lifetime Trackball™ and Lifetime Trackball Wireless™, both of which are standard keyboards with an integrated trackball mechanism; and, the Lifetime Touchpad™ and Lifetime Touchpad WirelessT™, both of which are standard keyboards having an integrated touchpad.

Other suitable input means 540 include those of the type manufactured by Interlink Electronics, Camarillo, Calif., U.S.A., which employ VersaPad® and VersaPoint® technologies. These include the Model VP9000 ePad™, a semiconductive touchpad and pen input pad that combines the functionalities of a PC touchpad pointing device and a WinTab-compatible graphics digitizer tablet; the DeskStick™ stationary desktop mouse; the RemotePointPLUS™ cordless, programmable mouse; and the FreedomWriterPRO™, a wireless, "all in one" PC input device that replaces pen, mouse, and keyboard for Internet conferencing, group meetings and presentations.

Computing means 520 and input means 540 together, thus, provide a system for creating a digital data file (not shown in FIG. 5). The digital data file is initially created by the computing means 520, either: (1) by entry of data through the input means 540; or, (2) storage of data in the computing means 520. Such storage of data in the computing means 520 may be accomplished through any number of conventional avenues (e.g., e-mail, downloading the digital data file from an Internet website, ftp transfers, and transfers by way of removable media, such as magnetic media including floppy disks, "Super Disks", Clik!™, Zip™ and Jaz™ disks (all of which are trademarks of Iomega Corporation, Roy, Utah, U.S.A.); optical media, such as CD-ROM, CD-R, CD-RW and DVD; magneto-optical media, etc.).

In the event that a user (not shown) of the computing means 520 locally creates the digital data file, such digital data file would subsequently be saved at a moment in time. Fraud prevention means 560 is used, according to a particularly important aspect of the present invention, to secure the digital data file by maintaining its integrity in the following manner. An unalterable time-stamp is affixed to the digital data file by fraud prevention means 560 by way of computing means 520. Such a time-stamp may thereafter be used to confirm the date and time associated with any access, creation, modification, receipt, or transmission of the digital data file.

Figure 6:
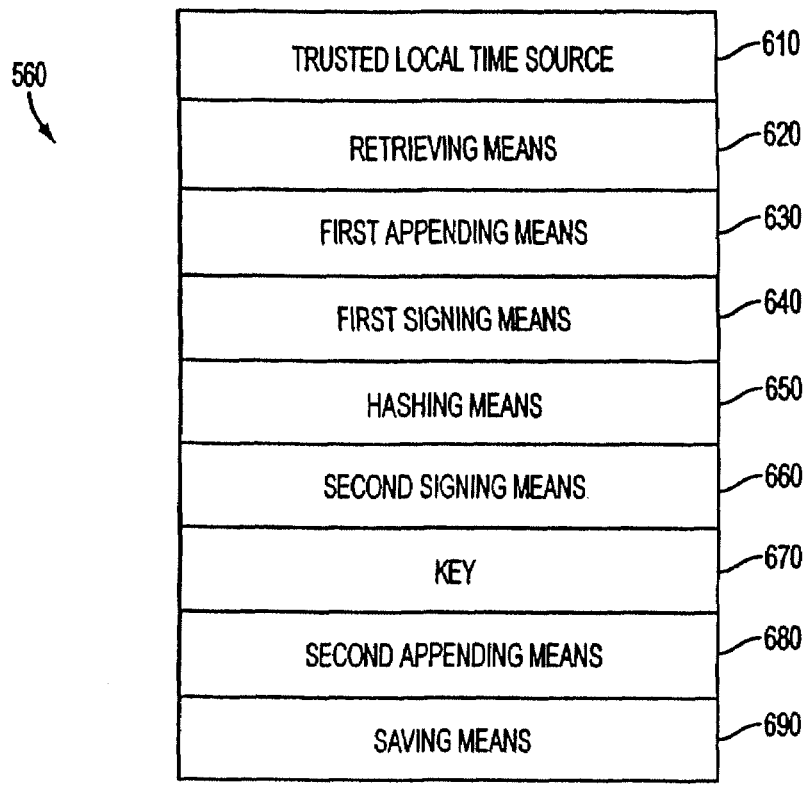
FIG. 6 is a block diagram, which more specifically illustrates the system shown in FIG. 5.

Several embodiments of the present invention will now be described herein after in greater detail with reference to FIGS. 7-10. However, as shown in FIG. 6, fraud prevention means 560 generally comprises a trusted local time source 610, means 620 for retrieving from that local time source 610 a date and a time corresponding to the moment in time that the digital data file was accessed, created, modified, received, or transmitted; means 630 for appending the date and the time retrieved from the trusted time source 610 to the saved digital data file; means 640 for signing the saved digital data file with the date and the time retrieved from the trusted time source 610 appended, attached, connected, or coupled thereto; means 650 for hashing the signed digital data file to produce a digest; means 660 for signing the digest with a key 670 to produce a certificate; means 680 for appending the certificate to the saved digital data file; and means 690 for saving the digital data file with the certificate appended, attached, connected, or coupled thereto.

Figure 7:
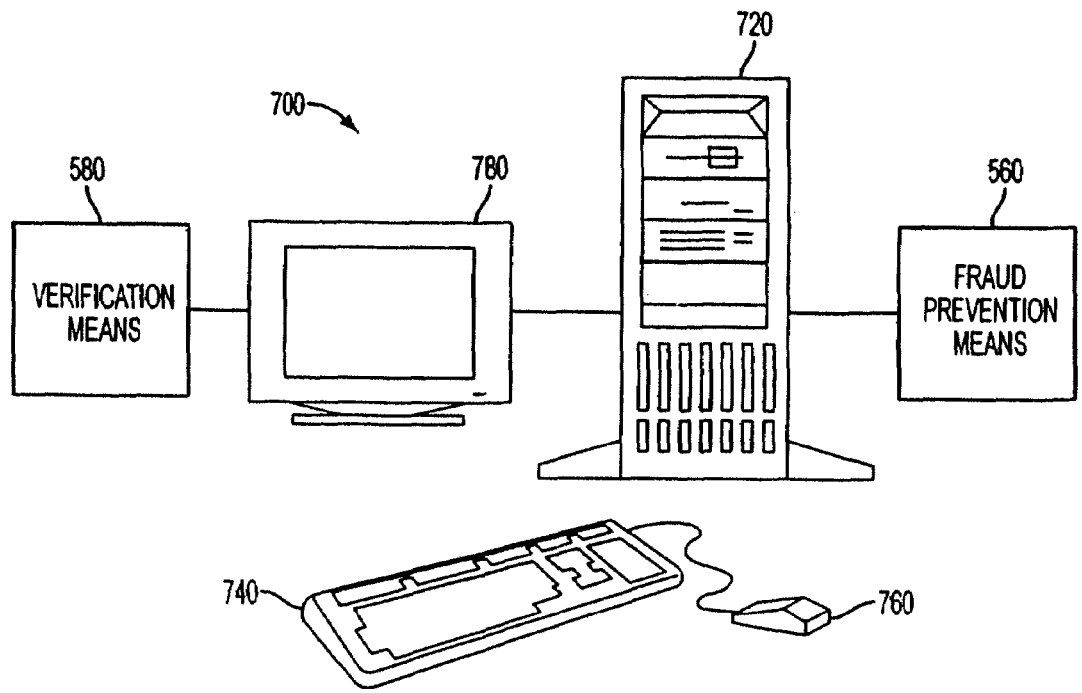
FIG. 7 is a block diagram of an embodiment of the PC system according to the present invention.

Referring now to FIG. 7, a block diagram of a presently preferred embodiment of the PC system 700 according to the present invention is shown. System 700 generally comprises a server 720, having a keyboard 740 and mouse 760 attached thereto for inputting digital data into the server 720, fraud prevention means 560 for proving with certainty the dates and times that digital data files contained within the server 720 were accessed, created, modified, stored, or transmitted, and a monitor 780 for displaying such files. As an option, server 720 may include verification means 580, which are adapted to verify the authenticity of a date and time-stamp affixed to such digital data files.

Figure 8:
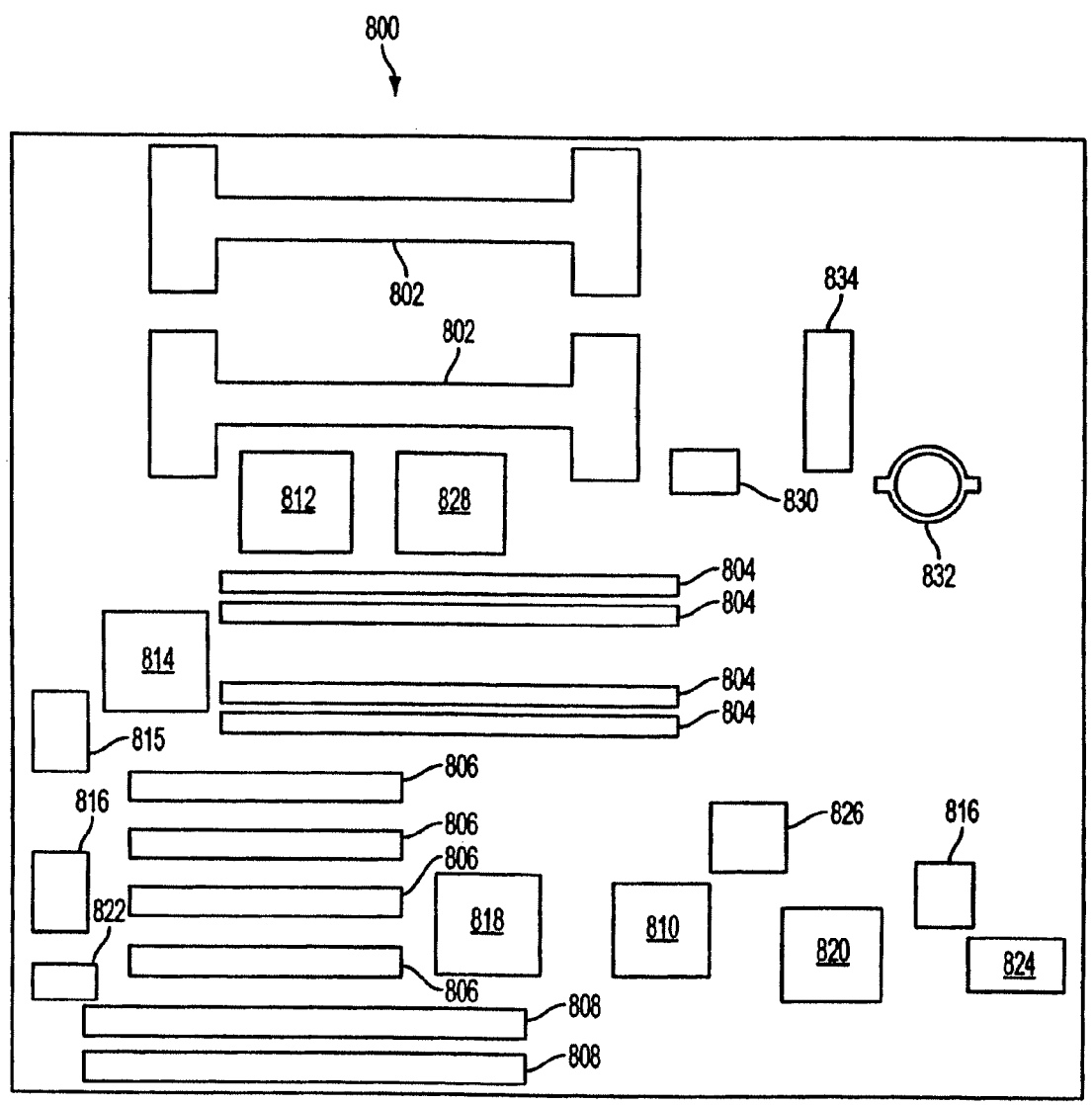
FIG. 8 illustrates in greater detail one embodiment of the fraud prevention means shown in FIGS. 6 and 7.

According to one presently preferred embodiment of this invention, the fraud prevention means 560 is contained within the server 720 in the form of its motherboard 800 (FIG. 8). One such motherboard 800 is manufactured by Intel Corporation, Santa Clara, Calif. U.S.A., under the model name "N440BX Server". Motherboard 800 is a flat "baseboard" design and features a dual Pentium® II processor-based server system that provides a high-performance platform optimized for 100 MHz system bus operation. Thus, motherboard 800 is equivalently embodied as baseboard 800, as described in detail below.

Baseboard 800 utilizes a conventional Intel 440BX PCIset to maximize system performance for 32-bit application software and operating systems. Its high performance is due, in large part, to a 100 MHz processor/memory architecture, which is complemented with an array of other features. Through the use of dual processors, PC system 700 is adapted to be fully MPS 1.4-compliant, with appropriate Slot 1 Pentium II processor extensions. Additionally, support can be provided for MP operating systems that may not be fully MPS 1.4-compliant. The following provides an overview of the baseboard 800. However, further details regarding baseboard 800, as well as its assembly, operation, and maintenance may be found in the "Enterprise Server Group Intel N440BX Server Technical Product Specification (Version 1.0), Order Number: 243701-001 (February, 1998), available from Intel Corporation, Santa Clara, Calif. U.S.A., which is incorporated herein by reference.

Baseboard 800 is optimized to function only with the Pentium II processor SEC cartridges (not shown). Nevertheless, it should be understood that other suitable motherboard and baseboard designs may be used according to the present invention. The Pentium II processor core/L1 cache appears on one side of a pre-assembled printed circuit board, approximately 2.5"×5" in size, with the L2 cache on the backside. The L2 cache and processor core/L1 cache communicate with each other using a private bus isolated from the processor host bus. This Pentium II processor L2 cache bus operates at half of the processor core frequency. Initially, only caching of 512 MB of main memory is supported. All accesses above 512 MB are not cached, and result in slower accesses to the memory in that range.

The Pentium II processor package follows the Single Edge Contact (SEC) cartridge form factor, which is adapted to be inserted within respective "Slot 1" connectors 802 and provides a thermal plate for heat sink attachment with a plastic cover located opposite the thermal plate. Each processor contains a local APIC section for interrupt handling. When two processors are installed, the pair must be of identical revision, core voltage, and bus/core speeds. If only one processor is installed, the other Slot 1 connector 802 must have a terminator card (not shown) installed.

Baseboard 800 facilitates two embedded VRM 8.1-compliant voltage regulators (i.e., DC-to-DC converters) to provide VCCP to each of the Pentium II processors. One VRM is powered from the 5V supply and the other by the 12V supply. Each VRM automatically determines the proper output voltage as required by each processor.

The baseboard 800 only supports 100 MHz, PC/100-compliant SDRAM DIMMs. However, other motherboards and baseboards according to the present invention may support of types of memory. Both registered and unbuffered types of memory devices on such DIMMs are supported. Baseboard 800 provides four DIMM sites 804. While ECC (72-bit) DIMMs are presently preferred for use with the baseboard 800, other memory alternatives may be employed.

A PIIX4 820 provides a local IMB interface to SDRAM DIMM information, SDRAM clock buffer control, and processor core speed configuration. The BIOS code uses this interface during auto-configuration of the processor/memory subsystem, as part of the overall server management scheme.

The primary I/O bus for the baseboard 800 is PCI-compliant with Revision 2.1 of the PCI (i.e., Personal Computer Interface) Specification, which is incorporated herein by reference. The PCI bus on the baseboard 800 supports embedded SCSI, network control, video, and a multi-function device that provides a PCI-to-ISA bridge, bus master IDE controller, Universal Serial Bus (USB) controller, and power management controller. The PCI bus also supports four slots 806 for full-length PCI add-in cards, one of which is shared with one of two ISA slots 808.

An embedded SCSI controller 810 on the baseboard 800 preferably comprises a Symbios SYM53C876 dual function controller. Further details regarding this device may be found in the "SYM53C876/876E PCI-Dual Channel SCSI Multi-Function Controller" data manual, Ver. 2.0 (November 1997), published by Symbios Logic Inc. (now owned by LSI Logic Corporation, Milpitas, California, U.S.A.). As is known, this device provides both Ultra wide and legacy narrow SCSI interfaces as two independent PCI functions. It should be noted, furthermore, that both of the PIIX4 820 and SCSI controller 810 are "multi-function" PCI devices that provide separate sets of configuration registers for each function, while sharing a single PCI hardware connection. Further details of such multi-function devices may be found in the PCI Specification.

A network interface 812 on baseboard 800 is implemented using an Intel 82558 to provide a 10/100 Mbit Ethernet interface supporting 10baseT and 10baseTX, integrated with an RJ45 physical interface. This network interface 812 also provides "Wake-On-LAN" functionality if the power supply supports a minimum of 800 mA of 5V standby current, which is configurable via baseboard jumper.

An embedded SVGA-compatible video controller 814 is also provided on baseboard 800. It preferably comprises a CL-GD5480 64-bit SGRAM GUI Accelerator, manufactured by Cirrus Logic, Inc., Fremont, Calif., U.S.A. Further details regarding such accelerators may be found in the "CL-GD5480 Advance Data Book, Ver. 1.0 (November 1996), which is incorporated herein by reference. The SVGA subsystem also contains 2 MB of SGRAM (i.e., synchronous graphics RAM) 815, which is typically provided as a factory build option and is not upgradeable.

Baseboard 800 contains a full-featured ISA I/O subsystem with two full length ISA slots 808 (one shared with a PCI slot 806), and local ISA bus interface to embedded Super I/O, I/O APIC, Flash BIOS, Basic Utility Device (BUD), and server management features. Compatibility I/O on the baseboard 800 is most preferably implemented using a PC87309VLJ chip 818, manufactured by National Semiconductor Corporation, Santa Clara, Calif., U.S.A. This chip 818 integrates a floppy disk controller, keyboard and mouse controller, two enhanced UARTs, full IEEE 1284 parallel port, and support for power management. It also provides separate configuration register sets for each supported function. Connectors are provided for all compatibility I/O devices.

The baseboard 800 also incorporates an Intel S82093AA Advanced Programmable Interrupt Controller 816 to handle interrupts in accordance with Multiprocessor Specification 1.4. The BIOS for baseboard 800 suitably resides in an Intel 28F008S5 FlashFile™ 8 Mbit, symmetrically blocked (64 KB) flash device 822. Baseboard 800 also incorporates a Dallas 82CH10 micro-controller as baseboard management controller (BMC) 824. The BMC 824 controls and monitors server management features on the baseboard, and provides the ISA interface to two independent IMB-based serial buses. On the baseboard 800, all functions of the former Front Panel Controller (FPC) and the Processor Board Controller (PBC) are integrated into the BMC 824. This includes power supply on/off control, hard reset control, video blanking, watchdog timers, Fault Resilient Booting (FRB) functionality, and all temperature, voltage, fan and chassis intrusion monitoring. BMC 824 can be polled for current status, or configured to automatically send an alert message when an error condition is detected either manually or by software.

In addition, the baseboard 800 preferably provides a server management feature known as EMP (Emergency Management Port). This allows, when using an external modem, remote reset, power up/down control, and access to the event log, or run-time information. This port also supports console redirection and with additional software support, the EMP can also be used to download firmware and BIOS upgrades in future upgrades.

The baseboard 800 provides a Basic Utility Device (BUD) 826 for ISA and PCI interrupt routing, SMI/NMI routing, and PCI arbitration expansion. Preferably, the BUD 826 comprises a 7128 CPLD, manufactured by Altera Corporation, San Jose, Calif., U.S.A. Other features formerly handled by an external CPLD on previous servers, such as the host ISA interface to server management functions, now appear in the BMC 824.

The termination circuitry required by the Pentium II processor bus (GTL+) signaling environment and the circuitry to set the GTL+ reference voltage, are implemented directly on the SEC cartridges (not shown). Baseboard 800 provides 1.5V GTL+ termination power (VTT), and VRM 8.1-compliant DC-to-DC converters to provide processor power (VCCP) at each connector. Power for the primary processor is derived from the +12V supply, while the secondary processor utilizes the +5V supply using an embedded DC-DC converter onboard. Both VRMs are on the baseboard 800.

Logic is provided on the baseboard 800 to detect the presence and identity of any installed processor or termination cards. If, for example, only one Pentium II processor SEC cartridge is installed in a system, a termination card must be installed in the vacant SEC connector to ensure reliable system operation. The termination card contains GTL+ termination circuitry, clock signal termination, and Test Access Port (TAP) bypassing for the vacant connector. The board will not boot if a termination card is not installed in the vacant slot.

A processor/PCI bridge/memory subsystem according to the present invention consists of support for one to two identical Pentium II processor cartridges, and up to four SDRAM DIMMs. The support circuitry on the baseboard 800 consists of the following: (a) an Intel 440BX (NBX) PCI host bridge, memory, and power management controller chip; (b) the dual 100 MHz system bus Slot 1 edge connectors 802 that accept identical Pentium II processors; (c) processor cards (if using 1 processor, a GTL+ terminator card goes in the empty slot); (d) four 168-pin DIMM connectors 804 for interface to SDRAM memory; and (e) processor host bus GTL+ support circuitry, including termination power supply, embedded DC-to-DC voltage converters for processor power, an APIC bus, miscellaneous logic for reset configuration, processor card presence detection, and an ITP port.

The NBX is a BGA device with a 3.3V core and mixed 5V, 3.3V, and GTL+ signal interface pins. The PCI host bridge 828 in the NBX provides the sole pathway between processor and I/O systems, performing control signal translations and managing the data path in transactions with PCI resources onboard. This includes translation of 64-bit operations in the GTL+ signaling environment at 100 MHz, to a 32-bit PCI Rev. 2.1 compliant, 5V signaling environment at 33 MHz.

The NBX also handles arbitration for PCI bus master access. Although the NBX is capable of being clocked to operate with multiple processor system bus frequencies, on the baseboard 800 the host bridge 828 only supports a 100 MHz system bus. The device also features 32-bit addressing, 4 or 1 deep in-order and request queue (IOQ), dynamic deferred transaction support, and Desktop Optimized (DTO) GTL bus driver support (i.e., gated transceivers for reduced power operation). The PCI interface provides greater than 100 MB/s data streamlining for PCI to SDRAM accesses (120 MB/s for writes), while supporting concurrent processor host bus and PCI transactions to main memory. This is accomplished using extensive data buffering, with processor-to-SDRAM and PCI-to-SDRAM write data buffering and write-combining support for processor-to-PCI burst writes.

The NBX also performs the function of memory controller for the baseboard 800. Total memory of 32 MB to 256 MB per DIMM is supported. Although the memory controller supports a variety of memory devices, the baseboard 800 implementation only supports PC/100 compliant, 72-bit, unbuffered or registered SDRAM DIMMs. Further information regarding such supported devices may be found in the "PC/100 SDRAM Specification", as well as the 4-Clock 100 MHz 64-bit and 72-bit Unbuffered SDRAM DIMM, and 4-Clock 100 MHz 64-bit and 72-bit Unbuffered SDRAM DIMM documentation, all of which is incorporated herein by reference.

The NBX further provides ECC that can detect and correct single-bit errors (SED/SEC), and detect all double-bit and some multiple-bit errors (DED). Parity checking and ECC can be configured under software control; higher performance is possible if ECC is disabled (1 clock savings). At initial power-up, ECC and parity checking are disabled.

APIC Bus Interrupt notification and generation for the dual processors is done using an independent path between local APICs in each processor and the Intel I/O APIC 816 located on the baseboard 800. This simple bus consists of two data signals and one clock line. PC-compatible interrupt handling is done by the PIIX4 820, with all interrupts delivered to the processor via the INTR line. However, reduced interrupt latency is possible when the APIC bus delivers interrupts in uni-processor operation (if supported by the OS).

The baseboard 800 contains a real-time clock 830 with battery backup from an external battery 832. It also contains 242 bytes of general purpose battery backed CMOS system configuration RAM. On the baseboard 800, these functions are duplicated in the Super I/O chip 834. However, in accordance with yet another important aspect of the present invention, real-time clock 830 shown in FIG. 8 is replaced with a more secure, tamperproof version as follows.

Figure 9:
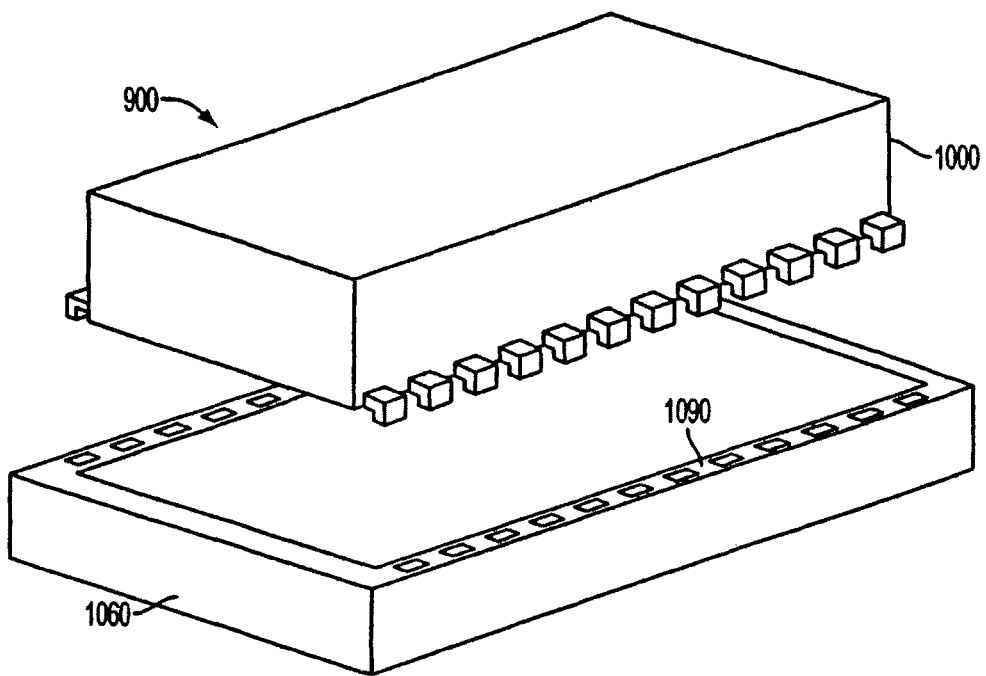
FIG. 9 shows a greatly enlarged isometric view of the real time clock chip depicted in FIG. 8.
Figure 10:
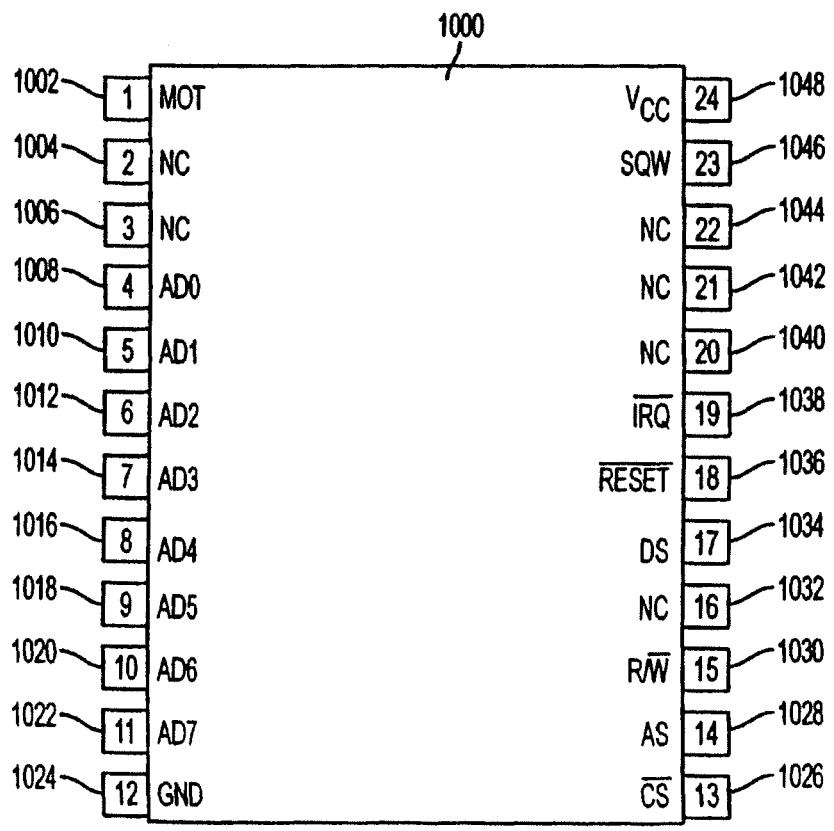
FIG. 10 depicts the pin layout of the real time clock chip shown in FIG. 9.

As shown in FIGS. 9 and 10, a real time clock assembly 900 comprises DIP form factor real time clock chip 1000 and its corresponding socket 1060. The real time clock 900 of the present invention is designed as a direct upgrade replacement for the models DS12887 and DS12C887 real time clocks, manufactured by Dallas Semiconductor Corporation, Dallas, Tex. U.S.A.), or for the MC14681 family of real time clocks manufactured by Motorola Inc., Schaumburg, Ill. U.S.A. As is known, such conventional real time clocks predominate the market for real time clocks used in PCs.

A century byte is added to memory location 50, 32h, as called out by the PC AT specification. A lithium energy source, quartz crystal, and write-protection circuitry are contained within a 24-pin dual in-line package as shown in greater detail in FIG. 10. As such, the real time clock 1000 is a complete subsystem replacing 16 components in a typical application. The functions include a nonvolatile time-of-day clock, an alarm, a one-hundred-year calendar, programmable interrupt, square wave generator, and 113 bytes of nonvolatile static RAM. The real time clock 1000 is distinctive in that time-of-day and memory are maintained even in the absence of power.

The real time clock function will continue to operate and all of the RAM, time, calendar, and alarm memory locations remain nonvolatile regardless of the level of the $V_{CC}$ input. When $V_{CC}$ is applied to the real time clock 1000 and reaches a level of greater than 4.25 volts, the device becomes accessible after 200 ms, provided that the oscillator is running and the oscillator countdown chain is not in reset. This time period allows the system to stabilize after power is applied. When $V_{CC}$ falls below 4.25 volts, the chip select input is internally forced to an inactive level regardless of the value of CS at the input pin. The real time clock 1000 is, therefore, write-protected. When the real time clock 1000 is in a write-protected state, all inputs are ignored and all outputs are in a high impedance state. When $V_{CC}$ falls below a level of approximately 3 volts, the external $V_{CC}$ supply is switched off and an internal lithium energy source supplies power to the real time clock and the RAM memory.

GND and $V_{CC}$-DC power is provided to the device, respectively, on pins #12 (shown as element 1024 in FIG. 10) and #24 (1048). $V_{CC}$ is the +5 volt input. When 5 volts are applied within normal limits, the device is fully accessible and data can be written and read. When $V_{CC}$ is below 4.25 volts typical, reads and writes are inhibited. However, the timekeeping function continues unaffected by the lower input voltage. As $V_{CC}$ falls below 3 volts typical, the RAM and timekeeper are switched over to an internal lithium energy source. The timekeeping function maintains an accuracy of ±1 minute per month at 25° C. regardless of the voltage input on the $V_{CC}$ pin 1048.

The MOT (or "Mode Select") pin 1002 offers the flexibility to choose between two bus types. When connected to $V_{CC}$, Motorola bus timing is selected. When connected to GND or left disconnected, Intel bus timing is selected. The pin 1002 has an internal pull-down resistance of approximately 20 KW.

The SQW (or "Square Wave Output") pin 1046 can output a signal from one of 13 taps provided by the 15 internal divider stages of the real time clock 1000. The frequency of the SQW pin 1046 can be changed by programming an internal Register A, as described in greater detail herein below. The SQW signal can be turned on and off using the SQWE bit in another internal Register B, as is also described in greater detail herein below. The SQW signal is not available when $V_{CC}$ is less than 4.25 volts typical.

The "Multiplexed Bidirectional Address/Data Bus" comprises pins AD0-AD7, 1008, 1010, 1012, 1014, 1016, 1018, 1020, 1022, together which saves pins because address information and data information time share the same signal paths. The addresses are present during the first portion of the bus cycle and the same pins and signal paths are used for data in the second portion of the cycle. Address/data multiplexing does not slow the access time of the real time clock 1000 since the bus change from address to data occurs during the internal RAM access time. Addresses must be valid prior to the falling edge of AS/ALE, at which time the real time clock 1000 latches the address from AD0 to AD6, 1008, 1010, 1012, 1014, 1016, 1018, 1020. Valid write data must be present and held stable during the latter portion of the DS or WR pulses. In a read cycle the real time clock 1000 outputs 8 bits of data during the latter portion of the DS or RD pulses. The read cycle is terminated and the bus returns to a high impedance state as DS transitions low in the case of Motorola timing or as RD transitions high in the case of Intel timing.

The AS (or "Address Strobe Input") pin 1028 provides a positive going address strobe pulse, which serves to demultiplex the bus. The falling edge of AS/ALE causes the address to be latched within the real time clock 1000. The next rising edge that occurs on the AS bus will clear the address regardless of whether CS is asserted. Access commands should be sent in pairs.

The DS/RD (or "Data Strobe or Read Input") pin 1034 has two modes of operation depending on the level of the MOT pin 1002. When the MOT pin 1002 is connected to $V_{CC}$, Motorola bus timing is selected. In this mode DS is a positive pulse during the latter portion of the bus cycle and is called Data Strobe. During read cycles, DS signifies the time that the real time clock 1000 is to drive the bidirectional bus. In write cycles the trailing edge of DS causes the real time clock 1000 to latch the written data. When the MOT pin 1002 is connected to GND, Intel bus timing is selected. In this mode the DS pin 1034 is called Read (RD). RD identifies the time period when the real time clock 1000 drives the bus with read data. The RD signal is the same definition as the Output Enable (OE) signal on a typical memory.

The R/W (or "Read/Write Input") pin 1030 also has two modes of operation. When the MOT pin 1002 is connected to $V_{CC}$ for Motorola timing, R/W is at a level which indicates whether the current cycle is a read or write. A read cycle is indicated with a high level on R/W while DS is high. A write cycle is indicated when RAN is low during DS. When the MOT pin 1002 is connected to GND for Intel timing, the R/W signal is an active low signal called WR. In this mode the R/W pin 1030 has the same meaning as the Write Enable signal (WE) on generic RAMs.

A Chip Select signal must be asserted low for a bus cycle in the real time clock 1000 to be accessed. This is done through the CS (or "Chip Select Input") pin 1026. CS must be kept in the active state during DS and AS for Motorola timing and during RD and WR for Intel timing. Bus cycles which take place without asserting CS will latch addresses but no access will occur. When $V_{CC}$ is below 4.25 volts, the real time clock 1000 internally inhibits access cycles by internally disabling the CS input. This action protects both the real time clock data and RAM data during power outages.

The IRQ (or "Interrupt Request Output") pin 1038 is an active low output of the real time clock 1000 that can be used as an interrupt input to a processor. The IRQ output remains low as long as the status bit causing the interrupt is present and the corresponding interrupt-enable bit is set. To clear the IRQ pin 1038, the processor program normally reads an internal Register C, as is also described in greater detail herein below.

The RESET (or "Reset Input") pin 1036 also clears pending interrupts. When no interrupt conditions are present, the IRQ level is in the high impedance state. Multiple interrupting devices can be connected to an IRQ bus. The IRQ bus is an open drain output and requires an external pull-up resistor. The RESET pin 1036 has no effect on the clock, calendar, or RAM. On power-up the RESET pin 1036 can be held low for a time in order to allow the power supply to stabilize. The amount of time that RESET is held low is dependent on the application. However, if RESET is used on power-up, the time RESET is low should exceed 200 ms to make sure that the internal timer that controls the real time clock 1000 on power-up has timed out. When RESET is low and $V_{CC}$ is above 4.25 volts, the following occurs.

First, a "Periodic Interrupt Enable" (PEI) bit is cleared to zero. The, an "Alarm Interrupt Enable" (AIE) bit is cleared to zero. An "Update Ended Interrupt Flag" (UF) bit is subsequently cleared to zero, followed by the same action for an "Interrupt Request Status Flag" (IRQF), and a "Periodic Interrupt Flag" (PF).

The device 1000 is not accessible until RESET is returned high. The an "Alarm Interrupt Flag" (AF) bit is cleared to zero, and the IRQ pin 1038 is in the high impedance state. Finally, a "Square Wave Output Enable" (SQWE) bit is cleared to zero, as is an "Update Ended Interrupt Enable" (UIE) bit.

In a typical application RESET can be connected to $V_{CC}$. This connection will allow the real time clock 1000 to go in and out of power fail without affecting any of the control registers.

The address map of the real time clock 1000 consists of 113 bytes of user RAM, 11 bytes of RAM that contain the RTC time, calendar, and alarm data, and four bytes which are used for control and status. All 128 bytes can be directly written or read except for the following. Registers C and D are read-only, as is Bit 7 of Register A, and the high order bit of the seconds byte is read-only.

The time and calendar information is obtained by reading the appropriate memory bytes. The time, calendar, and alarm are set or initialized by writing the appropriate RAM bytes. The contents of the ten time, calendar, and alarm bytes can be either Binary or Binary-Coded Decimal (BCD) format. Before writing the internal time, calendar, and alarm registers, the SET bit in Register B should be written to a logic one to prevent updates from occurring while access is being attempted. In addition to writing the ten time, calendar, and alarm registers in a selected format (binary or BCD), the data mode bit (DM) of Register B must be set to the appropriate logic level. All ten time, calendar, and alarm bytes must use the same data mode. The set bit in Register B should be cleared after the data mode bit has been written to allow the real time clock 1000 to update the time and calendar bytes. Once initialized, the real time clock 1000 makes all updates in the selected mode. The data mode cannot be changed without reinitializing the ten data bytes.

The 113 general purpose nonvolatile RAM bytes are not dedicated to any special function within the real time clock 1000. They can be used by the processor program as nonvolatile memory and are fully available during the update cycle.

Real time clock 1000 includes three separate, fully automatic sources of interrupt for a processor. The alarm interrupt can be programmed to occur at rates from once per second to once per day. The periodic interrupt can be selected for rates from 500 ms to 122 ms. The update-ended interrupt can be used to indicate to the program that an update cycle is complete. Each of these independent interrupt conditions is described in greater detail herein below.

The processor program can select which interrupts, if any, are going to be used. Three bits in Register B enable the interrupts. Writing a logic 1 to an interrupt-enable bit permits that interrupt to be initiated when the event occurs. A zero in an interrupt-enable bit prohibits the IRQ pin 1038 from being asserted from that interrupt condition. If an interrupt flag is already set when an interrupt is enabled, IRQ is immediately set at an active level, although the interrupt initiating the event may have occurred much earlier. As a result, there are cases where the program should clear such earlier initiated interrupts before first enabling new interrupts. When an interrupt event occurs, the relating flag bit is set to logic 1 in Register C. These flag bits are set independent of the state of the corresponding enable bit in Register B. The flag bit can be used in a polling mode without enabling the corresponding enable bits. The interrupt flag bit is a status bit which software can interrogate as necessary. When a flag is set, an indication is given to software that an interrupt event has occurred since the flag bit was last read; however, care should be taken when using the flag bits as they are cleared each time Register C is read. Double latching is included with Register C so that bits which are set remain stable throughout the read cycle. All bits which are set (high) are cleared when read and new interrupts which are pending during the read cycle are held until after the cycle is completed. One, two, or three bits can be set when reading Register C. Each utilized flag bit should be examined when read to ensure that no interrupts are lost.

The second flag bit usage method is with fully enabled interrupts. When an interrupt flag bit is set and the corresponding interrupt enable bit is also set, the IRQ pin is asserted low. IRQ is asserted as long as at least one of the three interrupt sources has its flag and enable bits both set. The IRQF bit in Register C is a one whenever the IRQ pin is being driven low. Determination that the RTC initiated an interrupt is accomplished by reading Register C. A logic one in bit 7 (IRQF bit) indicates that one or more interrupts have been initiated by the real time clock 1000. The act of reading Register C clears all active flag bits and the IRQF bit.

When the real time clock 1000 is shipped from the factory, the internal oscillator is turned off. This feature prevents the lithium energy cell from being used until it is installed in a system. A pattern of 010 in bits 4 through 6 of Register A will turn the oscillator on and enable the countdown chain. A pattern of 11X will turn the oscillator on, but holds the countdown chain of the oscillator in reset. All other combinations of bits 4 through 6 keep the oscillator off.

Thirteen of the 15 divider taps are made available to a 1-of-15 selector. The first purpose of selecting a divider tap is to generate a square wave output signal on the SQW pin 1046. The RS0-RS3 bits in Register A establish the square wave output frequency. The SQW frequency selection shares its 1-of-15 selector with the periodic interrupt generator. Once the frequency is selected, the output of the SQW pin 1046 can be turned on and off under program control with the square wave enable bit (SQWE).

The periodic interrupt will cause the IRQ pin 1038 to go to an active state from once every 500 ms to once every 122 ms. This function is separate from the alarm interrupt which can be output from once per second to once per day. The periodic interrupt rate is selected using the same Register A bits which select the square wave frequency. Changing the Register A bits affects both the square wave frequency and the periodic interrupt output. However, each function has a separate enable bit in Register B. The SQWE bit controls the square wave output. Similarly, the periodic interrupt is enabled by the PIE bit in Register B. The periodic interrupt can be used with software counters to measure inputs, create output intervals, or await the next needed software function.

The real time clock 1000 executes an update cycle once per second regardless of the SET bit in Register B. When the SET bit in Register B is set to one, the user copy of the double buffered time, calendar, and alarm bytes is frozen and will not update as the time increments. However, the time countdown chain continues to update the internal copy of the buffer. This feature allows time to maintain accuracy independent of reading or writing the time, calendar, and alarm buffers and also guarantees that time and calendar information is consistent. The update cycle also compares each alarm byte with the corresponding time byte and issues an alarm if a match or if a "don't care" code is present in all three positions.

There are three methods that can handle access of the real time clock 1000 that avoid any possibility of accessing inconsistent time and calendar data. The first method uses the update-ended interrupt. If enabled, an interrupt occurs after every up date cycle that indicates that over 999 ms are available to read valid time and date information. If this interrupt is used, the IRQF bit in Register C should be cleared before leaving the interrupt routine.

A second method uses the update-in-progress bit (UIP) in Register A to determine if the update cycle is in progress. The UIP bit will pulse once per second. After the UIP bit goes high, the update transfer occurs 244 ms later. If a low is read on the UIP bit, the user has at least 244 ms before the time/calendar data will be changed. Therefore, the user should avoid interrupt service routines that would cause the time needed to read valid time/calendar data to exceed 244 ms.

The third method uses a periodic interrupt to determine if an update cycle is in progress. The UIP bit in Register A is set high between the setting of the PF bit in Register C. Periodic interrupts that occur at a rate of greater than tBUC allow valid time and date information to be reached at each occurrence of the periodic interrupt. The reads should be complete within 1 (t PI/2+tBUC) to ensure that data is not read during the update cycle.

The real time clock 1000 has four control registers which are accessible at all times, even during the update cycle. Register A is comprised of the following.

| MSB<br>BIT 7 | BIT 6 | BIT 5 | BIT 4 | BIT 3 | BIT 2 | BIT 1 | LSB<br>BIT 0 |
|---|---|---|---|---|---|---|---|
| UIP | DV2 | DV1 | DV0 | RS3 | RS2 | RS1 | RS0 |

The Update In Progress (UIP) bit is a status flag that can be monitored. When the UIP bit is a one, the update transfer will soon occur. When UIP is a zero, the update transfer will not occur for at least 244 ms. The time, calendar, and alarm information in RAM is fully available for access when the UIP bit is zero. The UIP bit is read only and is not affected by RESET. Writing the SET bit in Register B to a one inhibits any update transfer and clears the UIP status bit.

These three bits comprising DV0, DV1, DV2 are used to turn the oscillator on or off and to reset the countdown chain. A pattern of 010 is the only combination of bits that will turn the oscillator on and allow the real time clock 1000 to keep time. A pattern of 11X will enable the oscillator but holds the countdown chain in reset. The next update will occur at 500 ms after a pat-tern of 010 is written to DV0, DV1, and DV2.

The four rate-selection bits comprising RS3, RS2, RS1, RS0 select one of the 13 taps on the 15-stage divider or disable the divider output. The tap selected can be used to generate an output square wave (SQW pin) and/or a periodic interrupt. The user can do one of the following: (a) enable the interrupt with the PIE bit; (b) enable the SQW output pin with the SQWE bit; (c) enable both at the same time and the same rate; or (d) enable neither. These four read/write bits are not affected by RESET.

Register B is comprised of the following.

| MSB BIT 7 | BIT 6 | BIT 5 | BIT 4 | BIT 3 | BIT 2 | BIT 1 | LSB BIT 0 |
|---|---|---|---|---|---|---|---|
| SET | PIE | AIE | UIE | SQWE | DM | 24/12 | DSE |

When the SET bit is a zero, the update transfer functions normally by advancing the counts once per second. When the SET bit is written to a one, any update transfer is inhibited and the program can initialize the time and calendar bytes without an update occurring in the midst of initializing. Read cycles can be executed in a similar manner. SET is a read/write bit that is not modified by RESET or internal functions of the real time clock 1000.

The periodic interrupt enable PIE bit is a read/write bit which allows the Periodic Interrupt Flag (PF) bit in Register C to drive the IRQ pin low. When the PIE bit is set to one, periodic interrupts are generated by driving the IRQ pin low at a rate specified by the RS3-RS0 bits of Register A. A zero in the PIE bit blocks the IRQ output from being driven by a periodic interrupt, but the Periodic Flag (PF) bit is still set at the periodic rate. PIE is not modified by any internal real time clock 1000 functions, but is cleared to zero on RESET.

The Alarm Interrupt Enable (AIE) bit is a read/write bit which, when set to a one, permits the Alarm Flag (AF) bit in register C to assert IRQ. An alarm interrupt occurs for each second that the three time bytes equal the three alarm bytes including a "don't care" alarm code of binary 11XXXXXX. When the AIE bit is set to zero, the AF bit does not initiate the IRQ signal. The RESET pin 1036 clears AIE to zero. The internal functions of the real time clock 1000 do not affect the AIE bit.

The Update Ended Interrupt Enable (UIE) bit is a read/write that enables the Update End Flag (UF) bit in Register C to assert IRQ. The RESET pin 1036 going low or the SET bit going high clears to UIE bit.

When the Square Wave Enable (SQWE) bit is set to a one, a square wave signal at the frequency set by the rate-selection bits RS3 through RS0 is driven out on a SQW pin 1046. When the SQWE bit is set to zero, the SQW pin 1046 is held low; the state of SQWE is cleared by the RESET pin 1036. SQWE is a read/write bit.

The Data Mode (DM) bit indicates whether time and calendar information is in binary or BCD format. The DM bit is set by the program to the appropriate format and can be read as required. This bit is not modified by internal functions or RESET. A one in DM signifies binary data while a zero in DM specifies Binary Coded Decimal (BCD) data.

The 24/12 control bit establishes the format of the hours byte. A one indicates the 24-hour mode and a zero indicates the 12-hour mode. This bit is read/write and is not affected by internal functions of RESET.

The Daylight Savings Enable (DSE) bit is a read/write bit which enables two special updates when DSE is set to one. On the first Sunday in April the time increments from 1:59:59 AM to 3:00:00 AM. On the last Sunday in October when the time first reaches 1:59:59 AM it changes to 1:00:00 AM. These special updates do not occur when the DSE bit is a zero. This bit is not affected by internal functions or RESET.

Register C is comprised of the following.

| MSB BIT 7 | BIT 6 | BIT 5 | BIT 4 | BIT 3 | BIT 2 | BIT 1 | LSB BIT 0 |
|---|---|---|---|---|---|---|---|
| IRQF | PF | AF | UF | 0 | 0 | 0 | 0 |

The Interrupt Request Flag (IRQF) bit is set to a one when one or more of the following are true:

PF=PIE=1

AF=AIE=1

UF=UIE=1

That is, IRQF=PF·PIE+AF·AIE+UF·UIE.

Any time the IRQF bit is a one, the IRQ pin is driven low. All flag bits are cleared after Register C is read by the program or when the RESET pin is low.

The Periodic Interrupt Flag (PF) is a read-only bit which is set to a one when an edge is detected on the selected tap of the divider chain. The RS3 through RS0 bits establish the periodic rate. PF is set to a one independent of the state of the PIE bit. When both PF and PIE are ones, the IRQ signal is active and will set the IRQF bit. The PF bit is cleared by a RESET or a software read of Register C.

A one in the Alarm Interrupt Flag (AF) bit indicates that the current time has matched the alarm time. If the AIE bit is also a one, the IRQ pin will go low and a one will appear in the IRQF bit. A RESET or a read of Register C will clear AF.

The Update Ended Interrupt Flag (UF) bit is set after each update cycle. When the UIE bit is set to one, the one in UF causes the IRQF bit to be a one which will assert the IRQ pin. UF is cleared by reading Register C or a RESET.

Bit 0 through bit 3 are unused bits of the status Register C. These bits always read zero and cannot be written.

Register D is comprised of the following.

| MSB BIT 7 | BIT 6 | BIT 5 | BIT 4 | BIT 3 | BIT 2 | BIT 1 | LSB BIT 0 |
|---|---|---|---|---|---|---|---|
| VRT | 0 | 0 | 0 | 0 | 0 | 0 | 0 |

The Valid RAM and Time (VRT) bit is set to the one state by the manufacturer prior to shipment. This bit is not writable and should always be a one when read. If a zero is ever present, an exhausted internal lithium energy source is indicated and both the contents of the RTC data and RAM data are questionable. This bit is unaffected by RESET. Bit 6 through bit 0 of Register D are also not usable. They cannot be written and, when read, they will always read zero.

Having described in detail the operation and programming of real time clock 1000, further details regarding the present invention will now be described. Real time clock 1000, as noted in part herein above, is adapted to be a direct replacement for those real time clocks used in most of the PCs in present use. According to another particularly important aspect of the present invention, therefore, the existing real time clock in a motherboard or baseboard 800 of a PC system 700 is first removed from its socket. Then, real time clock 1000 is inserted within socket 1060 by placing each of its plurality of pins 1002-1048 in the appropriate holes 1090 in socket 1060. A trusted date and time is programmed within real time clock 1000, such that it cannot be changed by a user of the PC system 700. Thereafter, tamper-evident means is applied to the installed real time clock 1000, such that removal of the real time clock 1000 would be evident. One suitable tamper-evident means is sold by MIKOH Corporation, McLean, Va. U.S.A. under its "Counterfoil" and SubScribe™ technologies. For example, using MIKOH's subsurface laser marking techniques of SubScribe, microtext may be applied to a tamper-evident label, which would then identify the real time clock 1000 by serial number to ensure that the trusted time had been set on installation. The encrypted private key, as well as its corresponding public key, could likewise be applied to the label providing further security.

Referring now to FIG. 11(*a*), a presently preferred method of certifying the times and dates of a digital data file with the system described herein will now be explained. The method 1100 involves two separate digital data files-a document 1102 (e.g., a word processing document) and an e-mail 1104 to which the document 1102 may be attached for transmission to a remote recipient. First, the document 1102 itself may be certified in the manner described herein before. That is: (1) a trusted time source would be provided such that the document 1102 would be saved at a given moment in time at step 1106; (2) a date and a time corresponding to the moment in time would be retrieved from the trusted time source at step 1108; (3) then, the time retrieved from the trusted time source would be appended, attached, connected, or coupled to the saved file at step 1110; (4) the saved file with the date and the time retrieved from the trusted time source appended, attached, connected, or coupled thereto 1112 would be signed at step 1114; (5) the signed file 1116 would then be hashed to produce a digest 1118 at step 1120; (6) the digest 1118 next would be signed with a key to produce a certificate 1122 at step 1124; (7) the certificate 1122 then would be appended, attached, connected, or coupled to the signed and saved file 1116 at step 1126; and finally (8) the file with the certificate appended, attached, connected, or coupled thereto 1128 would be saved at step 1130.

Alternatively, and referring now also to FIG. 11(*b*), an uncertified document 1102 could be simply attached to the e-mail 1104. Before sending the e-mail 1104 with the uncertified document 1102 attached thereto, a user could prompt the system to: (1) retrieve, from the trusted time source, a date and a time corresponding to the moment in time that the "send" button is pushed at step 1132; (2) then, the time retrieved from the trusted time source would be appended, attached, connected, or coupled to the e-mail and document combination 1134 at step 1136; (3) such a combination 1134 with the date and the time retrieved from the trusted time source appended, attached, connected, or coupled thereto could be signed at step 1138; (4) the signed combination 1140 could then be hashed to produce a digest 1142 at step 1144; (5) the digest 1142 could be signed with a key to produce a certificate 1146 at step 1148; (6) the certificate 1146 could be appended, attached, connected, or coupled to the signed and saved combination 1140 at step 1150; and (7) the resulting combination with certificate appended, attached, connected, or coupled thereto 1152 could finally be sent at step 1154.

As an even further alternative, both the document 1102 and the e-mail 1104 could be time-certified in the foregoing manner. Not only would the document 1102 itself have a time-certified time-stamp affixed to prove the time and date of its access, creation, modification, or transmission, but also the e-mail 1104 transmitting such time-certified document 1102 would be time-certified. The importance of the foregoing methods is underscored by past and current efforts in the Internet community in regards to time-stamping.

For example, standard protocol RFC 778 *DCNET Internet Clock Service* (April 1981), was intended primarily for two purposes—clock synchronization and one-way delay measurements with cooperating Internet hosts. It uses the Timestamp and Timestamp Reply messages of the Internet Control Message Protocol (ICMP).

The Internet Clock Service was provided using either ICMP or GGP datagrams. The only difference between those datagrams is that ICMP uses protocol number 1 and GGP uses protocol number 3. Both will be referred to interchangeably as "ICS datagrams" in conjunction with the following description of FIG. 12(*a*), which shows a standard ICS datagram include an internet header followed by an ICS header.

The originator fills in all three timestamp fields 1202, 1204, 1206 just before the datagram 1200 is forwarded to the net. Each of these fields contain the local time at origination. Although the last two are redundant, they allow roundtrip delay measurements to be made using remote hosts without time-stamping facilities. The "Type" field 1202 can be either 8 (GGP Echo) or 13 (ICMP Timestamp). The "Code" field 1204 should be zero. The "Sequence" field 1206 can contain either zero or an optional sequence number provided by the user. The length of the datagram 1200 is, thus, 36 octets inclusive of the 20-octet internet header and exclusive of the local-network leader.

The host or gateway receiving ICS datagram 1200 fills in the "Receive Timestamp" field 1208 just as the datagram 1200 is received from the net, and the "Transmit Timestamp" 1210 just as it is forwarded back to the sender. It also sets the "Type" field 1202 to 0 (GGP Echo Reply), if the original value was 8, or 14 (ICMP Timestamp Reply), if it was 13. The remaining fields 1204, 1206 are unchanged.

The timestamp values are in milliseconds from midnight UT and are stored right-justified in the 32-bit fields shown in FIG. 12(*a*). Ordinarily, all time calculations are performed modulo-24 hours in milliseconds. This provides a convenient match to those operating systems which maintain a system clock in ticks past midnight. The specified timestamp unit of milliseconds is consistent with the accuracy of existing radio clocks and the errors expected in the time-stamping process itself.

Delay measurements are made with any DCNET host by simply sending the ICS datagram 1200 to it and processing the reply. For example, t1, t2 and t3 represent the three timestamp fields of the reply in order and t4 the time of arrival at the original sender. Then the delays, exclusive of internal processing within the DCNET host, are simply (t2−t1) to the DCNET host, (t4−t3) for the return and (t2−t1)+(t4−t3) for the roundtrip. In the case of the roundtrip, the clock offsets between the sending host and DCNET host cancel.

Hosts on the Internet that choose to implement a Time Protocol are also expected to adopt and implement the standard protocol RFC 868 *Time Protocol* (May 1983). This protocol provides a site-independent, machine-readable date and time. A time service sends back to the originating source the time in seconds since midnight on January first 1900. The protocol may be used either above the Transmission Control Protocol (TCP) or above the User Datagram Protocol (UDP).

When used via TCP, the time service works as follows:

| | |
|---|---|
| Server | Listen on port 37 (45 octal) |
| User | Connect to port 37 |
| Server | Send the time as a 32 bit binary number |
| User | Receive the time |
| User | Close the connection |
| Server | Close the connection |

Thus, the server listens for a connection on port 37. When the connection is established, the server returns a 32-bit time value and closes the connection. If the server is unable to determine the time at its site, it should either refuse the connection or close it without sending anything.

When used via UDP, the time service works as follows:

| | |
|---|---|
| Server | Listen on port 37 (45 octal) |
| User | Send an empty datagram to port 37 |
| Server | Receive the empty datagram |
| Server | Send a datagram containing the time as a 32 bit binary number |
| Server | Receive the time datagram |

The server listens for a datagram on port 37. When a datagram arrives, the server returns a datagram containing the 32-bit time value. If the server is unable to determine the time at its site, it should discard the arriving datagram and make no reply.

Several Internet Drafts also provides means for timestamping. One of those is entitled "Authentication Scheme Extensions to NTP", Mills, David L., T. S. Glassey, and Michael E. McNeil, March 1999. NTP stands for Network Time Protocol. The purpose of that draft is to extend the NTP/SNTP (Secure NTP) authentication scheme to support additional features, including Public Key Infrastructure (PKI) cryptography, in order to certify the identity of the sender and verify the integrity of the data included in an NTP message, as well as provide support for other facilities such as a timestamp and non-repudiation service.

The draft describes a new extension field to support the new services. One or more of these fields can be included in the NTP header to support designated security services or other services should they become necessary. However, the presence of these fields does not affect the operation of the NTP timekeeping model and protocol in any other way. In order to preserve existing interoperability, the presence of these fields is determined by the message length. Ordinary (unprotected) NTP messages are 48 octets long. Protected messages include either a 12-octet or 20-octet Message Authentication Code (MAC), depending on the hash algorithm, presently either Data Encryption Standard/Cipher-Block Chaining (DES-CBC) or Message Digest 5 (MD5). The extension fields are inserted after the unprotected header and before the MAC. If the overall length of the NTP message is greater than the sum of the protected header length and the longest MAC length, one or more extension fields are present.

Following traditional formats used by Internet protocols, the NTP message consists of some number of 4-octet words in big-endian format. The first word contains the total length of the extension field in the low-order two octets. The high-order two octets contain a type code to identify the payload content and processing algorithm. In order to preserve alignment appropriate for block-encryption algorithms such as DES, the last extension field is zero-padded to the next larger integral multiple of eight octets. The hashing algorithm processes the extension fields along with the protected header to produce the MAC at the end of the message. Other than hash processing, the extension fields are invisible to the ordinary NTP protocol operations.

The payload may include cryptographic media to support any of several cryptographic schemes, including the Autokey scheme of NTP Version 4 and other schemes as they are developed. The data can include various subfields containing sequence numbers, additional message digests, signatures and certificates, as well as the length of these subfields. Additional fields may provide means to securely bind arbitrary customer data to be signed along with the other information in the message. The ability to sign arbitrary customer data provides an important non-repudiation feature that allows this data to be cryptographically bound to an NTP timestamp, together with sender credentials and signature.

With respect to the unprotected NTP header described in RFC 1305 and RFC 2030, the NTP header according to the draft noted above has the format 1220 shown in FIG. 12(*b*).

The 48-octet fixed-length unprotected header includes all fields 1222, 1224, 1226, 1228, 1230, 1232, 1234, 1236, 1238, 1240, 1242, 1244 through the Transmit Timestamp field 1246. The MAC 1250 includes a 4-octet Key Identifier field 1254 followed by a variable length Message Digest field 1258 in the format shown in FIG. 12(*c*).

The Message Digest field 1258 length can be either 8 octets for DES-CBC or 16 octets for MD5. SHA-1 uses a 20-octet message digest. Selection of which one of the former two supported algorithms, or more in the case of additional hash algorithms, is determined from the Key Identifier field 1254 as described in greater detail herein below.

The original NTP Version 3 authentication scheme described in RFC 1305 uses a hashing algorithm (DES-CBC or MD5) to produce a cryptographic checksum of the unprotected NTP header. This checksum is computed by the sender and included along with a private key identifier in the MAC 1250. The receiver verifies the checksum using its own copy of the private key. The extended scheme proposed for NTP Version 4, uses the extension field described in the draft noted above, and continues support for the previous scheme and is compatible with the scheme proposed therein.

In both NTP versions a designated hashing algorithm is used to compute the message digest. While only DES-CBC and MD5 algorithms are supported in existing implementations, other algorithms may be supported in future. Each algorithm may require a specific message digest field length, but not less than 8 octets, nor more than 20 octets. For instance, DES requires an 8-octet field, and MD5 requires a 16-octet field, whereas the SHA-1 algorithm, which may be supported in the future, requires a 20-octet field. Any of these algorithms hashes the contents of the 48-octet unprotected header and variable length extension fields, but not the IP addresses, ports or MAC 1250 itself, to produce the message digest 1258.

In the NTP Version 3 scheme, the key identifier 1254 is used to select a private encryption/decryption key from a predistributed set of keys. Associated with each key is an algorithm identifier, which is defined when the key is created and remains with it for the lifetime of the key. The key identifier is used to look up the key and associated algorithm identifier. Thus, no specific algorithm identifier field is necessary in the MAC 1250. In the NTP Version 4 schema, this model is preserved; however, there is a new scheme, called Autokey, which does not require prior distribution of keys. In order to preserve legacy, the key identifier space is partitioned in two subspaces, one allocated for private keys, the other for randomly generated Autokey keys. This distinction is necessary only to clarify how the hashing algorithm is identified and by implication how the length of the MAC 1250 can be determined.

Zero, one or more extension fields 1248 can be included between the unprotected header and the MAC 1250. Each extension field 1248 (as shown in greater detail in FIG. 12(*d*)) consists of a 4-octet header 1260 and variable length payload 1270. The first two octets of the header (reading in big-endian order) contain the type descriptor 1264. The next two octets contain the total extension field length 1268, including the length and type octets, but not any padding at the end. Each extension field 1248 is zero-padded, as necessary, to the next 4-octet alignment; the last field is zero-padded to the next 8-octet alignment. The total length of every extension field 1248 must be greater than 24 octets, in order to reliably recognize its presence. This value, added to the offset of the extension field 1248 within the message, points to the first octet following the extension field 1248. The overall format of all extension fields within a given NTP packet is as follows.

The type descriptor 1264 identifies the algorithm that understands the particular format of a given type of extension field 1248. There may be a mixture of ASN.1, binary, ASCII and printable data in each field, depending on the algorithm involved. There is no specific requirement on ordering, if more than one extension field 1248 is present. In general, schemes that require multiple fields will have to scan through all type descriptors 1264 to verify that all required fields are present and to determine the sequence of processing steps.

Some fields, such as certificate and signature fields, may be considered generic across several different schemes, while others may be specific to each scheme. For instance, most schemes using PKI will use X.509 certificates, RSA signatures, and Diffie-Hellman key agreement, if any of these features are required. In order to support these schemes, the following functional types are supported.

A "null field is ignored, except by the hashing algorithm. It is included for testing and debugging. A "certificate" field contains the X.509 certificate in ASN.1 format. A "generic signature" field contains the RSA signature in PKCS-1 encrypted block format. For this purpose, the RSA modulus and public exponent must be derived from the certificate or known by other means. The data to be signed is the message digest 1258 (FIG. 12(*c*)) included in the MAC 1250 at the end of the NTP message. It should be noted, however, that this does not preclude a proprietary signature scheme with different semantics.

An "Autokey" field contains any Autokey data. A "scheme" field is scheme-specific. That is, it contains such variables as version ID, source ID, serial number, request/response bits and so forth. There may be more than one scheme field if more than one scheme is operating simultaneously. This could occur, for example, if the NTP Version 4 Autokey scheme is in use along with time-stamping service or non-repudiation service. There may be data in an extension field 1248 that is known only after the message digest 1250 has been computed (e.g., the signature). In order to produce a deterministic result, it is necessary to temporarily replace these data with zeros when the digest is computed and replace them when the final result is known. This is the same action specified in IPSEC documents.

The various fields in the NTP message are parsed in the following manner. The parsing algorithm assumes a pointer initially positioned at the end of the unprotected header (i.e., at offset 48 octets). At each step the remaining payload 1270 from the pointer to the end of the message is considered.

If the remaining payload length is zero (i.e., the pointer is at the end of the message), then there is no NTP MAC and the NTP authentication scheme described above is not used. If, on the other hand, extension fields 1248 have been found previously, they are processed at this time and may result in message authentication by other schemes.

If the remaining payload length is less than four octets, a format error will be declared and the message should be considered to be unauthenticated. If the remaining payload length is not greater than 24 octets, the NTP authentication scheme is in use, perhaps along with any previously located extension fields 1248. The first 4-octet word in the remaining payload 1270 contains the key identifier 1254 used to look up the key and algorithm identifier. Depending on the particular algorithm identifier, the expected MAC length is checked against the actual remaining length. If the lengths agree, the message is processed as described above. If not, a format error will be declared and the message should be considered to be unauthenticated. Following processing of the MAC 1250, any extension fields 1248 are processed. This may involve separately signing or encrypting the message digest 1258 located in the MAC 1250.

The remaining payload length must be greater than 24 octets. An extension field 1248 will be present. If an extension field 1248 was found prior to this one in the NTP message, and the earlier extension field 1248 was padded to a 4-octet alignment rather than 8, the pointer must be backtracked by 4 octets. The pointer may then be moved over the next extension field 1248 by adding the contents of its 2-octet length word to the current pointer value. The, the pointer will be rounded up to the next 8-octet alignment.

Another relevant Internet Draft is entitled "Internet X.509 Public Key Infrastructure Time Stamp Protocol (TSP), Adams, C., P. Cain, D. Pinkas, and R. Zuccherato, October 1999 ("<draft-ietf-pkix-time-stamp-04.txt>"). This draft allows a time stamping service to prove that a datum existed before a particular time and can be used as a Trusted Third Party (TTP).

In order to associate a datum with a particular point in time, a Time Stamp Authority (TSA) may need to be used. This Trusted Third Party provides a "proof-of-existence" for this particular datum at an instant in time.

The TSA's role is to time stamp a datum to establish evidence indicating the time at which the datum existed. This can then be used, for example, to verify that a digital signature was applied to a message before the corresponding certificate was revoked, thus allowing a revoked public key certificate to be used for verifying signatures created prior to the time of revocation. This can be an important public key infrastructure operation. The TSA can also be used to indicate the time of submission when a deadline is critical, or to indicate the time of transaction for entries in a log. An exhaustive list of possible uses of a TSA is beyond the scope of this document.

The TSA is a TTP that creates time stamp tokens in order to indicate that a datum existed at a particular point in time. TSAs are required: (1) to provide a trustworthy source of time; (2) not to include any identification of the requesting entity in the time stamp tokens; (3) to include a monotonically incrementing value of the time for each newly generated time stamp token; (4) to include a monotonically incrementing integer for each newly generated time stamp token; (5) to produce a time stamp token upon receiving a valid request from the requester, when it is possible; (6) to include within each time stamp token an identifier to uniquely indicate the security policy under which the token was created; (7) to only time stamp a hash representation of the datum, i.e. a data imprint associated with a one-way collision resistant hash-function OID; (8) to examine the OID of the one-way collision resistant hash-function and to verify that the hash value length is consistent with the hash algorithm; (9) not to examine the imprint being time stamped in any way; (10) to sign each time stamp token using a key generated exclusively for this purpose and have this property of the key indicated on the corresponding certificate; and (11) to include additional information in the time stamp token, if asked by the requester using the extensions field, only for the extensions that are supported by the TSA. If this is not possible, the TSA shall respond with an error message.

As the first message of this mechanism, the requesting entity requests a time stamp token by sending a request (which is or includes a TimeStampReq, as defined below) to the Time Stamping Authority. As the second message, the Time Stamping Authority responds by sending a response (which is or includes a TimeStampToken, as defined below) to the requesting entity.

Upon receiving the response (which is or includes a TimeStampResp, as defined below), the requesting entity verifies the status error returned in the response and if no error is present verifies the various fields contained in the TimeStampToken and the validity of the digital signature of the TimeStampToken. In particular, it verifies that what was time stamped corresponds to what was requested to be time stamped. The requester then must verify that the TimeStampToken contains the correct certificate identifier of the TSA, the correct data imprint and the correct hash algorithm OID. It must then verify the timeliness of the response by verifying either the time included in the response against a local trusted time reference, if one is available, and/or the value of the "nonce" (a large random number with a high probability that it is generated by the client only once) included in the response against the value included in the request. Since the TSAs certificate may have been revoked, the status of the certificate should then be checked (e.g., by checking the appropriate CRL) to verify that the certificate is still valid.

The client application should then check the policy field to determine whether or not the policy under which the token was issued is acceptable for the application. The client may ignore this field if that is acceptable for the intended application. The TSA must sign all time stamp messages with one or more keys reserved specifically for that purpose. The corresponding certificate must contain only one instance of the extended key usage field extension as defined in RFC 2459, Section 4.2.1.13 with KeyPurposeID having value id-kp-timeStamping.

A TSAs certificate may contain an Authority Information Access extension (as defined in RFC 2459) in order to convey the method of contacting the TSA. The accessMethod field in this extension must contain the OID id-ad-time-stamping:

```
id-ad                OBJECT IDENTIFIER ::= { id-pkix 48 }
id-ad-time-stamping  OBJECT IDENTIFIER ::= { id-ad X }
```

The value of the accessLocation field defines the transport (e.g., HTTP) used to access the TSA and may contain other transport dependent information (e.g., a URL).

A time stamping request is as follows:

```
TimeStampReq ::= SEQUENCE {
    version           Integer   { v1(1) },
    messageImprint    MessageImprint,
        --a hash algorithm OID and the hash value of the
    data to be
        --time stamped
    reqPolicy                      [0] PolicyInformation
    OPTIONAL,
    nonce                          [1] Integer
    OPTIONAL,
    extensions                     [2] EXPLICIT Extensions
    OPTIONAL
}
```

The version field describes the version of the TimeStamp request.

The messageImprint field must contain the hash of the datum to be time stamped. The hash is represented as an OCTET STRING. Its length must match the length of the hash value for that algorithm (e.g., 20 bytes for SHA-1 or 16 bytes for MD5).

```
MessageImprint ::= SEQUENCE {
    hashAlgorithm     AlgorithmIdentifier,
    hashedMessage     OCTET STRING }
```

The hash algorithm indicated in the hashAlgorithm field must be a known hash algorithm that is both one-way and collision resistant.

The reqPolicy field, if included, indicates the policy under which the TimeStampToken should be provided. PolicyInformation is defined in Section 4.2.1.5 of RFC 2459. The nonce, if included, facilitates verification of the timeliness of the response when no local clock is available. The nonce is a large random number with a high probability that it is generated by the client only once (e.g., a 64 bits integer). In such a case, the same nonce value should be included in the response or the response should be rejected. The extensions field is a generic way to add additional information to the request in the future, and is defined in RFC 2459. If an extension, whether it is marked critical or not critical, is used by a requester but is not recognized by a time stamping server, the server must not issue a token and return a failure (badRequest).

The time stamp request does not identify the requester, as this information is not validated by the TSA. In situations where the TSA requires the identity of the requesting entity, alternate identification/authentication means have to be used (e.g., CMS encapsulation or TLS authentication described in RFC 2246.

A time stamping response is as follows:

```
TimeStampResp ::= SEQUENCE {
    status            PKIStatusInfo,
    timeStampToken               TimeStampToken
    OPTIONAL
}
```

The status uses the same error codes that are defined in Section 3.2.3 of RFC 2510, but adds two new ones.

When the PKIStatusInfo contains the value zero, a Time Stamp Token will be present. Otherwise, the status indicates the reason why the time stamp request was rejected.

```
PKIFailureInfo ::= BITSTRING   {
    badAlg           (0),
    --   unrecognized or unsupported Algorithm Identifier
    badRequest       (2),
    --   transaction not permitted or supported
    badDataFormat    (5),
    --   the data submitted has the wrong format
    timeNotAvailable (14),
    --   the TSAs time source is not available
    addInfoNotAvailable (15)
    --   the additional information requested could not be
understood
        or is not available
}
```

These are the only values of PKIFailureInfo that are supported. Servers in compliance with this draft must not produce any other values. On the other hand, compliant clients may ignore any other values.

The statusString field of PKIStatusInfo may be used to include reason text such as messageImprint field is not correctly formatted.

If the error code returned is different from zero, then the TimeStampToken is not returned.

A TimeStampToken appears as follows. It is encapsulated as a SignedData construct in the EncapsulatedContentInfo field.

```
SignedData ::= SEQUENCE {
    version             CMSVersion,
    digestAlgorithms
DigestAlgorithmIdentifiers,
    encapContentInfo    EncapsulatedContentInfo,
    certificates        [0] IMPLICIT
CertificateSet OPTIONAL,
    crls                [1] IMPLICIT
CertificateRevocationLists OPTIONAL,
    signerInfos         SignerInfos }
SignerInfos ::= SET OF SignerInfo
EncapsulatedContentInfo ::= SEQUENCE {
    eContentType        ContentType,
    eContent            [0] EXPLICIT OCTET STRING
OPTIONAL   }
ContentType ::= OBJECT IDENTIFIER
```

The above fields of type EncapsulatedContentInfo have the following meanings. eContentType is an object identifier that uniquely specifies the content type. For a time stamping token, it is defined as:

```
id-ct-TSTInfo    OBJECT IDENTIFIER ::= {id-ct 4}
with:
id-ct            OBJECT IDENTIFIER ::= { id-smime 1 }
id-smime         OBJECT IDENTIFIER ::= { iso(1)  member-
body(2)
                 us(840)   rsadsi(113549)   pkcs(1)
pkcs-9(9) 16 }
``` eContent is the content itself, carried as an octet string. The eContent content type has ASN.1 type TSTInfo.

The time stamp token must not contain any signatures other than the signature of the TSA. The certificate identifier of the TSA certificate shall be included as a signed attribute.

```
TSTInfo ::= SEQUENCE {
    version         Integer { v1(1) },
    policy          PolicyInformation,
    messageImprint  MessageImprint,
    -- MUST have the same value as the similar field in
    -- TimeStampReq
    serialNumber    Integer,
    genTime         GeneralizedTime,
    accuracy        [0] Accuracy
OPTIONAL,
    nonce           [1] Integer
OPTIONAL,
    -- MUST be present if the similar field was present
    -- in TimeStampReq. In that case it must have the
same value.
    tsa             [2] GeneralName
OPTIONAL,
    extensions      [3] EXPLICIT Extensions
OPTIONAL
}
```

The version field describes the version of the Timestamp token.

Timestamping servers in conformance with this draft must be able to provide version 1 Timestamp tokens. Among the optional fields, only the nonce field needs to be supported, if the similar field is present in TimeStampReq. Conforming time-stamping requesters must be able to recognize version 1 Timestamp tokens with all the optional fields present, but are not mandated to understand the semantics of any extension, if present.

The policy field must indicate the TSAs policy under which the response was produced. If a similar field was present in the TimeStampReq, then it must have the same value, otherwise an error (badRequest) must be returned. This policy may include the following types of information, although this list is certainly not exhaustive.

1. The conditions under which the time-stamp may be used
2. The availability of a time-stamp log, to allow later verification that a time-stamp token is authentic.

The messageImprint must have the same value as the similar field in TimeStampReq, provided that the size of the hash value matches the expected size of the hash algorithm identified in hashAlgorithm. The serialNumber field shall include a strictly monotonically increasing integer from one TimeStampToken to the next (e.g., 45, 236, 245, 1023, . . . ). This guarantees that each token is unique and allows to compare the ordering of two time stamps from the same TSA. This is useful in particular when two time-stamps from the same TSA bear the same time. This field also provides the way to build a unique identifier to reference the token. It should be noted that the monotonic property must remain valid even after a possible interruption (e.g., crash) of the service.

genTime is the time at which the timestamp has been created by the TSA. The ASN.1 GeneralizedTime syntax can include fraction-of-second details. Such syntax, without the restrictions from Section 4.1.2.5.of RFC 2459, where GeneralizedTime is limited to represent time with one second, may to be used here. However, when there is no need to have a precision better than the second, then GeneralizedTime with a precision limited to one second should be used as in RFC 2459.

The syntax is: YYYYMMDDhhmmss[.s . . . ]Z
Example: 19990609001326.34352Z
X.690|ISO/IEC 8825-1 provides the restrictions for a DER-encoding.

The encoding terminates with a "Z". The decimal point element, if present, is the point option ".". The fractional-seconds elements, if present, shall omit all trailing 0's. If the elements correspond to 0, they shall be wholly omitted, and the decimal point element also is omitted. Midnight is represented in the form: "YYYYMMDD000000Z" where "YYYYMMDD" represents the day following the midnight in question.

Here are a few examples of valid representations:

```
"19920521000000Z"
"19920622123421Z"
"19920722132100.3Z"
```

Accuracy represents the time deviation around the UTC time contained in GeneralizedTime.

```
Accuracy ::= CHOICE {
            seconds  [1]  INTEGER,
            millis   [2]  INTEGER    (1 . . . 999),
            micros   [3]  INTEGER    (1 . . . 999)
}
```

By adding the accuracy value to the GeneralizedTime, an upper limit of the time at which the time-stamp has been created by the TSA can be obtained. In the same way, by subtracting the accuracy to the GeneralizedTime, a lower limit of the time at which the timestamp has been created by the TSA can be obtained. Accuracy is expressed as an integer, either in seconds, milliseconds (between 1-999) or microseconds (1-999). When the accuracy field, which is optional, is missing, then, by default, an accuracy of one second is meant.

The nonce field must be present if it was present in the TimeStampReq.

The purpose of the tsa field is to give a hint in identifying the name of the TSA. If present, it must correspond to one of the subject names included in the certificate that is to be used to verify the token. However, the actual identification of the entity which signed the response will always occur through the use of the certificate identifier (ESSCertID Attribute) which is part of the signerInfo.

As noted herein above, extensions is a generic way to add additional information in the future. Extensions are defined in RFC 2459. However, version 1 only supports non-critical extensions. This means that conforming requesters are not mandated to understand the semantics of any extension. Particular extension field types may be specified in standards or may be defined and registered by any organization or community.

There is no mandatory transport mechanism for TSA messages in this draft. All of the mechanisms described herein below are optional.

A file containing a time-stamp message must contain only the DER encoding of one TSA message (i.e., there must be no extraneous header or trailer information in the file). Such files can be used to transport time stamp messages using for example, FTP.

The following simple TCP-based protocol is to be used for transport of TSA messages. This protocol is suitable for cases where an entity initiates a transaction and can poll to pick up the results. It basically assumes a listener process on a TSA which can accept TSA messages on a well-defined port (IP port number 318).

Typically an initiator binds to this port and submits the initial TSA message. The responder replies with a TSA message and/or with a reference number to be used later when polling for the actual TSA message response. If a number of TSA response messages are to be produced for a given request (e.g., if a receipt must be sent before the actual token can be produced), then a new polling reference is also returned. When the final TSA response message has been picked up by the initiator then no new polling reference is supplied.

The initiator of a transaction sends a "direct TCP-based TSA message" to the recipient. The recipient responds with a similar message. A "direct TCP-based TSA message" consists of:

length (32-bits), flag (8-bits), value (defined below)

The length field contains the number of octets of the remainder of the message (i.e., number of octets of "value" plus one). All 32-bit values in this protocol are specified to be in network byte order.

```
Message name       flag       value
tsaMsg             '00'H      DER-encoded TSA message
   -- TSA message
pollRep            '01'H      polling reference (32 bits),
                              time-to-check-back (32 bits)
   -- poll response where no TSA message response ready;
use polling
   -- reference value (and estimated time value) for
later polling
pollReq            '02'H      polling reference (32 bits)
   --request for a TSA message response to initial
message
negPollRep         '03'H  '00'H
   -- no further polling responses (i.e., transaction
complete)
partialMsgRep      '04'H      next polling reference (32
                              bits),
                              time-to-check-back (32 bits),
                              DER-encoded TSA message
   -- partial response (receipt) to initial message plus
new polling
   -- reference (and estimated time value) to use to get
next part of
   -- response
finalMsgRep        '05'H      DER-encoded TSA message
   -- final (and possibly sole) response to initial
message
errorMsgRep        '06'H      human readable error message
   -- produced when an error is detected (e.g., a
polling reference
   -- is received which doesn't exist or is finished
with)
```

The sequence of messages which can occur is: (a) entity sends tsaMsg and receives one of pollRep, negPollRep, partialMsgRep or finalMsgRep in response; (b) end entity sends pollReq message and receives one of negPollRep, partialMsgRep, finalMsgRep or errorMsgRep in response.

The "time-to-check-back" parameter is a 32-bit integer, defined to be the number of seconds which have elapsed since midnight, Jan. 1, 1970, coordinated universal time. It provides an estimate of the time that the end entity should send its next pollReq.

The following specifies a means for conveying ASN.1-encoded messages for the protocol exchanges via Internet mail. A simple MIME object is specified as follows:

Content-Type: application/timestamp
Content-Transfer-Encoding: base64
<<the ASN.1 DER-encoded Time Stamp message, base64-encoded>>

This MIME object can be sent and received using common MIME processing engines and provides a simple Internet mail transport for Time Stamp messages.

One means for conveying ASN.1-encoded messages for the protocol exchanges via the HyperText Transfer Protocol is described below. In this case, a simple MIME object is specified as follows.

```
Content-Type: application/timestamp
   <<the ASN.1 DER-encoded Time Stamp message>>
```

This MIME object can be sent and received using common HTTP processing engines over WWW links and provides a simple browser-server transport for Time Stamp messages. Upon receiving a valid request, the server must respond with either a valid response with content type application/timestamp or with an HTTP error.

When designing a TSA service, this draft has identified the following considerations that have an impact upon the validity or "trust" in the time stamp token.

1. When there is a reason to both believe that the TSA can no longer be trusted but the TSA private key has not been compromised, the authority's certificate shall be revoked. Thus, at any future time, the tokens signed with the corresponding key will not considered as valid.

2. When the TSA private key has been compromised, then the corresponding certificate shall be revoked. In this case, any token signed by the TSA using that private key cannot be trusted anymore. For this reason, it is imperative that the TSA's private key be guarded with proper security and controls in order to minimize the possibility of compromise. In case the private key does become compromised, an audit trail of all tokens generated by the TSA may provide a means to discriminate between genuine and false backdated tokens. A double time-stamp for two different TSAs is another way to address this issue.

3. The TSA signing key must be of a sufficient length to allow for a sufficiently long lifetime. Even if this is done, the key will have a finite lifetime. Thus, any token signed by the TSA should be time-stamped again (i.e., if authentic copies of old CRLs are available) or notarized (i.e., if they aren't) at a later date to renew the trust that exists in the TSA's signature. Time stamp tokens could also be kept with an Evidence Recording Authority to maintain this trust.

4. An application using the TSA service should be concerned about the amount of time it is willing to wait for a response. A "man-in-the-middle" attack can introduce delays. Thus, any TimeStampToken that takes more than an acceptable period of time should be considered suspect.

One of the major use of time stamping is to time stamp a digital signature to prove that the digital signature was created before a given time. Should the corresponding public key certificate be revoked, this procedure facilitates the determination of whether the signature was created before or after the revocation date. The following describes one Signature Timestamp attribute that may be used to timestamp a digital signature.

The following object identifier identifies the Signature Timestamp attribute:

```
id-signatureTimeStampToken OBJECT IDENTIFIER ::= { iso(1)
member-body(2)
    us(840) rsadsi(113549) pkcs(1) pkcs-9(9) smime(16) id-
aa(2) <TBD>}
```

The Signature timestamp attribute value has ASN.1 type SignatureTimeStampToken:
SignatureTimeStampToken::=TimeStampToken The value of messageImprint field within TimeStampToken will be a hash of the value of signature field within SignerInfo for the signedData being time-stamped.

The "Internet X.509 Public Key Infrastructure Time Stamp Protocol (TSP)" draft described above also presents an example of a possible use of the foregoing general time stamping service. It places a signature at a particular point in time, from which the appropriate certificate status information (e.g., CRLs) must be checked. This application is intended to be used in conjunction with evidence generated using a digital signature mechanism.

Signatures can only be verified according to a non-repudiation policy. This policy may be implicit or explicit (i.e., indicated in the evidence provided by the signer). The non-repudiation policy can specify, among other things, the time period allowed by a signer to declare the compromise of a signature key used for the generation of digital signatures. Thus, a signature may not be guaranteed to be valid until the termination of this time period.

According to the "Internet X.509 Public Key Infrastructure Time Stamp Protocol (TSP)" draft, the following basic technique may be used to verify a digital signature. First, time-stamping information needs to be obtained as soon as possible after the signature has been produced (e.g., within a few minutes or hours). This may be done by presenting the signature to the TSA. The TSA then returns a TimeStampToken (TST) upon that signature. Next, the invoker of the service must verify that the TimeStampToken is correct.

The validity of the digital signature may then be verified as follows. First, the time-stamp itself must be verified. It must also be verified that it applies to the signature of the signer. The date/time indicated by the TSA in the Time Stamping Token must then be retrieved. Then, the certificate used by the signer must be identified and retrieved. The date/time indicated by the TSA must be inside the validity period of the signer's certificate. Next, any revocation information about that certificate, at the date/time of the time-stamping operation, must be retrieved. Should the certificate be revoked, then the date/time of revocation shall be later than the date/time indicated by the TSA. If all the above conditions are successful, then the digital signature shall be declared as valid.

Figures 11A, 11B, 11C:
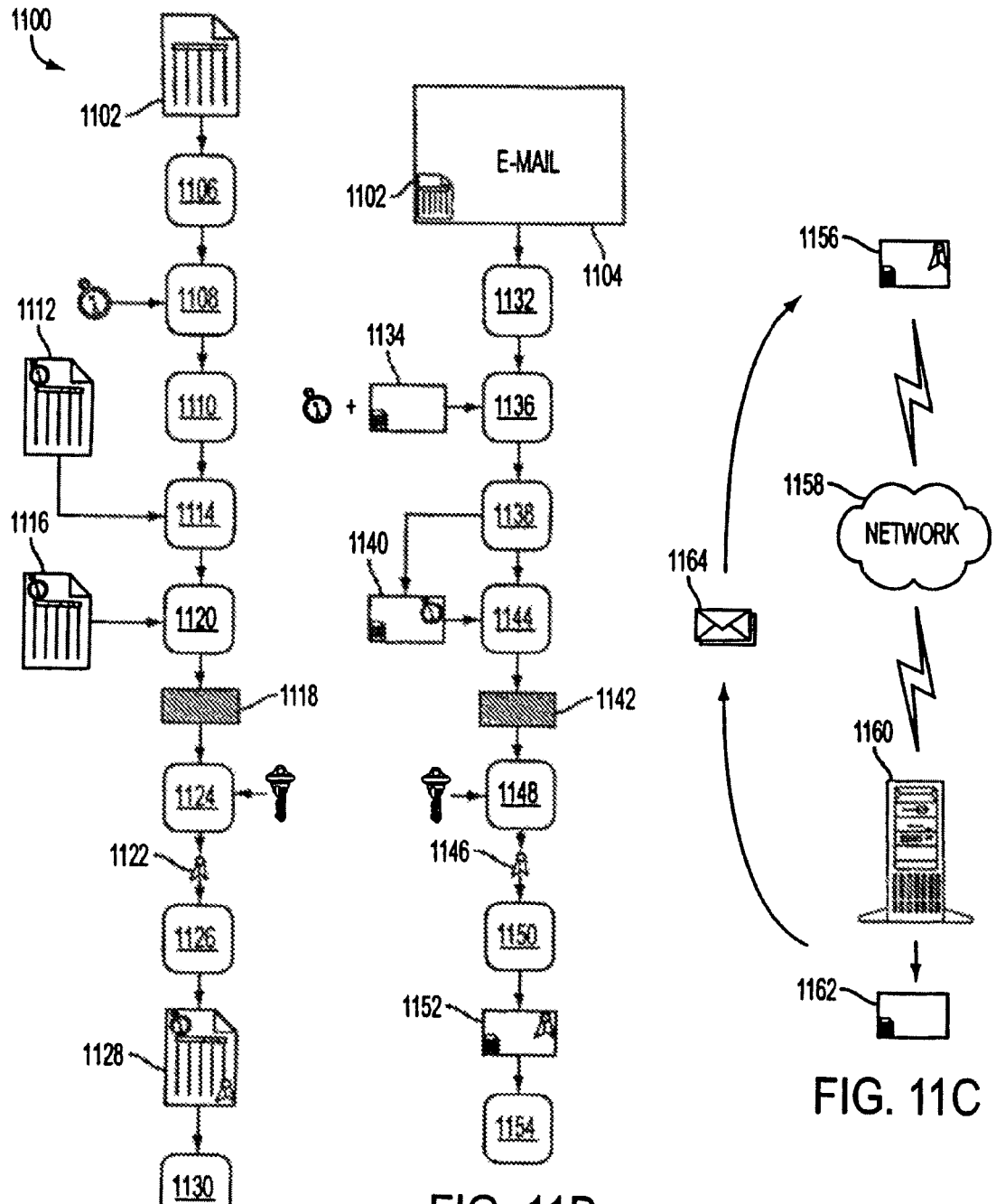
FIGS. 11A, 11B, and 11C illustrate alternative methods of proving the dates and times of a digital data file according to one embodiment of the present invention.
Figure 12A:
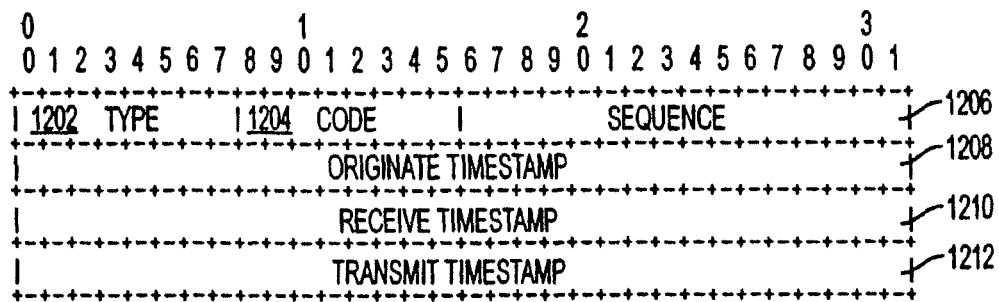
FIGS. 12A, 12B, 12C, and 12D show datagrams of other time-stamping protocols, which may be used in conjunction with the methods illustrated by FIGS. 11($a$), 11($b$), and 11($c$)
Figure 12B:
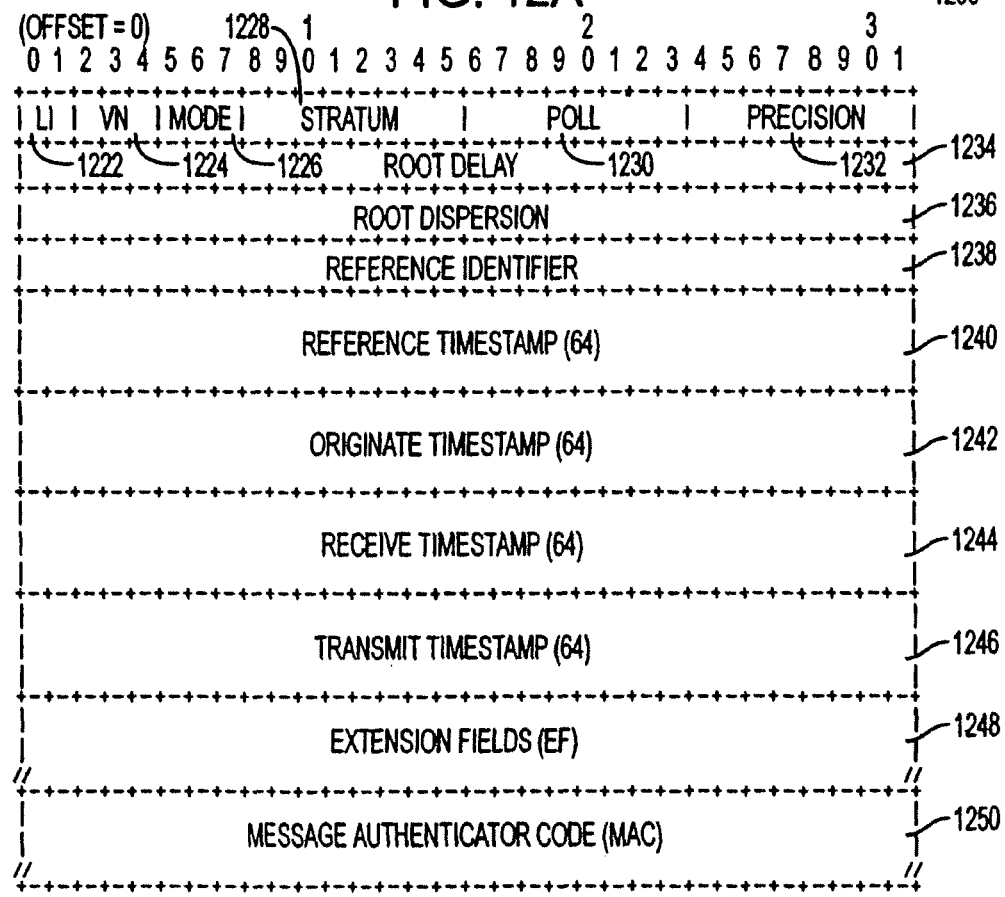
Figure 12C:
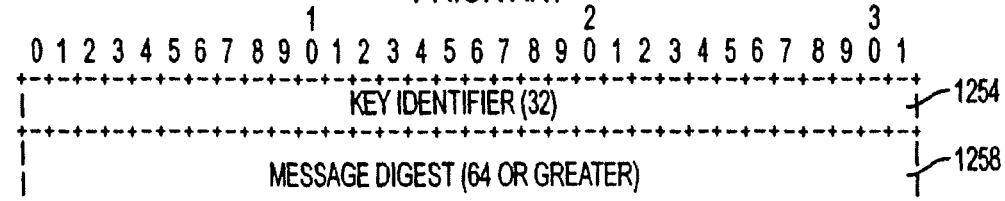
Figure 12D:
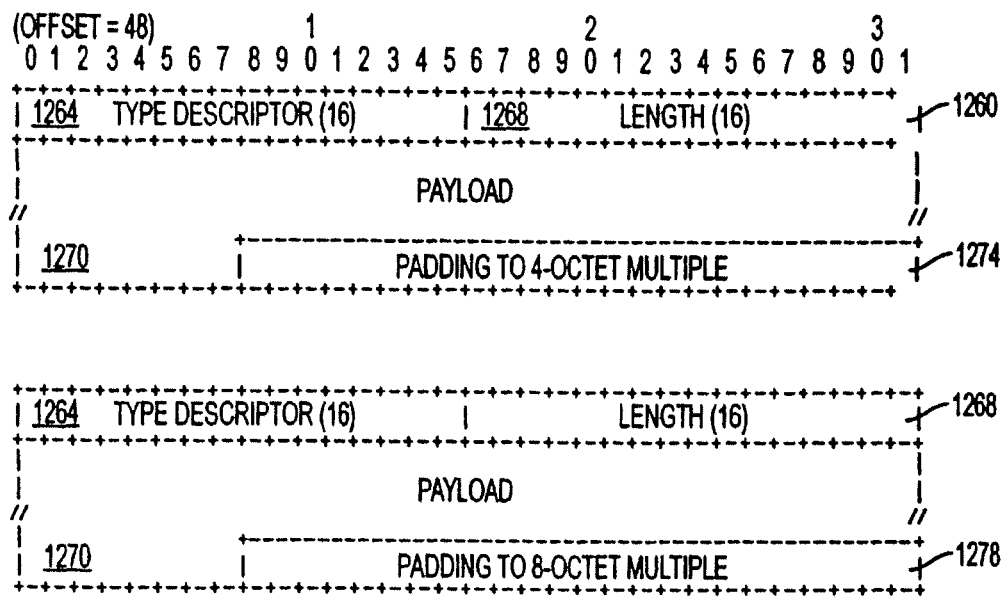

The benefits of the methods shown in FIGS. 11(a) and 11(b) may be better understood by use of the following example shown in FIG. 11(c). Consider, for example, an e-mail having a document embedded therein 1156. Furthermore, consider e-mail 1156 as having been date and time-stamped according to any one of the methods described herein above (e.g., the document is time-stamped as well as the e-mail; the document alone is time-stamped and embedded within the e-mail, the e-mail alone is time-stamped with the document thereafter being embedded within; or the e-mail having a document embedded within is time-stamped as a combination). E-mail 1156, accordingly, has been time-stamped with a trusted time. It is then transmitted across network 1158 to receiving PC 1160. In the event that the receiving PC 1160 also comprises a system 700 as described herein before, the verification of the time-stamp will be straightforward. However, if the receiving PC 1160 includes no trusted source of time, the sender of e-mail can not be certain that the receiver read e-mail 1156 at any given trusted time.

In accordance with yet another important aspect of the present invention, a certified e-mail 1156 may be sent with a return receipt requested. As is known, most e-mail software applications include the ability to send a receipt to the sender when the intended receiver has opened an e-mail having been sent with a request for return receipt. A sender of certified e-mail 1156 makes such a request at a trusted time TC1. A relative delay time TD can be determine in conventional ways, as described herein above with reference to FIGS. 12(a) through 12(d). Accordingly, a PC system 700 of the present invention will add the delay time TD to TC1 to compute a TC2, which is the relative time certain that e-mail 1156 was received at the receiving PC 1160. This does not, however, give the sender a time certain that the receiver opened e-mail 1156. Nevertheless, the local trusted time source 610 (FIG. 6) will be able to maintain an accurate time until the receiver opens e-mail 1156.

The opened e-mail 1162 would trigger creation of a return receipt 1164 in the manners well known to e-mail software applications developers. This receipt 1164 would contain an uncertified time-stamp UC1 representing the local date and time that the receiver had opened the e-mail 1156. When the PC system 700 of the sender receives that receipt 1164, it calculates another relative time certain TC4, based on the local trusted time certain of its receipt TC3 and delay time TD. That is:

TC4=TC3−TD.

Moreover, a fifth relative time certain is calculated by PC system 700 to "synchronize" the sender's and the receiver's clock. Actual synchronization does not occur. However, this fifth relative time certain TC5 indicates the differential in the time at the local trusted time source 610 and the time at the remote PC 1160. If the time UC1 as appended, attached, connected, or coupled to the receipt 1164 is compared to TC4, users of the PC system 700 can readily establish this time differential D as follows:

D=TC4−UC1.

This differential D may then be used, at least over the short-term, to provide reasonable certainty of on-going communications with the receiving PC 1160.

Variations and modifications of the above described methods and systems according to this invention are possible without departing from the true spirit and scope thereof. For example, fraud prevention means 560 may be initially installed on motherboards or baseboards 800 in the manner described above. Alternatively, they may be retrofitted in existing PCs; or they may be installed on expansion cards of the PCI and ISA types supported by such motherboards and baseboards 800; or they may be installed in an external device such as a dongle coupled to such PCs.

Such expansion cards and external devices, therefore, would each include a real time clock 1000 set to the trusted time and having a tamper-evident label attached thereto. In that case, such real time clocks 1000 on the expansion cards and external devices would be adapted to bypass any system real time clock 830 on the motherboard or baseboard 800. They would, thus, not interfere with such system real time clocks 830, and would only be used to affix a trusted timestamp to any or all digital data files in the foregoing manner.

Conventional intrusion alarms of PCs and servers could also be coupled to provide a signal to the fraud prevention means 560. In that case, any activation of the signal, which would indicate an occurrence of an intrusion, would be used to disable operation of the fraud prevention means 560. Fraud prevention means 560 would not only be capable of recognizing other certificates from CAs known in the PKI environment, but they would also be capable of being used in conjunction with any of the above described Internet protocols.

The verification means 580 according to the present invention could, likewise, be coupled within fraud prevention means 560 and provide a simple means for determining that a received message that was time-stamped by a remote system 700 was, indeed, time-certified. Alternatively, verification means 580 may comprise any biometric device (e.g., iris scan, retina scan, finger scan, hand geometry, voice verification, and dynamic signature verification devices, etc.) may be used in order to further verify the identity of a user of a local PC system 700. Suitable such devices include face recognition devices manufactured and sold by Visionics Corporation, Exchange Place, N.J. U.S.A., fingerprint readers of the SecureTouch®97 type manufactured by Biometric Access Corporation, Round Rock, Tex. U.S.A., and multiple access devices manufactured by Keyware Technologies.

Finally, the PC system 700 according to the present invention may simply comprise a stand-alone PC, a server, a PC or workstation coupled to a server. All that is necessary is that the PC or workstation and/or server include fraud prevention means 560 as previously described.

According to embodiments of the present invention, a system may maintain the trust in the content of a digital data file that is produced by a digital camera. The system may, in some embodiments, accomplish this by first having access to a trusted time source to provide a certifiable time for an unalterable time stamp, wherein the certifiable time confirms at least one of the digital data file's access, creation, modification, receipt, or transmission. In further embodiments of the present invention, the system may include a computing means having installed therein a system clock and an operating systems means for operating the computing means.

In embodiments of the present invention, an application means runs or is instantiated and operates on the operating system means, wherein the application means provides an application programming interface (API) between the trusted time source and the application means, and wherein the application programming interface is adapted to select the trusted time source or said system clock in one or more instances, wherein each of the one or more instances corresponds to a request for a determination of a moment in time to be assigned to the digital data file.

The present invention, according to embodiments, may further include a means for receiving the request to save the digital data file from the application means; as well as a means for determining the selection of the trusted time source to provide the determination of the moment in time. An embodiment of the system may further include a first means for saving the digital data file at the moment in time; and a means for retrieving from the trusted time source a date and a time corresponding to the moment in time, wherein the moment in time is substantially a current time of the trusted time source corresponding to receipt of the request.

According to embodiments of the present invention, a first means for appending the date and said time retrieved from the trusted time source to the digital data file; first means for signing the digital data file with the date and the time retrieved from the trusted time source appended, attached, connected, or coupled thereto. A means for hashing the digital data file to produce a digest may also be included. In embodiments of the present invention, a second means for signing the digest with a key to produce a certificate is provided, along with a second means for appending the certificate to the digital data file.

In further embodiments of the present invention, a second means for saving the digital data file with the certificate appended, attached, connected, or coupled thereto; and means for verifying trust in the content of the digital data file with the certificate appended, attached, connected, or coupled thereto.

In another embodiment of the present invention, the above-described system may be modified into a system for maintaining trust in content of a digital data file using distributed time sources. In embodiments, the system may therefore include a communication means running on the operating system means, wherein the communication means communicates with an external trusted time server to determine one or more additional trusted time sources. These additional trusted time sources may be consulted by a verifying means. The verifying means verifies trust in the content of said digital data file with the certificate appended, attached, connected, or coupled thereto, wherein the verifying means accesses the communication means to retrieve the current date and time from the one or more additional trusted time sources, and wherein the verifying means determines the variations in the dates and times for use in verifying trust in the content of the digital date file.

In the above-described embodiments, the API may prevent the system clock from being accessed when the instance is to be determined by the trusted time source.

In a further embodiment of the present invention, each of the one or more instances includes at least one of an operating system call which is unrelated to the application means, an operating system call which is related to the application means, or an application call which is unrelated to the operating system means.

In the various embodiments of the present invention that are described herein may further be configured to operate in various manners, such as on a portable telephone equipped with or containing therein a digital camera designed to record digital photographs to be created within the portable telephone. In an alternative embodiment, the system may include a portable telephone equipped with or containing therein a digital camera designed to record and then store the digital photographs created by the digital camera within the portable telephone.

Alternatively, the system, in embodiments of the present invention, may include a portable telephone equipped with or containing therein a digital camera designed to record digital photographs to be created from within the portable telephone and then transmitted from the portable telephone to another device. Furthermore, the system may include a portable telephone equipped with or containing therein a digital camera designed to record digital photographs to be created from within the portable telephone and then transmitted wirelessly from the portable telephone to another device.

According to embodiments of the present invention, the system may include a portable telephone equipped with or containing therein a digital camera designed to record digital photographs to be created within and then transmitted from the portable telephone by cable, where the cable is connected to another device. In alternative embodiments, the portable telephone may be equipped with or containing therein a digital camera designed to record digital photographs to be created within and then transmitted from the portable telephone as email, or as an attachment to electronic email, and where the email or email plus attachment is transmitted either wirelessly or by a wired connection from the portable telephone to another device. In further embodiments, the system may include a portable telephone or other personal computer system equipped to receive digital photographs or digital video transmitted to it as email, or as an attachment to electronic email, by wireless or non-wireless means.

As one of ordinary skill would recognized based at least on the teachings provided herein, embodiments of the present invention may include the system with a portable telephone equipped with or containing therein a digital video recording device designed to create digital video within the portable telephone. In alternative embodiments, the portable telephone equipped with or containing therein a digital video recording device designed to record and then store digital videos within the portable telephone. Furthermore, the portable telephone may be equipped with a digital video recording device designed to create and then transmit the recorded digital video wirelessly from the portable telephone to another device.

In further embodiments of the present invention, the system may include a portable telephone equipped with or containing therein a digital video recording device designed to create digital video recordings to be stored and then transmitted from the portable telephone to another device. In alternative embodiments, the portable telephone may be equipped with or containing therein a digital video recording device designed to record digital video recordings to be created within and then transmitted wirelessly from the portable telephone to another device. Furthermore, the portable telephone may be equipped with or containing therein a digital video recording device designed to record digital video recordings to be created within and then transmitted from the portable telephone by cable, where the cable is connected to another device.

In one or more embodiments of the present invention, the system includes a portable telephone that may be equipped with or containing therein a digital video recording device designed to create digital video recordings to be created within and then transmitted from the portable telephone as email, or as an attachment to electronic email, and where the email or email plus attachment is transmitted either wirelessly or by a wired connection from the portable telephone to another device. In alternative embodiments of the present invention, the portable telephone or other personal computer system may be equipped to receive digital photographs or digital video transmitted to it as data, email, or as an attachment to electronic email, by wireless or non-wireless means, as one of ordinary skill in the art would appreciate based at least upon the teachings provided herein.

Additional Embodiments

The internal operations of trusted digital data timestamp providers (which include TSAs or other trusted time stamping deployments) require either a persistent connection to an outside or remote time source as well as a continual or, at least, frequent, reset of the clock used in such a device. A trusted clock is herein defined as a tamper evident or tamper resistant real time clock which has a certifiable time, that is obtained from a trusted time source, and whose output is used to create an unalterable timestamp for digital data. However, all clocks are subject to drift over time, and those with a great deal of drift lose a great deal of accuracy. In general, precise accuracy for the real time clock is not a fundamental element of a trusted time stamp for digital data content authentication. Indeed, the protocols and standards promulgated or proposed by such standards setting bodies, as American National Standards Institute (ANSI) X9F4 9.95 Trusted Timestamp Workgroup, and the Internet Engineering Task Force (IETF) RFC 3161, require only that the drift of a trusted clock be disclosed. What is important in trusted timestamp generation is the maintaining of certifiability (i.e., auditability) of a time contained in a digital data trusted time stamp back to some trusted time source, and the inability of a user to alter, or recreate that time. This provides for the establishment and maintenance of the element of auditability, and is one of the most important elements necessary for digital data content authentication employing a trusted timestamp approach.

Nevertheless, periodic synchronizations with a trusted time source (either a National Timing Authority (NTA) or some other agreed upon trusted time source, such as GPS) are either desired or necessitated by users in order to ensure accuracy, and minimize drift. An unfortunate consequence of periodic resynchronizations and/or resettings of the real time clock in a trusted timestamp environment is that such an environment often provides the possibility for, or the actual existence of, compromise or attack, and this threat increases with each such event.

A further unfortunate consequence of even greater significance is that periodic adjustments (whether by resetting, recharacterizing, reinitializing, or recalibration) of the real time clock severely negate the auditability of the real time clock back to a trusted time source. Where such resetting is performed at the behest of the customer, the auditability of the real time clock's time source back to a trusted time source rests in large part on the trustworthiness of the customer's personnel, including system administrators who supervise or carry out these time-setting, re-setting, or calibration, synchronization or initialization operations. Where such time-setting, re-setting, or calibration, synchronization or initialization operations are outsourced to or conducted in conjunction with a third party provider, there still exists the risk that such operations (and the auditability of trusted time imbued into the real time clock) may be compromised by either the outsourced provider, acting alone, or by acting in collusion with the customer. A further undesirable consequence of periodic adjustments, calibrations, resynchronizations, and the like is that the possibility for compromise exists at all time between such periodic adjustment events, rendering the resultant timestamps susceptible to challenge as to both reliability and true auditability.

Periodic resynchronizations and/or resettings of the real time clock (RTC) in a trusted timestamp environment may diminish or negate the auditability, or certifiability of a timestamp derived from a trusted clock in a trusted timestamp system. Primarily, these events present an increased potential for collusive activities, and provide unaudited and unauditable inter-synchronization and inter-reset periods. Accordingly, methods and systems which remove these periods or minimize their occurrence or duration are desirable.

TSAs may carry out periodic audits to maintain reliability in the their policies and processes. These audits currently include periodic or singular inspections or reviews of such policies and processes. TSAs generally adopt policies and processes that minimize the likelihood of trusted clock compromise from external attack, but by design cannot and do not prevent compromise of the trusted real time clock either from within the TSA itself, or by the TSA acting in collusion with another entity, such as a trusted time source or a GPS device provider. The most significant reason for the existence of this potential compromise, is that the performance of a static, one time or periodic, short-term (e.g., one week) audit of a TSA and its maintenance of trusted time within its real time clock is by definition short lived and time-bound. If a TSA audit is conducted over the period spanning one week, the remaining fifty-one weeks of unaudited operation offers a significant, continuing risk of compromise either by a TSA acting alone or in concert with colluding parties. This is further compounded by the fact that that the trusted time sources such as National Institute of Standards & Technology (NIST), or GPS used by TSA's to obtain a certifiable time do not audit these processes and activities with TSA's. At best, what is currently offered is some sort of a "calibration certificate" or other message from such trusted time sources which consists of a "message" (which may be in the form of a certificate, or email notification) from NIST to a TSA stating how a TSA's clock should be adjusted. It is even more unfortunate that no such trusted time source auditing standards have yet to be adopted in any current standards-making organizations such as the IETF or ANSI.

No currently issued standards, however, in the digital data timestamping arena have yet addressed the issue of how, outside of a short duration audit (usually a week or two weeks), the "trusted clock" of a TSA or other trusted time provider can prove that the time could not have been altered during these inter-audit or inter-messaging periods. The distinction is significant. Where time could have been altered (even if it was not) it is subject to legal challenge. Where it can be shown in a robust fashion that time could not have been changed by a trusted insider, no factual legal challenge can be raised sufficient to result in a jury trial. Attaining this "could not" status for the auditability of time back a national timing authority therefore would save a user of that time from costly legal challenges, and even wrongfully rendered judgment based on a court's assessment of the credibility of testimony.

This significant threat to the trust in the content of digital data timestamped by a TSA is clear: between audit periods, TSA trusted clocks may be set and reset repeatedly by trusted TSA insiders or others with administrative privileges, who can thereby, individually or in collusion, alter and manipulate data content relating to TSA trusted time clock synchronization and calibration, undetectably and with ease. Fraudulently altered TSA trusted time clock synchronization and calibration data can result in fraudulently dated or altered timestamped digital data, and can result in significant financial harm, personal injury, or imperil homeland security.

Examples of time-base data digital manipulation are plentiful, and it is clear from recent events that not even auditors, acting alone, are ultimately trustworthy parties where the capability to fraudulently set and reset time and data, including financial records and audit logs, remains within the power of trusted insiders. It is clear, therefore, that for a trusted digital data timestamping system to provide a maximum of reliability and trust to timestamped digital data content, the prevention of fraud from internal as well as external sources at the TSA level has become an issue of paramount importance.

The traditional means to imbue most trusted clocks with time has been to employ a secure connection (i.e., a VPN or SNTP) between a TSA and a TSA or other entity that is used as a reference for determining drift, and triggering a clock setting correction or adjustment. There are shortcomings to these approaches, and examples of such shortcomings are discussed above and below. A primary problem is that the "trusted clock" remains resettable by a process that is not auditable apart from the time during which an auditor conducts and completes an examination until the time of the commencement of the next examination. As such, there is no true continuing auditability of time back to a national timing authority or other trusted time source. Another problem with these methods is that the trusted clock is always subject to insider manipulation (such as spoofing, etc.) at the TSA level, and as such, any statement as to auditability of time source back a national timing authority can be challenged because TSA's are self-monitoring between audit periods. Even where a persistent connection to a national timing authority is maintained, the TSA's trusted clock remains resettable by agents that can be compromised internally, and remote resetting of these clocks may occur as a result of insider or outsider compromise. Further, the persistent connection and resetting schema requires a persistent hole in a customer firewall, the consequence of which is a high security threat exposure and vulnerability exploits. This vulnerability exposure severely limits and restricts the commercial utility of such access-dependent schema.

According to embodiments of the present invention, the system 500 or its equivalents, such as but not limited to system 700, may provide a means by which there can be achieved certifiability (and therefore auditability) of trusted time used in a trusted clock back to a national timing authority or trusted time source. In one embodiment, this involves a ceremony whereby a minimum of three participants interact with the system 500, employing a split password (or m/n schema, e.g., 3 of 4 passwords or 5 of 10 passwords) and, optionally a physical token or biometric device, to witness, in a ceremony that may be videotaped, the synchronization with and setting of a TSA's trusted clock to a national timing authority or other recognized trusted time source for use in digital data timestamping, the calibration and setting of time in other trusted timestamping apparatus, and other uses.

According to these embodiments, one of the parties to the initialization ceremony is either an auditor, a witness participant of a national timing authority, or some other authorized party, who certifies to, either independently or at the request of the system 500 that (1) the national timing authority time or other trusted time source, was used in the ceremony to imbue, place, or set a certifiable time into the "trusted clock" and that (2) the ceremony managed by the system 500 is thus witnessed by the authorized party and results in the imbuing of national timing authority time (NTA), that is, trusted time, into the trusted clock of the trusted timestamping system.

Since the security features of the trusted clock used to provide timestamps (or other indicia of time authentication)

is then not-resettable except at a future ceremony conducted in the same manner, it can now be claimed that the trusted clock time source is certifiable and auditable back to that timing authority on a 24 hour day, 365 day per year basis—even between TSA audit periods. Fraud prevention is accomplished by insuring that neither the TSA, the trusted time source, nor any other party may act either singly or in collusion to imbue a false time or other improper time into the trusted clock. This has become even more significant in that there exists today extremely accurate clocks whose accuracy is so high, and whose drift profiles are so small, that no more than one time setting or initialization ceremony may be necessary for the lifetime of the system 500.

In embodiments of the present invention, digital cameras may include trusted timestamp hardware and software, such as, but not limited to, embedded trusted timestamping hardware and software. A camera manufacturer manufactures digital cameras that provide timestamps but wishes to offer trusted time clocks (non-resettable) and trusted timestamp capability. The manufacturer designs a camera with a tamper-resistant real time clock (RTC) that cannot be reset, as described above with respect to embodiments of the present invention, but must obtain a trusted time source to imbue into the cameras, en masse and on-site at the factory.

In order to imbue digital cameras with a trusted time source (which is a necessary element for the generation of a trusted timestamp) the manufacturer arranges for a videotaped ceremony whereby an auditor (or timing authority witness participant) a TSA official, and a customer security official perform the same ceremony, albeit en masse (many cameras can be "flashed" at once with the time) with the result that the time source used to create trusted timestamps on digital images cannot be challenged for auditability back to a national timing authority. The digital cameras may contain a trusted clock which must be imbued with trusted time in order to provide a trusted and unalterable timestamp.

Using another embodiment, batches of digital cameras coming off an assembly line could be imbued with trusted time in another automated fashion by deploying a timestamping appliance (itself a device having been imbued with trusted time in accordance with the embodiments of the present invention, and thereby capable of imbuing trusted time into another trusted clock). This timestamp appliance may be used to simultaneously imbue trusted time into the trusted clock of each batch of the digital cameras without requiring a witnessed initialization ceremony as described herein.

The system 500 and 700 may also include a timestamping appliance containing a trusted real time clock which has been initialized by the ceremony described herein and which may then be subsequently used as often as necessary to imbue certifiable time to a multitude of other devices in one or more automated sessions, according to the embodiments of the present invention, as described herein or otherwise understood by one of ordinary skill in the art based upon at least the teachings provided herein.

The methods of the present invention, according to the embodiments described herein, are capable of at least the following: providing a continuously certifiable trusted time source to create unalterable timestamps, providing a ceremony from the system for a party or parties to imbue a clock with trusted time, providing for the witnessing and recording on video or other media, and, in embodiments with witness participants, a ceremony may not physically occur without the participation of at least a set number of the witness participants (optionally using any combination of pass codes, physical authentication tokens, biometrics, etc., as described herein).

In embodiments of the present invention, the witness participants may include an attesting individual to respond to requests from the system 500 for certification, such that the system 500 may issue a certification that the trusted clock of a timestamping appliance has been approved for access, and that such individuals have accessed that appliance, that such individuals have imbued the timestamping appliance with time derived from a trusted time source, and that the timestamping device has then been locked down in such a way as to prevent access by the user, the trusted time source, or the attesting party without the commencement of a new initialization ceremony.

In embodiments which conform to the above-described methods, trusted time source auditability challenges resulting from inter-audit time gaps are minimized or eliminated.

In another embodiment of the present invention, a timestamp authority deploys trusted timestamping servers to client sites. Customers desire to have the timestamping performed within their network firewall, and license the service from the TSA. The TSA deploys the trusted timestamping server at the customer site, but, for security reasons, the customer will not permit constant access through its firewall for continuous trusted clock monitoring and resetting. Using the current invention, an auditor, a customer security official, and a timestamp authority official arrive at the customer deployment site, and at a videotaped ceremony, identify themselves, the purpose of the event, describe the event which is to occur, and use their tokens to access the trusted time clock in the timestamp server. The auditor or timing authority official then connects the trusted timestamp server (for example, via a dial-up connection, a one time network connection, or through a "black box" laptop or other portable device) to a national timing authority. The time on the trusted timestamp server is then synchronized with the national timing authority time, confirmed by the auditor or other witness participant, and consequently the trusted timestamp server is locked down and rebooted. The videotaped initialization ceremony is then ended, and the trusted timestamp server is ready to respond to timestamp requests.

This embodiment may be employed in a variety of environments. In a first environment, setting up an independent TSA operation (the TSA is an independent entity set up to provide timestamps [i.e., sign data with time and private key]) for customers. This presumes that the TSA receives data or a hash of data to be timestamped from some remote location outside the customer's network (i.e., the Internet) and returns the timestamp to the customer.

In another environment, this may include setting up a TSA operate within an entity that is run by the entity. Companies may operate their own certification authority (CA) for individual identity authentication purposes, and may wish to have their private key inside a device that signs data and provides timestamps. In order to obtain an unalterable timestamp which is certified to come from a trusted time source, the manner in which time is controlled or put into the appliance becomes crucial. The time data contained in timestamps must auditable back to a trusted time source (or national timing authority) and removes control over time from the Company. In order to guarantee this, control over how time is imbued into that appliance must occur. In an initialization ceremony, the two or three party requirement for accessing and setting or resetting time in a timestamping appliance allows for true auditability back to a trusted time source (including a national timing authority). In so doing, the source of the time, as well as placement of that time in the appliance, is assured, transparent and auditable. The resultant timestamps generated by the device thereby contain a time certified from a trusted time source.

In yet another environment, setting up a TSA proxy device at a customer site, such as system 500. This approach includes advantages of the two previous environments. Similar to the first environment, the system 500 (or appliance incorporating system 500) is a completely separate operation (which means that only the system's private key, and no user or customer keys, are used for signing time within the hardware security module (HSM)). However, and similar to second environment, the system 500 provides a completely independent TSA proxy within a user or customer's network, so that Internet access to obtain timestamps or to continuously monitor the HSM clock is not required. Embodiments of these environments allow corporate entities to set up their own timestamp authorities, and other independent TSA's.

Figure 13:
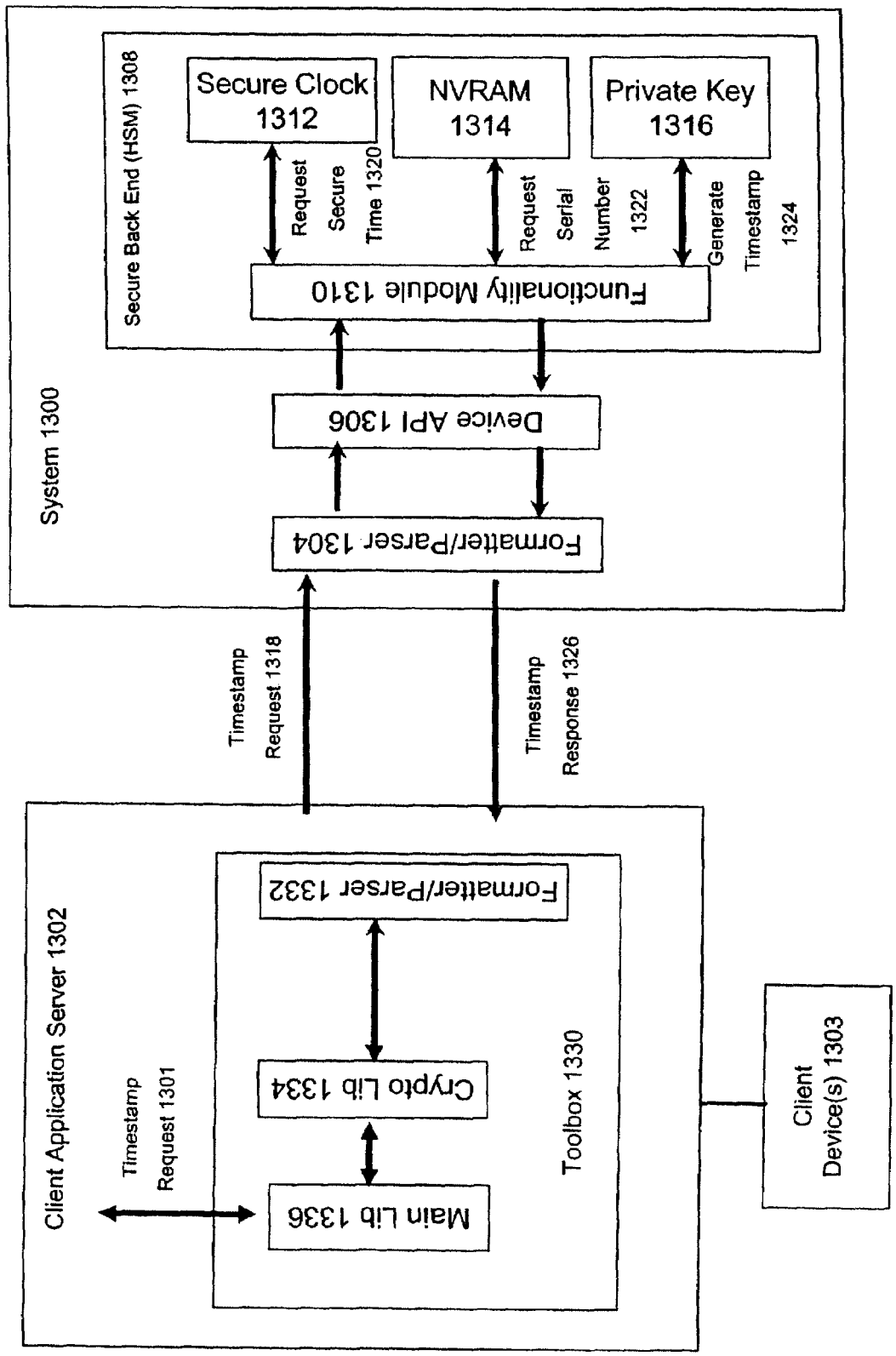
FIG. 13 illustrates an embodiment of the system in accordance with the present invention.

Referring to FIG. 13, system 1300 is shown interacting with a client application server 1302. The client application server 1302 requests (at 1318) a timestamp from the system 1300. In embodiments of the present invention, the client application server 1302 may itself request and receive a timestamp 1301. In alternative embodiments, one or more client device(s) 1303 may request and receive the timestamp 1301 through the client application server 1302. The timestamp request 1301 is provided to toolbox 1330. In embodiments, an API level request is made of the toolbox 1330. The toolbox 1330 may include a main library 1336. The main library 1336 receives the timestamp request 1301 and issues a request, with appropriate identifiers to cryptographic library 1334. The cryptographic library 1334 formats the timestamp request 1301 and optionally checks the encryption with a decrypt/re-encrypt process. The timestamp request 1301 is then forwarded to formatter/parser module 1332, which forwards the timestamp request at 1318 and receives responses to timestamp requests at 1326.

According to embodiments, the system 1300 includes another formatter/parser module at the system 1330: a formatter/parser module 1304. The module 1304 received the timestamp request and optionally, and as needed, formats or parses the request into another format and forwards the request to a device API 1306. The device API 1306 provides access to a secure back-end (hardware security module) 1308. The back-end 1308, according to embodiments of the present invention, includes a functionality module 1310. The functionality module 1310 receives the timestamp request and communicates with at least one of a secure clock 1312, Non-Volatile Random Access Memory (NVRAM) 1314, or private key 1316 (NVRAM is a type of memory that retains its contents when power is turned off.). In communicating with the module 1310, the secure clock 1312 receives a request for secure time data, and provides the appropriate response to module 1310. Additionally, and optionally, the NVRAM 1314 receives a request for secure serial number, and provides the appropriate response to module 1310. Further, and optionally, the private key 1316 receives a request to generate a digital signature, and provides the appropriate response to module 1310.

The module 1310, according to embodiments of the present invention, then provides the information provided by at least one of components 1312, 1314, or 1316 to the device API 1306. In embodiments, the module 1310, as well as device API 1306 and formatter/parser module 1304, maintain identifiers about each timestamp request 1318, such that while in the process of responding (at 1326) to a timestamp request, the information provided by the back-end 1308 is treated as a response to the initial request. Therefore, the module 1310 is able to formulate a response from the information provided by the components 1312, 1314, or 1316, which is responsive to the request. The module 1310 then forwards the response to the device API 1306, which in turn forwards the response 1326 to the module 1304. The module 1304 then reverses, optionally, the formatting and parsing operations previously performed such that the client application server 1302 may receive and understand the response 1326.

According to embodiments of the present invention, the system 500, system 700, and/or system 1300 may operate to perform initialization and resynchronization ceremonies, as described herein. This initialization ceremony as well as the roles and responsibilities of different parties involved with the system performing and managing the ceremony are herein described in further detail.

The systems of the present invention, according to the embodiments described herein, provide cryptographically secured time stamps onto digital media. Examples of digital media include, but are not limited to: a Word document, MPEG file, JPEG file, emails, etc. The systems also provide a trusted time source to enhance the integrity of the time stamps obtained by those operating with the system(s).

E-mail and other forms of digital communications, including faxes and voice mail, use "data-streaming" as a method of storing data that can enrich the feature set of an application. Implemented correctly, data-streaming allows for large amounts of data to be stored in the memory subsystem. Using flash data integrator (FDI) technology, flash, and RAM, applications can store data-streams (or simply "streams") to flash while executing application code from the same flash device. A stream is frequently defined as an undefined amount of data continuously arriving at a regular rate (e.g., the number of bytes/second). Examples of streams include voice mail, faxes, e-mail, and/or phone books.

"Parameters", on the other hand, are commonly defined as fixed-size data. Examples of parameters include call timers, phone numbers, and OEM-specific information. From an API usage perspective, a parameter is defined as type 0 in the command control structure (see, e.g., FIGS. 14 and 15), and a stream may be type 1 through 7 in the command control structure. Type affects how FDI handles information. For instance, while the limit to the number of streams or parameters in an application is 64 K, FDI allows only one stream/parameter to be open at a time. Opening streams improves read/write performance. For further details regarding such performance improvement, see, e.g., Section 3.0, "Implementing Data-Streaming in an Application", Data-Streaming, a technical paper published by Intel Corporation in May 1998 (Order No. 297897-01), the contents of which are incorporated herein by reference.

Other parameters and/or streams may be read or written while the stream is open. In the example shown in FIG. 16, a voice mail stream is opened at step 1610 and recording begins at step 1620. During the recording, other parameters and/or streams may be read or written, as shown at 1630. However, the voice mail will continue to be recorded at step 1640, and is the only stream that may be open until it is closed at step 1650. Another stream may be opened after the voice mail is closed. When retrieving data, subcommands in the FDI_Get function allow an application such as the methods according to the present invention to locate the first stream or the next stream for a certain type. The unique identifier and size returned by the FDI_Get command can then be used in the FDI_Read command to retrieve the stream. Accordingly, one method of proving with certainty the date and time of a digital data file in the PC Card environment would be to incorporate the signed timestamp within the unique identifier.

These retrieval features can be implemented if different types of streams are defined as different types within the application. For example, if an application contains faxes, e-mail, and voice mail, the following steps can be taken to retrieve all voice mail efficiently (i.e., if all voice mail are defined as one type, all faxes as another type, etc.): (a) Locate the first voice mail with the FDI_Get API (Get_First as the subcommand). This will return the identifier and size of the stream. (b) Read the first voice mail with FDI_Read. Inputs to FDI_Read are from the output of the first step. (c) Locate the next voice mail with the FDI_Get API (Get_Next as the subcommand). This will return the identifier and size of the stream. (d) Read the voice mail located in Step 3 with FDI_Read. Inputs to FDI_Read are from the output of the Step 3. (e) Repeat Steps (c) and (d) until all voice mails have been retrieved at which time FDI_Get will return ERR_NOT_EXISTS.

Figure 17:
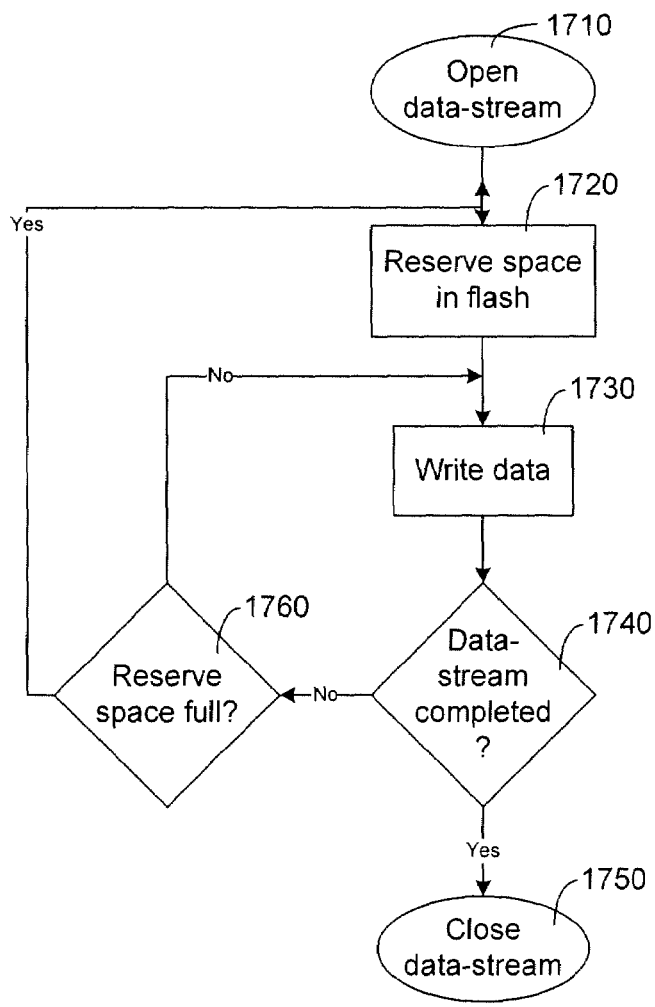
FIG. 17 shows the data-streaming methodology according to the embodiment shown in FIGS. 14-16.
Figure 18:
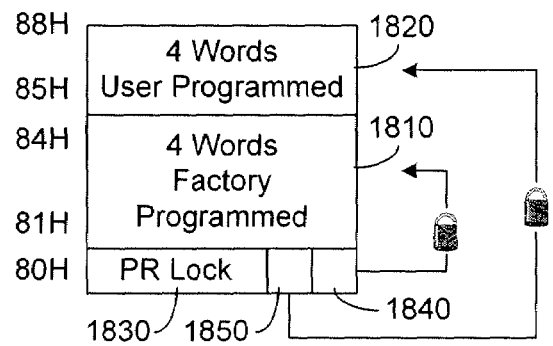
FIG. 18 illustrates a protection register memory map useful in accordance with another more specific embodiment of the present invention.

Data-streams must be written efficiently to improve access to the flash and, thus, improve system performance. To write the stream efficiently, the stream must first be opened using FDI_Open. Otherwise, acceptable data rates may be unattainable. One methodology to implement data-streaming recording to optimize efficiency is shown in FIG. 17.

FDI_Open (at step 1710) improves the performance when accessing a stream by maintaining open stream information in RAM. This open information eliminates the need for FDI_WRITE and FDI_READ APIs to call supporting functions to determine basic file information, enabling the stream to be written more efficiently. Reserving space in flash (at step 1720) and then writing data (at step 1730) to the reserved space further eliminates the need to update information. Reserving space is accomplished through the subcommand WRITE_RESERVED in the FDI_Write API. Writing data is accomplished through the subcommand WRITE_MODIFY in the FDI_Write API.

Without reserving space in flash and then writing new data to the reserved space, the application will need to use the WRITE_APPEND subcommand in the FDI_Write API. Using WRITE_APPEND reduces efficiency by copying the existing data within the fragment to a new location and then writing the new data. i.e., the preceding data written to the fragment needs to be copied in subsequent data writes. A data fragment is defined as contiguous memory with a size in multiples of unit granularities. The number of granularities is defined in the compile time option MAX_NUM_UNITS_PER_FRAG in Type. h.

By reserving space and writing to the fragment, previous writes do not need to be copied. The recommended amount of space to reserve is equal to the size of a data fragment. A data fragment size is defined as the UNIT_GRANULARITY size multiplied by the MAX_NUM_UNIT_PER_FRAG. Both UNIT_GRANULARITY and MAX_NUM_UNIT_PER_FRAG are defined in header files. Data written to this reserved space should be in amounts that maximize the fragment usage thus minimizing overhead. For example, if a 256-byte fragment is written to in 32-byte increments, eight increments may be written. Finally, FDI-Close closes the stream (at step 1750) to allow other streams to be opened for writing.

Data-streaming brings the ability to store large amounts of data with undefined lengths to flash. Issues that need to be understood include: using the parameter and stream types correctly in APIs, efficiently implementing data-streaming, and correctly implementing power-loss recovery.

According to Intel's Flash Data Integrator (FDI) User's Guide (Version 2.0a), April 1999, the contents of which is incorporated herein by reference, low-level interrupt RAM (referred to hereinafter as "IntelXxLowLevelRAM) exists in RAM, and facilitates a real-time multi-tasking system flash "read while write" capabilities.

The low-level RAM call format is:

HW-ERROR; IntelX16LowLevelRAM (DWORD dest-addr, DWORD src-addr,

BYTE-PTR buffer, WORD length,

HW-CMD command);

HW-ERROR IntelX8LowLevelRAM (DWORD dest-addr, DWORD src-addr,

BYTE-PTR buffer, WORD length,

HW-CMD command);

The input parameter structure for low-level RAM is defined in Table I on the following page.

TABLE I

Low-Level RAM Input Parameter Structure

| Identifier Description Data | Type | Data Rep. Limit | Range | Validity | Check Perf.? | Input Method |
|---|---|---|---|---|---|---|
| Dest_addr | Beginning address of flash media data | DWORD | address | | No | by value |
| src-addr | | DWORD | address | | | by value |
| buffer | Pointer to buffer containing data for programming | BYTE PTR | array of bytes | | No | by reference |
| length | Number of bytes if programming | WORD | byte counter | 0-0XFFFF | Yes | by value |
| command | Either program or erase/copy | HW_CMD | command flag | 0-1 | Yes | by value |

IntelXxLowLevelRAM disables the system Task Scheduling so the scheduler does not interrupt the write process. The Data Queue still contains the current data element being acted upon. Next, IntelXxLowLevelRAM disables the interrupts. This is the point of worst case interrupt latency, after the interrupts have been disabled. IntelXxLowLevelRAM calculates the "time until next interrupt" using the last interrupt time-stamp and the current time. There must be available time for a minimum run, overhead and command suspend time. If there is not enough time, IntelXxLowLevelRAM re-enables the interrupts and the task scheduler.

IntelXxLowLevelRAM then delays until the next interrupt occurs and the process begins again. If enough time exists, IntelXxLowLevelRAM allows the program or erase command to start or continue the operation. Checking the status register verifies the command is complete. If the operation is a programming command, the byte counter is decremented and the address pointer increments to the next location. IntelXxLowLevelRAM checks the status register for errors if there are no more bytes to write and sets the status variable to indicate correct command completion or error. Verification of the status register ensures the completion of the operation.

IntelXxLowLevelRAM analyzes the available time if the command has not completed. IntelXxLowLevelRAM sets the status variable to the suspended state if there is not enough time to poll the status register or an interrupt has occurred. This is the point of best case interrupt latency, after the interrupt polling. IntelXxLowLevelRAM suspends the program or erase command and waits for the operation to complete.

IntelXxLowLevelRAM re-enables the interrupts and the task scheduler. The system will vector to the address of the interrupt handler. After the system interrupt completes and the Background Manager is allowed CPU time, the process is continued until interrupted again or until complete.

If the status variable indicates that the program/erase command was suspended, IntelXxLowLevelRAM disables the Task Scheduling, disables the interrupts and verifies the available time. IntelXxLowLevelRAM resumes the previously interrupted command until the variable status indicates completion or error.

Therefore, a similar method of proving the date and time of a digital data file can now be explained with respect to other digital communications (e.g., those using data-streaming processes as outlined above) in accordance with this embodiment of the present invention.

The Advanced+ Boot Block family of 8-, 16-, and 32-Mbit flash memory devices, manufactured by Intel Corporation, combines unique features that greatly enhance both the fraud prevention and data protection of portable communications equipment (e.g., cellular telephones, pagers, etc.). Three features of such devices which are particularly useful in systems and methods according to the present invention are their: (a) instant individual block locking;

(b) unique silicon serial number; and (c) 128-bit fraud protection register (PR). In addition, the family's enhanced high-speed programming, high bit density, and fabrication process using Intel's 0.25-micron process technology make it especially attractive for the growing number of high-volume consumer products that use flash memory chips (e.g., global position systems (GPSs) and set-top boxes).

With the latest cellular phones, pagers, and other portable communications devices storing an ever widening range of message types, including e-mail, voice, faxes and executable code, comes the growing need to ensure that these devices provide reliable and secure data storage. To help address this need, the Advanced+ Boot Block flash memory family incorporates instant locking of individual data blocks, a feature that protects data from being corrupted or destroyed by signal glitches, power failures and accidental overwriting.

In the past, other flash chips have similarly sought to protect data by incorporating some form of block locking. But these measures were subject to a delay between the instant that data was written and the time it was actually protected against corruption. During that delay, data was susceptible to destructive effects. In contrast, the Advanced+Boot Block flash memory family protects data on receipt, without delay.

Intel is providing equipment manufacturers with the next level of system protection against today's increasingly advanced forms of fraud. Advanced+Boot Block flash memory devices help stem the rising tide of theft-of-service fraud caused by stealing and cloning. Each and every flash memory chip in the Advanced+Boot Block family stores a silicon serial number that uniquely identifies that chip within a fraud protection register. The 128-bit one-time-programmable (OTP) register is divided into two 64-bit segments. One, programmed during manufacture, contains a unique identification number. The other is available for programming by the equipment manufacturer, who can, for example, use it to tie the memory chip to a particular end product or to enhance system authentication.

The contents of the protection register then become the basis for thwarting anyone who steals that product and attempts to clone it by copying the password key and subscriber identification code stored in the flash memory. For example, using the signature in the protection register, Advanced+Boot Block flash memories could be configured to work only with authorized device programmers, withholding their data from device programmers that lack a corresponding serial number.

Although its instant block locking and 128-bit protection register make the Advanced-+ Boot Block family particularly well-suited for cellular phones and pagers, several other features give the new product line broad appeal for any high-volume, cost-sensitive product needing flash memory.

The new locking scheme also allows boot code location and size flexibility. For example, if the boot code is required to be located in block 3, block 3 may be configured for hardware/software protection. The size of the boot area may also be increased by locking more than one block.

Figures 19, 21C:
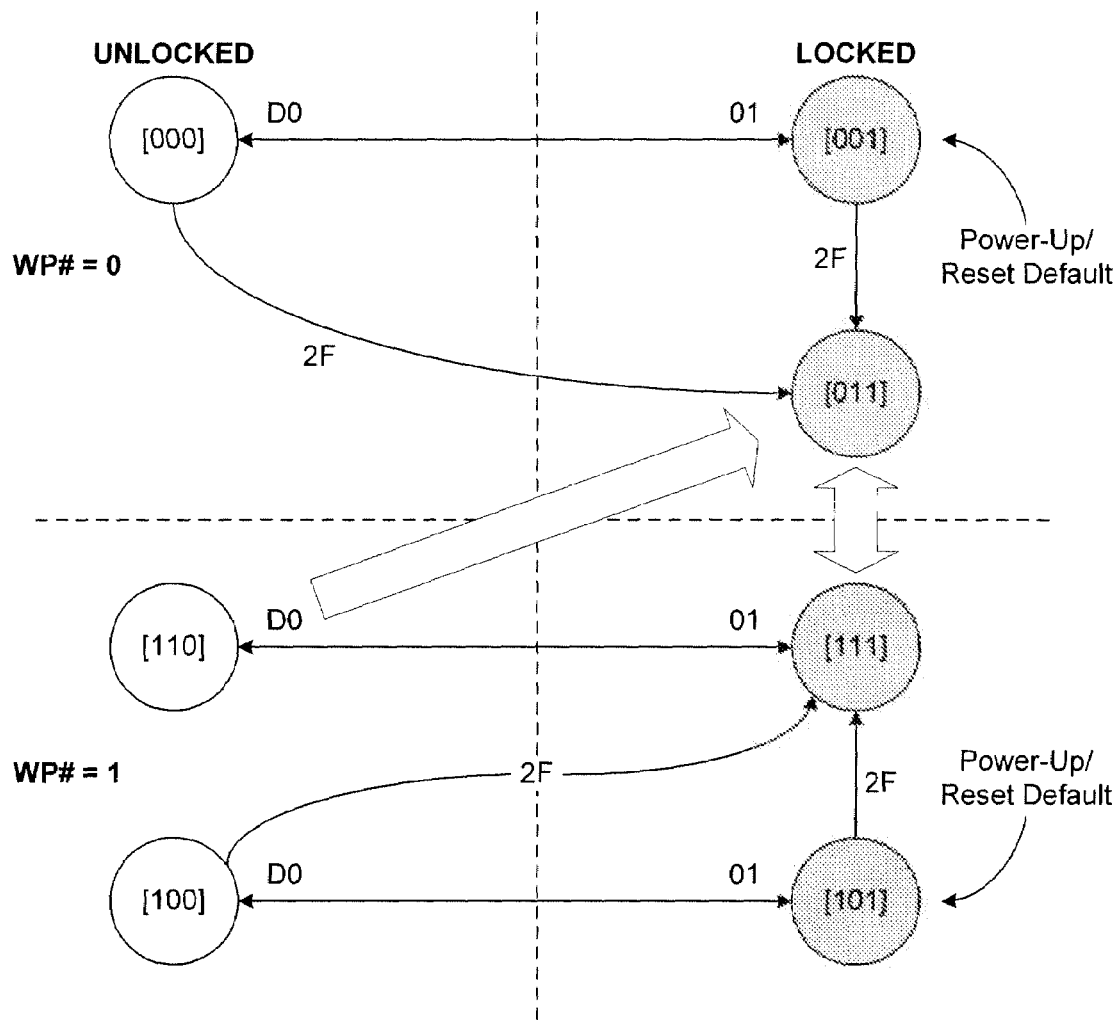
FIG. 19 shows the locking scheme functions of apparatus according to another embodiment of the present invention.

FIG. 19 illustrates how the locking scheme functions. States, such as locked, unlocked, or lock-down are described in subsections that follow. Commands are shown in Table II. The following outlines its functionality. Regardless of the state of WP#, all blocks power-up in a locked state (state [001] or [101]) if WP#=0. After power-up the block may be unlocked (state [000]), written to, and locked (state [001]) via software commands: A block may be locked-down (state [011]), in which case that block will no longer be able to be unlocked and written to via software commands alone. If WP#=1, After power-up the block may be unlocked (state [100]), written to and locked (state [101]) via software commands. A block may be put into Locked-Lock-Down (state [111]) via a software command when WP#=1. The block may then be unlocked (state [110]) and put back in Locked-Lock-Down (state [111]) via software commands. If WP# is transitioned to 0, the block will go into Lock-Down (state [011]) if the block is in either state [111] or [110]. The Locked, Unlocked, Lock-Down, and Locked-Lock-Down are summarized in Table III and described in the following sections.

The default status of all blocks upon power-up or reset is Locked (states [001] or [101]). Locked blocks are fully protected from alteration. Any program or erase operations attempted on a locked block will return an error on bit SR.1 of the status register. Blocks are locked from the Unlocked State (see below) via the Lock command (60H/01).

Unlocked blocks (states [000], [100], and [110]) can be programmed or erased. Blocks are unlocked from the Locked state or the Locked-Lock-Down state via the unlock command (60H/D0). Note that all unlocked blocks return to the Locked state (state [001] if WP#=0 and state [101] if WP#=1) when the device is reset or powered down.

Blocks that are in Lock-Down (state [011]) provide an additional level of protection by requiring a hardware input change before a block can be modified. Once a block has been locked-down, it cannot be unlocked with software commands alone (when WP#=0). Blocks may be locked down from the [000] or the [001] states via the Lock-Down command (60H/2F). From the [111] or the state the block is placed in lock-down by changing the state of WP# from a logic high to a logic low. Note that Locked-Lock-Down blocks revert to the Locked state (state [001] if WP#=0 and state [101] if WP#=1) when the device is reset or powered down.

The Locked-Lock-Down state [111] is an intermediate state to allow blocks in Lock-Down to be changed via a combination of hardware and software control. The Locked-Lock-Down State can be entered by one of three ways. (a) from the Locked state [loll or the Unlocked state [100] via the Lock-Down command; (b) from the Unlocked state [110] via the lock command; or (c) from the Lock-Down state [011] by setting WP#=1. Note that Locked-Lock-Down blocks revert to the Locked state (state [001] if WP#=0 and state [101] if WP#=I) when the device is reset or powered down.

The lock status of every block can be read by issuing the Read Configuration command (90H). Subsequent reads at the second address of each block will output the lock status for that block. The lock status is represented by the lowest two output pins, DQ0 and DQ1. DQ0 indicates the block lock status (See Table II) and is set by the Lock command and cleared by the Unlock command. It is also automatically set when entering Lock-Down or Locked-Lock-Down. DQ1 indicates Lock-Down status and is set by the Lock-Down command. It cannot be cleared by software, only by device reset or power-down.

TABLE II

Block Lock Status

| Item | Address | Data |
|---|---|---|
| Block Lock Configuration: | XX002 | LOCK |
| Block Is Unlocked | | DQ0 = 0 |
| Block Is Locked | | DQ0 = 1 |
| Block Is Locked-Down | | DQ1 = 0 |

Changes to block lock status can be performed during an erase suspend by using the standard locking command sequences to unlock, lock, or lock-down a block. This is useful in the case when another block needs to be updated while an erase operation is in progress. To change block locking during an erase operation, first write the Erase Suspend command (B0H), then check the status register until it indicates that the erase operation has been suspended. Next write the desired lock command sequence to a block and the lock status will be changed. After completing any desired lock, read, or program operations, resume the erase operation with the Erase Resume command (D0H). If a block is locked or in Lock-Down (including Locked-Lock-Down) during a suspended erase of the same block, the locking status bits will be changed immediately, however, the erase operation will complete.

Locking operations cannot be performed during a program suspend. Further details may be found in the manufacturer's datasheet for complete information on which commands are valid during erase suspend.

Using nested locking or program command sequences during erase suspend can introduce ambiguity into status register results. Since locking changes are performed using a two-cycle command sequence, e.g., 60H followed by 01H to lock a block, following the configuration setup (60H) with an invalid command will produce a lock command error (SR.4 and SR.5 will be 20 set to 1) in the status register. If a lock command error occurs during an erase suspend, SR.4 and SR.5 will be set to 1, and will remain at 1 after the erase is resumed. When erase is complete, any possible error during the erase cannot be detected via the status register because of the previous locking command error.

The Protection Register (PR) is a 128-bit nonvolatile storage space separate from the main array, which may be used for a wide array of applications. The PR is divided into two 64-bit segments. The first 64-bits is programmed and locked at the Intel factory with a unique 64-bit number. It may not be altered. The other 64-bit segment, the OEM segment, is left unprogrammed for customer to program as desired. Once the OEM segment is programmed, it may be permanently locked to prevent re-programming.

The PR may be used to implement security schemes, simplify manufacturing, and/or reduce system maintenance. Security may be implemented by guaranteeing authenticity over a network, storing equipment identifier numbers, and linking physical components. Manufacturing may be simplified by storing platform configuration information and/or process information. Lastly, system maintenance may be simplified by using the PR to store registration information or upgrade privilege information. The C3/C2 architecture can save design time and component count, cost, and space by integrating other discrete memory functionality into one device.

The PR may be used to store a unique number used to ensure that the application attempting to access a network is not "foreign". The host may check this number against a database to determine access permission to areas of the network.

TABLE III

Summary of Common Locking Operations

| To do this operation . . . | . . . in this lock state . . . | . . . do this. |
|---|---|---|
| Update a code or data block | Unlocked (state [000], [110] or [100]) | No locking changes needed. |
| | Locked (state [001] or [101]) | 1. Unlock the block (60H/D0H). |
| | | 2. Execute program or erase operation. |
| | | 3. Relock the block. |
| | Lock-Down (state [111]) | 1. Set WP# = 1 to override Lock-Down. |
| | | 2. Unlock the block (60H/D0H). |
| | | 3. Execute program or erase |

TABLE III-continued

Summary of Common Locking Operations

| To do this operation... | ... in this lock state... | ... do this. |
|---|---|---|
| | | operation.<br>4. Set WP# = 0 to return to Lock-Down. |
| Protect a data block | Unlocked (state [000] or [100]) | 1. Lock the block (60H/01H). |
| | Locked (state [001] or [101]) | No locking changes needed. |
| Protect a code block | Unlocked (state [000] or [100]) or Locked (state [001] or [101]) | 1. Use the Lock-Down command (60W2FH).<br>2. Set WP# = 0 to return to Lock-Down (if WP# = 1). |
| | Lock-Down (state [111])<br>Unlocked state from Locked-Lock-Down (state [110]) | No locking changes needed. |

Most wireless or networked equipment require a unique identifier for each unit. For example, each cellular telephone is assigned an "electronic serial number" (ESN) or "international mobile subscriber equipment identifier" (IMEI) that it uses to identify itself to the network. In addition, addressable set-top boxes and networking equipment need to store network addresses. This information may currently be stored in an EEPROM or flash memory, but this allows the equipment identifier to be fraudulently changed. By storing this information in the OEM segment of the PR, which—once programmed and locked—cannot be changed, the risk of cloning is reduced by making the number unalterable.

The PR may also be used to detect if another identifier, password, key, or section of code in the equipment has been modified. Thus, an application may be setup to disable itself when it recognizes that it has been tampered with. This may be implemented by using the factory-programmed unique number to encrypt the identifier, then storing the result in the OEM segment of the protection register. The encryption algorithm may be as simple as performing an XOR, or more sophisticated public/private key algorithm. By checking if the number stored in the OEM segment of the PR matches the expected value from the algorithm, the system can detect whether the key has been altered.

Equipment identifiers may also be fraudulently changed by physically changing system components. The PR may be used to prevent this by linking the specific physical components in a system. This requires that other system components, such as an ASIC, CPU or discrete component also have unique identifiers. A physical change of components may be then be detected by implementing a similar algorithm as outlined in the previous section.

In some cases, a single system design may be configured to be different end products in order to take advantage of volume mass production yet meet various price points by enabling or disabling features. The OEM segment of the PR provides an ideal place to store configuration information because it is permanent. This may be used in conjunction with a component-linking scheme to prevent the flash from being swapped out.

During the lifetime of a system, the contents of the flash may be updated many times, especially in the production line. In this usage model, the ability to store manufacturing or configuration information in a non-volatile, unchangeable memory space such as the PR becomes very useful. One usage is to store the time, equipment, and other manufacturing information in the PR, which is useful for failure analysis or the debugging purposes.

Information stored in the PR may be used to determine upgrade privileges. For example, a handheld device logged onto the network may request an upgrade for the application. The PR could be queried, checked against a vendor database to determine if the user paid for the upgrade. This is similar to guaranteeing authenticity. However, in this example, the PR is being used to eliminate the need of manually verifying the upgrade.

The PR may be used to simplify registration processes. By implementing an algorithm to automatically register the device upon initialization, the information in the PR may be sent to the vendor to register the product.

The following sections describe the operation for reading and programming the PR.

The PR is read in the configuration read mode via the Read Configuration command (90H). Once in this mode, read cycles from the appropriate addresses will retrieve the specified information. (Refer to the appropriate product datasheet for PR addressing.) To return to read array mode, write the Read Array command (FFH).

The OEM segment of the PR is programmed using the two-cycle Protection Program command. This 64-bit number is programmed 16-bits at a time for word-wide parts. The first write the is the command sequence is the Protection Program Setup command, C0H. The next write to the device will latch in address and data and program the specified location. The allowable addresses are shown in the datasheet. Any attempt to address Protection Program commands outside the defined PR address space will result in a status register error (program error bit SR.4 will be set to 1). Attempting to program to a previously locked PR segment will result in a status register error (program error bit SR.4 and lock error bit SR.1 will be set to 1).

After programming the OEM segment, this section may be locked by programming Bit 1 of the PR-LOCK location to 0. (Bit 0 of this location is programmed to 0 at the Intel factory to protect the unique device number.) This bit is set using the Protection Program command to program "FWD" to the PR-LOCK location. Once Bit 1 has been programmed, no further changes can be made to the PR. Protection Program commands to a locked section will result in a status register error (program error bit SR.4 and lock error bit SR.1 will be set to 1). The PR lockout state is not reversible.

From all of the foregoing, it can be seen that systems and methods of proving dates and times of digital data files contained in flash memory may be implemented in one of three ways. First, a time-certain date and time can be encoded within OEM segment of the protection register. Second, that same time-certain date and time can be encoded in a locked-down block. Finally, the encoded time-certain date and time could be placed as a time-stamp serving in the capacity of a unique identifier as described herein above.

Figure 20:
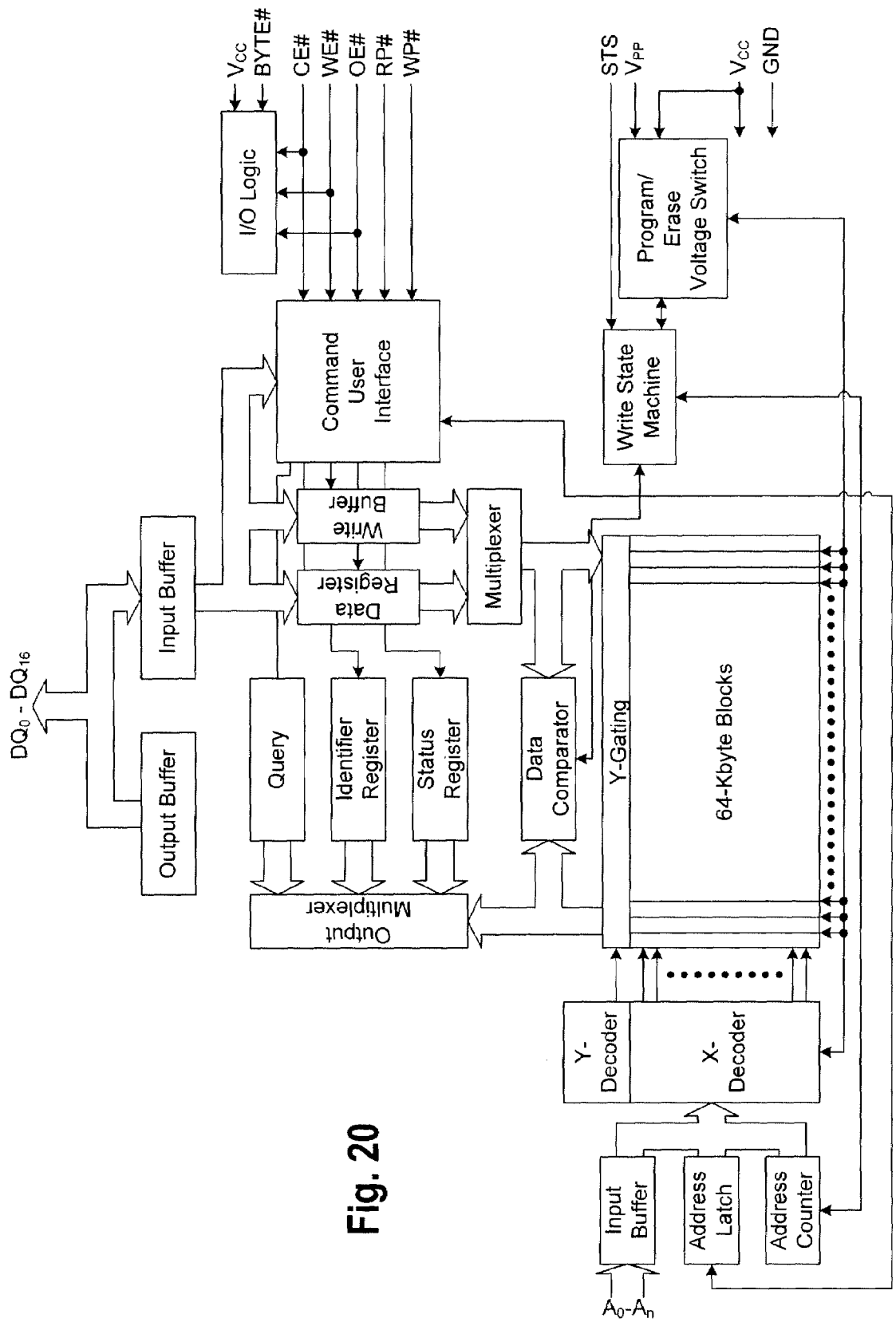
FIG. 20 illustrates an architecture block diagram of flash memory apparatus used to prove dates and times of digital data files according to another embodiment of the present invention.

The pin description of suitable flash memory that is capable of performing each of the above methods is set forth in Table IV. Similarly, one suitable architecture for a flash memory enabling such functionality is shown in FIG. 20. Further details regarding Intel's Advanced+ boot block flash memory architecture may be found in Intel Application Note AP-657, *Designing with the Advanced+Boot Block Flash Memory Architecture*, Order Number 292215-003 December 1998, the contents of which is incorporated herein by reference.

TABLE IV

Pin Description

| Sym | Type | Name and Function |
|---|---|---|
| A 0-A 21 | INPUT | ADDRESS INPUTS: Address inputs for read and write operations are internally latched during a write cycle. A0 selects high or low byte when operating in x8 mode. In x16 mode, A0 is not used; input buffer is off. 16-Mbit → A 0-A 20 32-Mbit → A 0-A 21 |
| DQ 0-DQ 15 | INPUT/ OUTPUT | DATA INPUTS/OUTPUTS: Inputs data and commands during CUI write cycles; outputs data during memory array, status register, query and identifier code read cycles. Data pins float to high-impedance when the chip is deselected or outputs are disabled. Data is internally latched during a write cycle. |
| CE0#, CE1# | INPUT | CHIP ENABLE: Activates the device's control logic, input buffers, decoders, and sense amplifiers. With CEO# or CE1# high, the device is deselected and power consumption reduces to standby levels. Both CEO# and CE1# must be low to select the device. Device selection occurs with the latter falling edge of CEO# or CEI#. The first rising edge of CEO# or CEI# disables the device. |
| RP# | INPUT | RESET/DEEP POWER-DOWN: When driven low, RP# inhibits write operations which provides data protection during system power transitions, puts the device in deep power-down mode, and resets internal automation. RP#-high enables normal operation. Exit from deep power-down sets the device to read array mode. |
| OE# | INPUT | OUTPUT ENABLE: Gates the device's outputs during a read cycle. |
| WE# | INPUT | WRITE ENABLE: Controls writes to the CUI and array blocks. Addresses and data are latched on the rising edge of the WE# pulse. |
| STS | OPEN DRAIN OUTPUT | STATUS: Indicates the status of the internal state machine. When configured in level mode (default), it acts as a RY/BY# pin. For this and alternate configurations of the STATUS pin, see the Configuration command. Tie STS to VCC with a pull-up resistor. |
| WP# | INPUT | WRITE PROTECT: Master control for block locking. When VIL, locked blocks cannot be erased or programmed, and block lock-bits cannot be set or cleared. |
| BYTE# | INPUT | BYTE ENABLE: Configures x8 mode (low) or x16 mode (high). |
| VPP | SUPPLY | BLOCK ERASE, PROGRAM, LOCK-BIT CONFIGURATION POWER SUPPLY: Necessary voltage to perform block erase, program, and lock-bit configuration operations. Do not float any power pins. |
| VCC | SUPPLY | DEVICE POWER SUPPLY: Do not float any power pins. Do not attempt block erase, program, or block-lock configuration with invalid VCC values. |
| GND | SUPPLY | GROUND: Do not float any ground pins. |
| NC | | NO CONNECT: Lead is not internally connected; it may be driven or floated. |

Electronic Transactions Using SET

The *SET Secure Electronic Transaction Specification* changes the way that participants in a payment system interact. In face-to-face retail or mail order transactions, electronic processing begins with the "merchant" or "acquirer". However, in a SET transaction, the electronic processing begins with the cardholder.

In the electronic commerce environment, consumers and corporate purchasers interact with merchants from personal computers. A cardholder uses a payment card that has been issued by an "issuer". Such issuers are financial institutions that establish accounts for the cardholder and issue the payment card. The issuer guarantees payment for authorized transactions using a payment card in accordance with brand regulations and local legislation.

A merchant offers the goods for sale or provides services in exchange for payment. In SET, the merchant accepting payment cards must have a relationship with an acquirer. The acquirer, in turn, is the financial institution that establishes an account with a merchant and processes payment card authorizations and payments.

SET uses a distinct public/private key pair to create the digital signature. Thus, each SET participant possesses two asymmetric key pairs: (a) a "key exchange pair, which is used in the process of encryption and decryption; and (b) a "signature" pair for the creation and verification of digital signatures. It should be noted in this regard that the roles of the public and private keys are, thus, reversed in the digital signature process where the private key is used to encrypt (i.e., sign) and the public key is used to decrypt (i.e., verify the signature).

Before two parties use public-key cryptography to conduct business, each wants to be sure that the other party is authenticated. For example, before User B accepts a message with User A's digital signature, he wants to be sure that the public key belongs to User A and not to someone masquerading as User A on an open network. One way for User B to be sure that the public key belongs to User A is to receive it over a secure channel directly from User A. In most situations, however, this solution is not practical.

An alternative to secure transmission of the key is to use a trusted third party to authenticate that the public key belongs to User A, such as in the public key infrastructure (PKI) described herein before. Such party is known as a Certificate Authority (CA). The CA authenticates User A's claims according to its published policies. For example, a CA could supply certificates that offer a high assurance of personal identity, which may be required for conducting business transactions; this CA may require User A to present a driver's license or passport to a notary public before it will issue a certificate. Once User A has provided proof of her identity, the CA creates a message containing User A's name and her public key. This message, known as a "certificate", is digitally signed by the CA. It contains owner identification information, as well as a copy of one of the owner's public keys ("key exchange" or "signature"). To get the most benefit, the public key of the CA should be known to as many people as possible. Thus, by trusting this single key, an entire hierarchy can be established in which one can have a high degree of trust.

Figure 22:
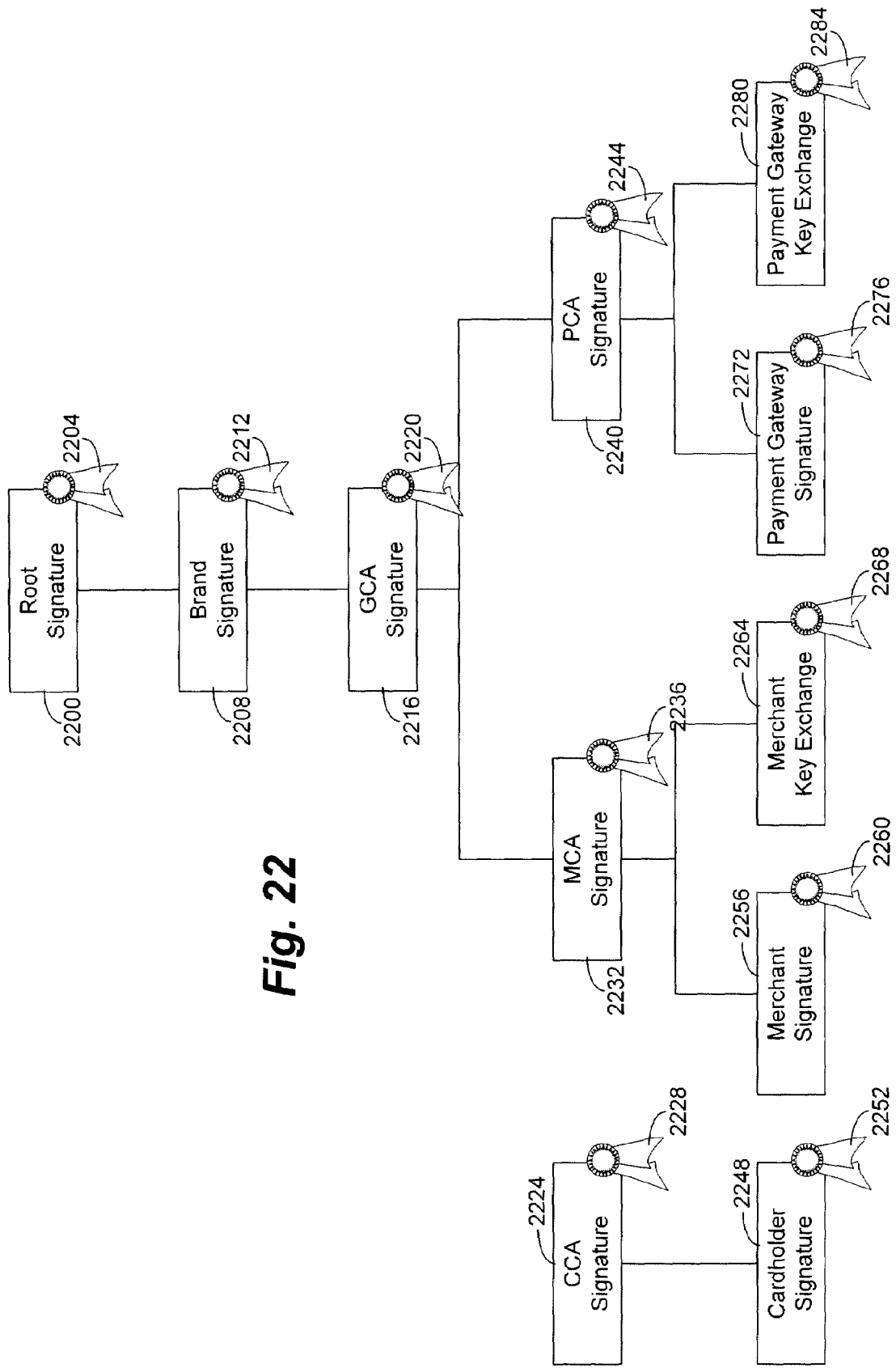
FIG. 22 shows how SET certificates are verified through a multi-level hierarchy of trust.

Because SET participants have two key pairs, they also have two certificates, both of which are created and signed at the same time by the CA. There is, thus, a "hierarchy of trust" created by SET as can be seen in FIG. 22. SET certificates are verified through this multi-level hierarchy of trust. Each certificate is linked to the signature certificate of the entity that digitally signed it. By following the trust tree to a known trusted party, one can be assured that the certificate is valid.

For example, a cardholder certificate 2252 is linked to the certificate of the issuer (or the brand on behalf of the issuer). The issuer's certificate is linked back to a root key through the brand's certificate 2212.

Cardholder certificates 2252 function as an electronic representation of the payment card. They are digitally signed by the issuing financial institution (i.e., the "issuer"), and, therefore, cannot be altered by a third party. Cardholder certificates 2252 do not contain the cardholder's account number or the expiration date. Instead, such account information and a secret value (e.g., a PIN) known only to the cardholder's software are encoded using a one-way hashing algorithm. In the event that the account number, expiration date, and the secret value are known, a link to the cardholder certificate 2252 can be proven. However, the information cannot be derived by merely looking at the cardholder certificate 2252. Within the SET protocol, the cardholder supplies the account information and the secret value to a "payment gateway" where the link is verified. Such payment gateways are devices operated by the acquirer (or a third party, which is designated by the acquirer) that processes merchant payment messages, including payment instructions from cardholders.

Cardholder certificates 2252 are only issued to the cardholder when the issuer approves it. By requesting a cardholder certificate 2252, the cardholder indicates a specific intent to perform commerce via electronic means. The cardholder certificate 2252 is then transmitted to the merchant with purchase requests and encrypted payment instructions. Upon receipt of the cardholder certificate 2252 from the issuer or its agent, the merchant can be assured (at a minimum) that the account number has been validated. Cardholder certificates 2252 are optional, at the payment card brand's discretion, according to the *SET Secure Electronic Transaction Specification*.

On the other hand, merchant certificates function as an electronic substitute for the payment brand decal that appears in the store window. The decal itself is a representation that the merchant has a relationship with a financial institution allowing it to accept the payment card brand. Because they are digitally signed by the merchant's financial institution, merchant certificates also cannot be altered by a third party and can only be generated by a financial institution.

Such merchant certificates 2260 are approved by the acquiring financial institution, and provide assurance that the merchant holds a valid agreement with an acquirer. A merchant must have at least one pair of certificates to participate in the SET environment, but there may be multiple certificate pairs per merchant. A merchant will have a pair of certificates for each payment card brand that it accepts.

Payment gateway certificates 2276 are obtained by acquirers or their processors for the systems that process authorization and capture messages. The gateway's encryption key, which the cardholder gets from this certificate, is used to protect the cardholder's account information. Payment gateway certificates 2276 are issued to the acquirer by the payment brand.

Acquirers must have certificates in order to operate a Certificate Authority (CA) that can accept and process certificate requests directly from merchants over public and private networks. Those acquirers that choose to have the payment card brand process certificate requests on their behalf do not require certificates, because they do not process SET messages. Acquirers receive their certificates from the payment card brand.

Issuers must also have certificates in order to operate a CA that can accept and process certificate requests directly from cardholders over public and private networks. Those issuers that choose to have the payment card brand process certificate requests on their behalf also do not require certificates, because they do not process SET messages. Issuers receive their certificates from the payment card brand.

The public signature key of the root is known to all SET software and may be used to verify each of the certificates in turn. Within SET, dual signatures are used to link an order message sent to the merchant with the payment instructions containing account information sent to the acquirer. When the merchant sends an authorization request to the acquirer, it includes the payment instructions sent to it by the cardholder and the message digest of the order information. The acquirer uses the message digest from the merchant and computes the message digest of the payment instructions to check the dual signature.

Online PIN Extension

According to *Online PIN Extensions to SET Secure Electronic Transaction* (Version 1.0), there are two specific extensions to SET to support the use of Personal Identification Numbers (PINS) as an online cardholder authentication method. One extension enables the entry of cardholder PINs via any method, including via PC keyboards. The other extension supports the entry of PINs via secure devices. Two separate extensions are defined to support brand policies that differ according to the PIN entry method.

The concept of a "secure device" is referenced but not defined in this document. It is expected that another SET 1.0 extension will provide a method for transporting the identification and authentication information generated by secure devices that may be used for PIN entry or other purposes. This additional SET extension will be defined in a separate specification. For purposes of the present invention, this future SET extension is called a "device authentication extension."

The requirement for SET is that the brands and acquiring banks be able to apply their judgment concerning whether online PINs are supported, and whether software versus hardware entry of PINs is required. Brands have the option of requiring cardholder certificates, or permitting PIN transactions without cardholder certificates.

The following specific requirements are addressed in this design:

- Ensure secrecy of online PINs equivalent or greater to that provided in SET for PANS
- At SET Payment Gateways, enable secure online PIN handling equivalent to the requirements of relevant standards.
- Permit secure translation and re-encryption of online PINs to the symmetric keys and PIN block formats required by various banks and networks.
- Enable brands and acquiring banks to specify whether online PINs are supported, and whether secure PIN entry devices are required. Include provisions for certain magnetic stripe track data that may be required for online PIN verification Online PIN Processing The design must not impact existing SET merchant implementations. It must provide sufficient protection for each online PIN (stronger than DES), and it must not cause interoperability problems with existing SET transactions that operate without PINs. Online PINs must be handled without requiring changes to existing legacy systems.

Technical Design/Requirements

Many existing bank debit or ATM systems use PINs for online cardholder authentication. Enabling optional online PIN usage in SET provides issuing banks another method to manage the balance between cost, security, and user acceptance.

Standard online PIN management practices call for PIN entry and encryption via physically secure PIN entry devices. However for use with cardholders' own PCs, such devices would be costly. At "private" PCs the risk is not physical compromise of PIN entry devices but rather surreptitious "planting" of unauthorized PC software to disclose PINs. This design provides for PIN entry via either secure devices or PC keyboards, to enable individual brands to make their own tradeoffs among cost, security, and other considerations.

However the following is not within the scope of the SET. For example, means to accept ATM/POS PINs at "public" PCs (e.g., in libraries, kiosks, cyber cafes, etc.). This implementation applies solely to "private" PCs (where such a device is used by an individual or by several cardholders who have a familial or other relationship). As long as magnetic-stripe cards are in use for ATM and POS PIN-based transactions, it is considered an unacceptable fraud risk to permit PINs and corresponding magnetic-stripe data to be entered into any "public" PC, or into a "private" PC that might be "masquerading" as a public one.

Neither is there support for offline PIN verification, where PINs are verified locally by smart cards or other cardholder equipment. This method is already provided in the SET generic cryptogram extension and other chip-based payment processing. Support for online PIN authentication in SET certificate request messages is also not provided.

Zone Asymmetric PIN Encryption

The basic concept involved herein is that PINs are entered at cardholder PCs, either via functionally-secure encrypting PIN entry devices, or via PC keyboard entry with software encryption. PINS are placed into the SET RSA/OAEP block currently used for the primary account number (PAN), and are protected via asymmetric encryption under the public key of SET payment gateways. The SET 1.0 design specifies that the encrypted RSNOAEP blocks are transported via merchants to the SET payment gateways, which decrypt the block. With this extension, payment gateways additionally retrieve the PINs, potentially convert them to another PIN block format if needed, re-encrypt them under symmetric encryption, and then pass the re-encrypted PINs outbound to card networks.

ISO 9564 specifies standards for entry, formatting, symmetric encryption, and handling of online PINs in an environment of public, shared, PIN entry devices. SET differs from the environment considered by ISO9564 in several significant respects. First, PINs are entered only in private cardholder PC's, not in shared public devices as commonly found in ATMs and POS terminals. Each private PC has information about one or a few accounts, whereas shared public devices process payments for many accounts. Hence, the systemic risk from compromise of a SET cardholder PC is much smaller than the risk from compromise of an ATM or POS terminal. Second, the ISO 9564 standard defines rigid security requirements because cardholders and issuers hold the risks, but banks and merchants. operating ATMs and POS terminals determine the security. The SET environment is different because cardholders and issuers hold responsibility for both the risks and the PIN entry security. Third, SET has an established asymmetric encryption structure, instead of using long-lived symmetric DES keys as in ISO 9564. These differences motivate some variation from ISO 9564. Nevertheless, this approach supports interfacing to ISO 9564 at the SET payment gateway, so that acquirers can manage online PIN security via their existing infrastructure.

Cardholder PIN Entry

ISO 9564 requires secure PIN-entry devices. To meet this requirement, SET cardholders would need to obtain and use special PIN entry devices that would perform the PIN-encryption function. The PIN entry devices would necessarily contain CPU, memory, and SET-specific software.

However, the cost of PIN entry devices is a significant barrier to usage. For some brands, the variance of the SET PIN entry environment may justify the acceptance of the risk of entering PINs via PC keyboards and PC software. Other brands may require secure PIN entry hardware.

From a strict security viewpoint, PCs are considered vulnerable. But people are actively conducting their financial affairs with PCs, so the actual risk/benefit tradeoff appears to be in favor of using PCs this way. When an Issuer wishes to allow online PIN usage, it should ensure that the cardholder's PC has security provisions that it deems acceptable both to itself and the card brand.

Several alternative PIN types can be used to ameliorate any risks associated with using ATM/POS PINs. Some Issuers may choose to require cardholders to remember special "virtual PINs" useable only on the Internet. These virtual PINs could provide a method of proving "cardholder present" without any risk to "regular PINs" used at ATM and POS devices. Another alternative could be to use "one-time PINS" generated by hand-held cryptographic authentication tokens. In this approach, a consumer's PIN changes on each use, so a stolen PIN cannot compromise a cardholder's account. The PIN transport mechanism provided in this proposal is agnostic to these various PIN types.

The present invention provides for a means to enforce brand requirements via information included in the existing SETExtension component of Payment Gateway encryption certificates. Gateway certificates can indicate whether Gateways are willing to accept online PINs entered via PC keyboards, and/or online PINs entered via secure PIN entry devices, or neither. Brands can enforce their security requirements by rules applied at gateway certificate authorities. In essence, the systems and methods according to the present invention become a "brand".

SET "PIN Block" Format

This design adds an encrypted PIN Block into the existing SET RSA/OAEP block. The PIN block data shall be formatted according to ISO 9564-1 Format 0. The PIN block format is summarized here; the text of IS0 9564-1:1991(E) is authoritative.

The PIN is bound to the PAN by the facts that they are XORed into each other, and because the PAN and PIN block are carried in the same RSA/OAEP block. This linkage prevents swapping PAN versus PIN. The RSA/OAEP block is bound to the remainder of the transaction by either the cardholder signature (in the case of signed payment requests), or by the cryptographic linkage between the RSA/OAEP block and the PI (in the case of unsigned payment requests). This linkage prevents swapping the entire RSA/OAEP block versus the PI.

When carried within RSA/OAEP blocks, PINs are encrypted both with DES and under public keys contained in SET Payment Gateway public key encipherment certificates. Each online PIN is protected by the fact that a new random DEK is used in each message, and by the combination of OAEP processing using a random salt, and 1024-bit RSA encryption. This meets relevant aspects of the "Basic principles of PIN Management" as defined in ISO 9564-1, where for different accounts, encipherment of the same PIN value under a given encipherment key shall not predictably produce the same cipher text.

Online PIN Extensions

There are two SET "Online PIN" extensions, one associated with PINs entered via PC keyboards, and another associated with PINs entered via secure PIN entry devices. Cardholder software is required to generate exactly one of these extensions whenever a PIN is provided in a payment request. The critical flag is set TRUE in these extensions to ensure that gateways recognize, are willing to accept, and can process online PINs contained in RSNOAEP blocks.

The two SET Online PIN extensions use the same content syntax, so that the only difference between the extensions is the object identifiers that identify them. The particular online PIN extension provided by the wallet identifies how the online PIN was entered. From a security perspective, the choice between the online PIN extensions represents a claim by potentially unknown wallet software. It is expected that a future SET 1.0 "device authentication extension" will provide means to identify and authenticate the security parameters associated with PIN entry via a secure device.

The primary purpose of these extensions is to identify transactions that have online PINs, and to require that gateways process the transactions only if they can also handle the online PINs. The secondary purpose of these extensions is to carry certain data from track 2 of magnetic stripes. This track 2 data is optional, and is only included if available to the cardholder application. The track 2 data includes the Country Code (CC), Service Code (SC), and Discretionary data (DD) fields as defined in IS0 7813:1994. Some issuer legacy authorization systems may require these fields, together with other data in SET messages, to verify PINs.

These extensions are carried in the DES-encrypted portion of the PI, so their presence and content cannot be recognized by merchants or others in the path between cardholders and Payment Gateways.

PIN OIDs in SETExtensions

SETExtensions is an existing private SET certificate extension in the Payment Gateway key encipherment (encryption) certificate. The purpose of this extension is described as follows in SET Book 2:

The SETExtensions private extension lists the SET message extensions for payment instructions that the Payment Gateway supports. The Cardholder checks the Payment Gateway certificate prior to including critical message extensions in the payment instructions. Message extensions are indicated by Object Identifiers.

Two Online PIN-related ODs are defined, one each for the two Online PIN extensions:

id-set-PIN-Secure-Source means that a Payment Gateway accepts PINs entered at secure PIN entry devices. Some brands may required that this OID only be used in conjunction with the future "device authentication extension."

id-set-PIN-Any-Source means that a Payment Gateway accepts PINs entered via any device, including normal PC keyboards.

A Payment Gateway encryption certificate may contain zero, one or both of these PIN extension ODs. The meaning of each possible combination of these ODs is described in the table below.

TABLE V

| PIN Extension OIDs | Meaning for this Transaction |
| --- | --- |
| Neither | Cardholder software should not enable any payment card that requires an online PIN. Gateway shall reject either PIN extension. |
| id-set-PIN-Secure-Source | Cardholder software should accept an online PIN only from a secure PIN entry device; if the device provides identification or authentication information, that data should be identified by a secure device extension carried in the same SET message. Gateway should accept transactions only (a) without PINs; or (b) with PINs contained in transactions that include the id-set-PIN-Secure-Source PI extension and, when required by brand policy, a "device authentication extension." |
| id-set-PIN-Any-Source | Cardholder software may accept an online PIN via any method, whether known to be secure or not. Gateway should accept transactions only (a) without PINs; or (b) with PINs contained in transactions that include the id-set-PIN-Any-Source PI extension. |
| Both | Wallet should accept an online PIN via any method, whether secure or not. Gateway should accept transactions only (a) without PINs; (b) with PINs contained in transactions that satisfy the conditions for either the id-set-PIN-Secure-Source or the id-set-PIN-Any-Source extension. |

What Is Included In Payment Gateway Encryption Certificate

It should be noted that it is the issuer's choice to reject transactions that do not contain online PINs, when the issuer requires PINs. SET Payment Gateways do not screen for this, and the default SET case is to not use PINs.

Online PIN Processing, at the Cardholder

Cardholder software is expected to prompt the cardholder for a PIN during processing of payment transactions, only for those cards that require online PINs. Software may not store PINS, and must overwrite in-memory copies of any cleartext PINs once the PINS have been encrypted.

Cardholder software must know which cards require online PINs. One method is to have cardholders specify PIN requirements during card registration. When the Service Code is available in the cardholder certificate, it can be used to determine whether a PIN must be entered. Other methods are left to issuers and software implementers.

Cardholder software must inspect the Payment Gateway encryption certificate received in the PInitRes message. If the certificate's SETExtension field contains no Online PIN OIDs, then the cardholder software must inform the cardholder and cancel the transaction.

If the SETExtension permits only secure PIN entry, then cardholder software may accept an online PIN from the cardholder only via secure PIN entry devices, and the cardholder software should include a "device authentication extension" in the SET transaction if the device identification or authentication information is available.

If the certificate's SETExtension field permits PIN entry from any source, the cardholder software may accept a PIN from a secure device (including a "device authentication extension" as appropriate), or if no such device is available, from the PC keyboard or by another method.

Cardholder software must also know any Country Code (CC), Service Code (SC), and Discretionary Data (DD) required for particular cards, and must insert the data in the appropriate Online PIN extension.

Secure PIN Processing-, at SET Payment Gateways

Bank systems that support ATM networks currently employ tamper-resistant cryptographic hardware security modules for receiving online PINs from ATMs and for forwarding these PINs to internal systems or other ATM networks. Normally, incoming PINS are encrypted under one DES key. When PINs are transmitted to another node, the PINs are re-encrypted under another DES key. The DES keys are maintained in tamper-resistant hardware security modules, which can decrypt the incoming PINS under the first DES key, and re-encrypt them under the second DES key. The hardware can also convert the PIN from the input "PIN block format" to the appropriate output format.

SET payment gateways require hardware security modules for storage of private keys, decryption of incoming data, and signature generation. Each brand may define additional security requirements. Online PIN handling fits naturally and simply into this existing processing path for incoming SET messages. Accordingly, the fraud prevention module 420 of the present invention becomes such a hardware security module. Certain changes which have been made to the SET specification facilitate integration of the fraud prevention means according to the present invention.

RSA/OAEP Block Format

The SET 1.0 RSA/OAEP block is updated to provide for the transport of an online PIN. The certified time-stamp provided by the systems and methods described herein, in essence, can become such a PIN.

RSA/OAEP Block Contents (BC) Byte

Two new Block Contents (BC) byte values are defined for this extension:

x'06'—PANData with PINBlock x'07'—PANToken with PINBlock

PANData with PINBlock is used in signed PReq messages; PANToken with PINBlock is used with unsigned PReq messages. In the latter case, the EXH cryptographic operator sets the high-order bit of BC to 1, so that the complete BC value appears as x'87' for PANToken with PINBlock.

PANData with PINBlock

PANData is carried in the signed form of the purchase order request (PReq) message. When a PINBlock is present in the OAEP block (as indicated by the low-order 7 bits of BC set to x706') it is included immediately after the PANData fields. In this case, the total length of PANData plus the PINBlock is 73 bytes. PANData with PINBlock contains five fields when carried in the RSNOAEP block.

The PINBlock field is only carried in the RSA/OAEP block. As in all SET transactions, with or without this PIN extension, the cardholder signature is generated and verified according to the SET 1.0 specification, using the PANData ASN.1 structure without the PINBlock. The PINBlock is explicitly excluded from the PANData ASN.1 structure to avoid the potential for cleartext PIN exposure in any software based signature verification processing.

PANToken with PINBlock

PANToken is carried in the unsigned form of the purchase request (PReq) message and optionally carried in a number of the messages transmitted between Payment Gateways and Merchants.

When a PINBlock is present in the OAEP block (as indicated by the low order 7 bits of BC set to x'0 7') it is included immediately after the PANToken fields. In this case, the total length of PANToken plus the PINBlock is 53 bytes.

A PINBlock field is appended, attached, connected, or coupled after PANToken only in the PIUnsigned structure. The PINBlock field shall not be appended, attached, connected, or coupled to PANToken in any other SET context. PANToken with PINBlock contains four fields when carried in the RSA/OAEP block. It is linked to and from the remainder of the SET message via the EXH cryptographic operator. The linkage is generated and verified using the PANToken ASN.1 structure according to the SET 1.0 specification. The PINBlock is explicitly excluded from the PANToken ASN.1 structure to avoid the potential for cleartext PIN exposure in any software-based signature verification processing.

Authorization Request/Response

The following change to the description of "Payment Gateway processes AuthReq" was made: If the low-order 7 bits of the RSNOAEP block BC value is either x706' or x'07' then process the extra data as "PANData with PINBlock" or "PANToken with PINBlock".

When an HSM is used, ensure that the entered PIN is never exposed in cleartext outside the HSM.

Verify that the PIExtensions include one of the two Online PIN Extension.

Enforce that "PANToken with PINBlock" is only used in PIUnsigned structure and never in any other SET message.

PReq processing: if the PIExtension contains either of the ODs for Online PIN Extensions then:

Verify that the RSNOAEP block contained a PINBlock field.

Verify that the SETExtensions field of the Payment Gateway encryption certificate contains the matching OID.

If the pin-Secure-Source PIN is used, enforce any brand requirements that the same SET transaction also contains a "device authentication extension." Apply the processing specified for the device authentication extension.

Verify the signature or EXH linkage calculations according to the SET 1.0 specification. The inclusion of the PINBlock field does not change these processes in any way.

Extract the PIN from the decrypted OAEP block "PIN-Block" field, immediately convert the PIN to the desired output PIN block, and re-encrypt the PIN under the appropriate DES key. When an HSM is used, the PIN processing design must be such that the PIN never appears as cleartext outside the Hardware Security Module.

If Country Code (CC), Service Code (SC), or Discretionary Data fields are provided, forward them to the issuer for use in verifying the online PIN.

As provided in Appendix A of the SET specification, there are two extensions used to identify the presence of PIN data in the RSAIOAEP block. These extensions are critical, so that gateways that cannot handle the PIN data will reject transactions containing PINs.

These extensions also carry data that may be needed to verify PINs.

```
SETPIN DEFINITIONS IMPLICIT TAGS : := BEGIN
IMPORTS
EXTENSION, id-set-msgExt
FROM SetCertificateExtensions
```

Implementations also need to include the pin-Secure-Source or pin-Any-Source PDU—in IExtensionsIOS, in the SetPayMsgs module. PIExtensionsIOS is used to—constrain piExtensions, the message extension component of PIHead,—in a SET purchase request (PReq) message.

```
-- PIExtensionsIOS EXTENSION :: = {
-- . . . ,
-- pin-Secure-Source -- Identifies presence of an Online PIN
obtained
-- -- via a secure PIN entry device
- - pin-Any-Source -- Identifies presence of an Online PIN
Obtained
-- from any source
--}
-- This extension identifies the presence of an Online PIN
obtained via a
-- secure PIN entry device. This extension must always be
accompanied by a
-- device authentication extension when required by brand policy.
pin-Secure-Source EXTENSION ::= {
SYNTAX PIN-Related-Data
CRITICAL TRUE
IDENTIFIED BY id-set-PIN-Secure-Source
}
identifies the presence of an Online PIN from
EXTENSION :: = {
PIN-Related-Data
TRUE
id-set-PIN-Any-Source
}
id-set-PIN-Secure-Source OBJECT IDENTIFIER::= {
id-set-msgExt PIN-Secure-Source(4) } PIN from secure PIN
entry device
id-set-PIN-Any-Source OBJECT IDENTIFIER::= {
id-set-msgExt PIN-Any-Source(5) } PIN from Any source
This extension
any source.
pin-Any-Source
SYNTAX
CRITICAL
IDENTIFIED BY
```

-continued

```
-- PINRelated data contains information from mag stripe track 2
that
-- is sometimes needed to verify online PINs. See ISO
7813:1995(E) for the
-- definition of these fields.
PINRelatedData ::= SEQUENCE {
pinRelatedVersion INTEGER { pVer1(0) } (pVer1),
panSource PANSource,
track2DataSource [0] Track2DataSource OPTIONAL,
-- required only if Track2 data is
provided
country-code
service_code
discretionary-data
}
[1] Country-Code OPTIONAL,
[2] Service-Code OPTIONAL,
[3] Discretionary-Data OPTIONAL
-- These fields indicate how the cardholder software acquired the
PAN, and
-- any magnetic stripe track 2 data.
PANSource ::= ENUMERATED { -- method used to enter PAN into
cardholder software
panKeyboardEntered (0), entered via PC keyboard
panMagStripeEntered (I), read directly from magnetic
stripe track 2
panICCEntered (2), read directly from Integrated
Circuit Card
}
Track2DataSource : : = ENUMERATED {
-- method used to enter country-code,
service-code,
-- or discretionary-data into
cardholder software
track2KeyboardEntered ( O ) , -- entered via PC keyboard
track2MagStripeEntered ( 1 ) , -- read directly from magnetic
stripe track 2
track2ICCEntered (2) , -- read directly from Integrated
Circuit Card
track2CertEntered (3) , -- obtained from cardholder
certificate
-- These fields are defined in IS0 7813:1995(E) and 7811-2 as
binary-coded
-- decimal (BCD) digits. Each digit is 4 binary bits (most
significant bit
-- first), excluding the parity bit defined in IS0 7811-2.
Country-Code . . -- BIT STRING (SIZE (12)
Service-Code . . -- BIT STRING (SIZE (12))
Discretionary-Data ::= BIT STRING (SIZE (4. . 6 8 ) )
-- Note 1: track 2 is 40 digits, minus 3 digits for start and end
-- sentinel and LRC, leaving 37 digits. The smallest PAN for any
-- payment system is 13, plus 4
-- digits allocated for expiry date, plus 3 for SC. That leaves
-- 17 digits for DD.
-- Note 2: country code appears in track 2 only if the primary
account number
- - (PAN) starts with '59'.
-- Note 3: Service Code is omitted from track 2 by substituting a
field
-- separator (FS, BCD 13). In that case, omit Service-Code here.
-- Note 4: discretionary data is omitted from track 2 by placing
the end
-- sentinel (ETX, BCD 15) immediately after service code. In that
case, omit
-- Discretionary-Data here.
END
```

In light of the above changes, incorporation of a fraud prevention module 560 (FIG. 5) into the system as described herein before can facilitate further date and time security. A time-certain date and time of the transaction may be entered into the discretionary data area noted above, since there is room for 17 digits.

Conclusion

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A system for maintaining the trust in content, comprising:
- data content;
- a digital device having installed therein a trusted clock to provide a certifiable time for an unalterable time stamp, wherein said certifiable time confirms at least one of said data content's access, creation, modification, receipt, or transmission, wherein said trusted clock includes a tamper-evident means, and wherein said trusted clock is initialized in a ceremony witnessed by a plurality of participants;
- means for receiving a request to save said data content from a user;
- first means for saving said data content at a moment in time;
- means for retrieving from said trusted clock a date and a time corresponding to said moment in time, wherein said moment in time is substantially a current time of said trusted clock corresponding to receipt of said request;
- first means for coupling said date and said time retrieved from said trusted clock to said data content;
- first means for signing said data content with said date and said time retrieved from said trusted clock coupled thereto;
- means for hashing said data content to produce a digest;
- second means for signing said digest with a key to produce a certificate;
- second means for coupling said certificate to said data content;
- second means for saving said data content with said certificate coupled thereto; and
- auditable means for verifying trust in the content of said data content with said certificate coupled thereto.

2. The system according to claim 1, wherein said data content comprises one or more data files, directory files, executable files, program files, text files, index files, source files, or metadata.

3. The system according to claim 1, wherein said data content comprises one or more bitstreams.

4. The system according to claim 1, wherein said data content comprises one or more entities, instances, or objects.

5. The system according to claim 1, wherein said data content comprises one or more data chunks.

6. The system according to claim 1, wherein said plurality of participants employs one or more of a split password, an m/n schema, a physical token, and a biometric device.

7. The system according to claim 1, wherein said plurality of participants is selected from a group consisting of an auditor, a customer security official, and a timestamp authority official.

8. The system according to claim 7, wherein said plurality of participants comprises a minimum of three participants.

9. The system according to claim 1, wherein said data content comprises streaming data.

10. The system according to claim 9, wherein said streaming data comprises one or more audio streams or video streams.

11. The system according to claim 1, wherein said data content comprises one or more ASCII strings, bit strings, byte strings, character strings, data elements, or data sets.

12. The system according to claim 11, wherein said bit strings comprise one or more contiguous bit strings.

13. The system according to claim 11, wherein said bit strings comprise one or more non-contiguous bit strings.

14. A system for maintaining trust in content, comprising:
- data content;
- a trusted clock to provide a certifiable time for an unalterable time stamp, wherein said certifiable time confirms at least one of said data content's access, creation, modification, receipt, or transmission, wherein said trusted clock includes a tamper-evident means, and wherein said trusted clock is initialized in a ceremony witnessed by a plurality of participants;
- means for receiving said request to save said data content from a user;
- first means for saving said data content at a moment in time;
- means for retrieving from said trusted clock a date and a time corresponding to said moment in time, wherein said moment in time is a substantially current time of said trusted clock corresponding to receipt of said request;
- first means for coupling said date and said time retrieved from said trusted clock to said data content;
- first means for signing said data content with said date and said time retrieved from said trusted clock coupled thereto;
- means for hashing said data content to produce a digest;
- second means for signing said digest with a key to produce a certificate;
- second means for coupling said certificate to said data content;
- second means for saving said data content with said certificate coupled thereto; and
- auditable means for verifying trust in the content of said data content with said certificate coupled thereto.

15. The system according to claim 14, wherein said trusted clock comprises a logical clock.

16. The system according to claim 14, wherein said trusted clock comprises a physical clock.

17. The system according to claim 14, wherein said plurality of participants employs one or more of a split password, an m/n schema, a physical token, and a biometric device.

18. The system according to claim 14, wherein said plurality of participants is selected from a group consisting of an auditor, a customer security official, and a timestamp authority official.

19. The system according to claim 18, wherein said plurality of participants comprises a minimum of three participants.

20. The system according to claim 14, wherein said trusted clock comprises a real time clock.

21. The system according to claim 20, wherein said real time clock comprises a software real time clock.

22. The system according to claim 14, further comprising one or more servers and one or more clients coupled to a network in a two-tier client/server architecture.

23. The system according to claim 22, wherein said user comprises a human being using a computer having installed thereon said one or more servers or said one or more clients.

24. The system according to claim 22, wherein said user comprises one of said one or more servers.

25. The system according to claim 22, wherein said user comprises one of said one or more clients.

26. A method for maintaining trust in content, comprising:
- providing data content;
- providing, with a trusted clock, a certifiable time for an unalterable time stamp, wherein said certifiable time confirms at least one of said data content's access, creation, modification, receipt, or transmission wherein said trusted clock includes a tamper-evident means, and wherein said trusted clock is initialized in a ceremony witnessed by a plurality of participants;

receiving said request to save said data content from a user;

saving said data content at a moment in time;

retrieving from said trusted clock a date and a time corresponding to said moment in time, wherein said moment in time is substantially current time of said trusted clock corresponding to receipt of said request;

associating said date and said time retrieved from said trusted clock with said data content;

signing said data content with said date and said time retrieved from said trusted clock associated therewith;

hashing said data content to produce a digest;

signing said digest with a key to produce a certificate;

associating said certificate with said data content;

saving said data content with said certificate associated therewith; and verifying trust in the content of said data content in an auditable manner with said certificate associated therewith.

27. The method according to claim 26, wherein said step of associating said date and said time retrieved from said trusted clock with said data content comprises appending said date and said time retrieved from said trusted clock to said data content.

28. The method according to claim 26, wherein said step of associating said date and said time retrieved from said trusted clock with said data content comprises attaching said date and said time retrieved from said trusted clock to said data content.

29. The method according to claim 26, wherein said step of associating said date and said time retrieved from said trusted clock with said data content comprises connecting said date and said time retrieved from said trusted clock to said data content.

30. The method according to claim 26, wherein said step of associating said date and said time retrieved from said trusted clock with said data content comprises coupling said date and said time retrieved from said trusted clock to said data content.

31. The method according to claim 26, wherein said step of associating said certificate with said data content comprises appending said certificate to said data content.

32. The method according to claim 26, wherein said step of associating said certificate with said data content comprises attaching said certificate to said data content.

33. The method according to claim 26, wherein said step of associating said date and said time retrieved from said trusted clock with said data content comprises connecting said certificate to said data content.

34. The method according to claim 26, wherein said step of associating said certificate with said data content comprises coupling said certificate to said data content.

35. The method according to claim 26, wherein said plurality of participants employs one or more of a split password, an m/n schema, a physical token, and a biometric device.

36. The method according to claim 26, wherein said plurality of participants is selected from a group consisting of an auditor, a customer security official, and a timestamp authority official.

37. The method according to claim 36, wherein said plurality of participants comprises a minimum of three participants.

* * * * *